(12) United States Patent
Wilkerson et al.

(10) Patent No.: US 9,935,975 B2
(45) Date of Patent: Apr. 3, 2018

(54) HARD OBJECT: LIGHTWEIGHT HARDWARE ENFORCEMENT OF ENCAPSULATION, UNFORGEABILITY, AND TRANSACTIONALITY

(71) Applicants: Daniel Shawcross Wilkerson, Berkeley, CA (US); Mark William Winterrowd, San Francisco, CA (US)

(72) Inventors: Daniel Shawcross Wilkerson, Berkeley, CA (US); Mark William Winterrowd, San Francisco, CA (US)

( * ) Notice: Subject to any disclaimer, the term of this patent is extended or adjusted under 35 U.S.C. 154(b) by 0 days.

(21) Appl. No.: 15/404,652

(22) Filed: Jan. 12, 2017

(65) Prior Publication Data

US 2017/0126738 A1 May 4, 2017

Related U.S. Application Data

(63) Continuation of application No. 14/204,393, filed on Mar. 11, 2014, now Pat. No. 9,569,612.

(60) Provisional application No. 61/782,363, filed on Mar. 14, 2013.

(51) Int. Cl.
*G06F 9/45* (2006.01)
*G06F 17/30* (2006.01)
*H04L 29/06* (2006.01)

(52) U.S. Cl.
CPC ........ *H04L 63/1491* (2013.01); *H04L 63/145* (2013.01)

(58) Field of Classification Search
CPC ... H04L 67/10; H04L 63/1491; H04L 63/145; G06F 9/443; G06F 9/465; G06F 9/5066; G06F 12/0253; G06F 17/30017; G06F 17/30321; G06F 17/30743; G06F 17/30749; G06F 11/3624; G06Q 30/06; G06Q 30/02

See application file for complete search history.

(56) References Cited

U.S. PATENT DOCUMENTS

| | | |
|---|---|---|
| 4,408,274 A | 10/1983 | Wheatley et al. |
| 4,434,464 A | 2/1984 | Suzuki et al. |
| 4,442,484 A | 4/1984 | Childs et al. |
| 4,525,780 A | 6/1985 | Bratt et al. |
| 4,701,846 A | 10/1987 | Ikeda et al. |
| 5,075,842 A | 12/1991 | Lai |
| 5,075,845 A | 12/1991 | Lai et al. |
| 5,075,848 A | 12/1991 | Lai et al. |
| 5,157,777 A | 10/1992 | Lai et al. |
| 5,563,843 A | 10/1996 | Fackenthal et al. |
| 5,627,987 A | 5/1997 | Nozue et al. |
| 5,845,129 A | 12/1998 | Wendort et al. |
| 5,890,189 A | 3/1999 | Nozue et al. |

(Continued)

OTHER PUBLICATIONS

Warg et al., Rounding pointers: type safe capabilities with C++ meta programming, Oct. 2011, 5 pages.*

(Continued)

*Primary Examiner* — Thuy Dao
(74) *Attorney, Agent, or Firm* — Brown & Michaels, PC

(57) ABSTRACT

A hardware-implemented method to support three desirable software properties: encapsulation, referential integrity/capabilities, and transactions. These properties in turn may be used to support software correctness, specifically the enforcement of invariants, and computer security, specifically protecting parts of programs from each other within a single process.

6 Claims, 14 Drawing Sheets

(56) References Cited

U.S. PATENT DOCUMENTS

Figure 1:
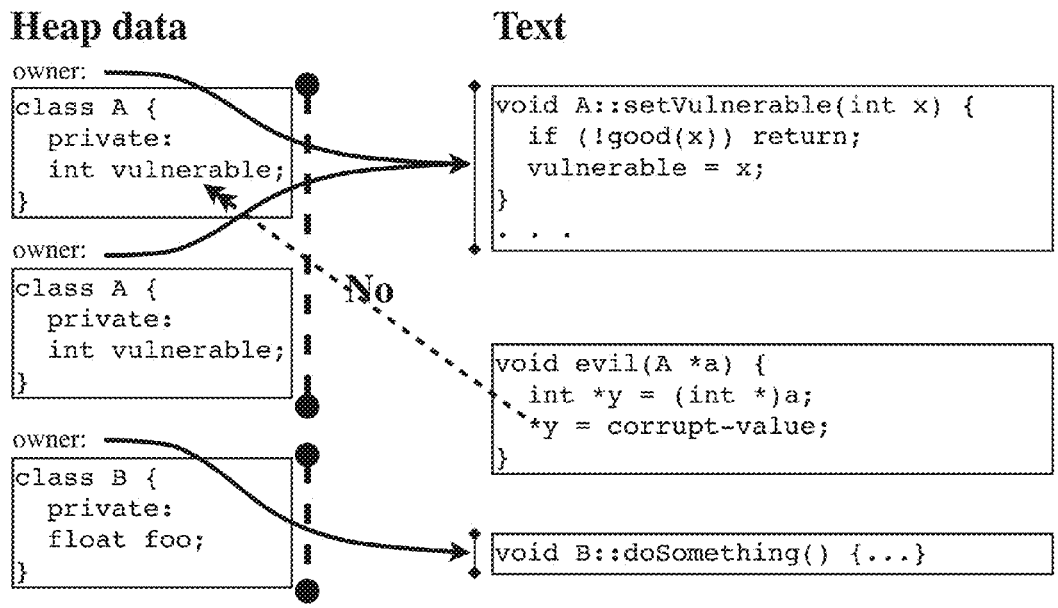

| | | | |
|---|---|---|---|
| 5,892,944 | A | 4/1999 | Fukumoto et al. |
| 6,542,919 | B1 | 4/2003 | Wendorf et al. |
| 6,615,340 | B1* | 9/2003 | Wilmot, II ............ G06F 9/3004 712/209 |
| 6,854,039 | B1 | 2/2005 | Strongin et al. |
| 6,873,993 | B2* | 3/2005 | Charlesworth ... G06F 17/30017 704/251 |
| 6,941,473 | B2 | 9/2005 | Etoh et al. |
| 7,134,050 | B2 | 11/2006 | Wenzel |
| 7,197,502 | B2* | 3/2007 | Feinsmith .............. G06Q 10/10 |
| 7,287,140 | B1 | 10/2007 | Asanovic et al. |
| 7,467,272 | B2 | 12/2008 | Genty et al. |
| 7,584,461 | B2* | 9/2009 | Plum ................... G06F 11/3624 717/143 |
| 7,882,318 | B2 | 2/2011 | Savagaonkar et al. |
| 7,917,710 | B2 | 3/2011 | Freeman et al. |
| 8,136,091 | B2 | 3/2012 | Erlingsson et al. |
| 8,364,910 | B2 | 1/2013 | Wilkerson et al. |
| 8,495,036 | B2* | 7/2013 | Calder .............. G06F 17/30011 707/696 |
| 2002/0123981 | A1 | 9/2002 | Baba et al. |
| 2003/0172246 | A1* | 9/2003 | Tessarolo .............. G06F 9/3552 711/220 |
| 2008/0222397 | A1* | 9/2008 | Wilkerson .......... G06F 12/1483 712/220 |
| 2012/0102268 | A1 | 4/2012 | Smith et al. |
| 2012/0151184 | A1 | 6/2012 | Wilkerson et al. |
| 2012/0255001 | A1* | 10/2012 | Sallam .................. G06F 21/566 726/23 |
| 2013/0205285 | A1 | 8/2013 | Pizlo |
| 2013/0283017 | A1 | 10/2013 | Wilkerson et al. |
| 2014/0201422 | A1 | 7/2014 | Tseng et al. |
| 2014/0258635 | A1 | 9/2014 | Hong et al. |
| 2016/0147811 | A1* | 5/2016 | Eluri ................. G06F 17/30348 707/694 |

OTHER PUBLICATIONS

Nagarakette et al., WatchdogLite: Hardware-Accelerated Compiler-Based Pointer Checking, Feb. 2014, 10 pages.*
Bojinov et al., Address space randomization for mobile devices, Jun. 2011, 11 pages.*
[BO-2003]: Randal E. Bryant and David R. O'Hallaron "Computer Systems: A Programmer's Perspective" Prentice Hall 2003.
[EKO-1995]: Dawson R. Engler, M. Frans Kaashoek, James O'Toole "Exokemel: An Operating System Architecture for Application-Level Resource Management", Symposium on Operating Systems Principles, 1995, pp. 251-266.
[G-2005]: S. Gorman, "Overview of the Protected Mode Operation of the Intel Architecture" (date unknown to me).
[HP-1998]: "HP OpenVMS Systems Documentation: OpenVMS Alpha Guide to 64-Bit Addressing and VLM Features", Jan. 1998.
[I-2005] "Intel 80386 Programmer's Reference Manual", 1986.
[MUNGI]: "The Mungi Manifesto", http://www.ertos.nicta.com.au/research/mungi/manifesto.pml (date unknown to me).
[OSSNMS-1992]: T. Okamoto, H. Segawa, S. H. Shin, H. Nozue, Ken-Ichi Maeda, M. Saito, "A Micro-Kernel Architecture for Next Generation Processors", Proceedings of the Workshop on Micro-kernels and Other Kernel Architectures, 1992, pp. 83-94.
[W-2004]: Emmett Witchel, "Mondrian Memory Protection", Ph.D. Thesis MIT, 2004.
[WA-2003]: Emmett Witchel, Krste Asanovic, "Hardware Works, Software Doesn't: Enforcing Modularity with Mondriaan Memory Protection" 9th Workshop on Hot Topics in Operating Systems (HotOS-IX), Lihue, HI, May 2003.
[WCA-2002]: Emmett Witchel, Josh Cates, Krste Asanovic, "Mondrian Memory Protection", ASPLOS-X: Proceedings of the 10th international conference on Architectural support for programming languages and operating systems, San Jose, California 2002, pp. 304-316.

[WS-1992]: John Wilkes, Bart Sears, "A comparison of Protection Lookaside Buffers and the PA-RISC protection architecture", HP Laboratories Technical Report HPL-92-55, Mar. 1992, pp. 1-11.
[ZLFLQZMT-2004]: P. Zhou, W. Liu, L. Fei, S. Lu, F. Qin, Y. Zhou, S. Midkiff, J. Torrellas, "AccMon: Automatically Detecting Memory-related Bugs via Program Counter-based Invariants", IEEE MICRO, 2004.
[ZQLZT-2004]: P. Zhou, F. Qin, W. Liu, Y. Zhou, J. Torrellas, "iWatcher: Efficient Architectural Support for Software Debugging", International Symposium on Computer Architecture ISCA, 2004.
[ZQLZT-2004b]: P. Zhou, F. Qin, W. Liu, Y. Zhou, J. Torrellas, "iWatcher: Simple and General Architectural Support for Software Debugging", IEEE Top Picks in Computer Architecture, 2004.
Martin Abadi, Mihai Budiu, Ulfar Erlingsson, Jay Ligatti, "Control-Flow Integrity: Principles, Implementations, and Applications", ACM Conference on Computer and Communications Security, Nov. 2005.
Jeffrey S. Chase, Henry M. Levy, Michael J. Feeley, Edward D. Lazowska, "Sharing and Protection in a Single-Address-Space Operating System", ACM Transactions on Computer Systems 1994, vol. 12, No. 4, pp. 271-307.
E.J. Koldinger, J.S. Chase, S.J. Eggers, "Architectural Support for Single Address Space Operating Systems", 1992, Architectural Support for Programming Languages and Operating Systems (ASPLOS) V, pp. 175-186.
Robert Wahbe, Steven Lucco, Thomas E. Anderson, Susan L Graham "Efficient Software-Based Fault Isolation", ACM SIGOPS Operating Systems Review, Dec. 1993, vol. 27, No. 5, pp. 203-216.
A. Wiggins, S. Winwood, H. Tuch, G. Heiser, "Legba: Fast Hardware Support for Fine-Grained Protection", 8th Asia-Pacific Computer Systems Architecture Conference (ACSAC), Apr. 2003.
Thread in usenet newsgroup comp.arch "Does PowerPC 970 has Tagged TLBs", May 2003.
Thread in usenet newsgroup comp.sys.hp.hpux "SEVERE performance problems with shared libraries at HP-UX 9.05", Nov. 1995.
Intel, "Intel Itanium Architecture Software Developer's Manual, vol. 2: System Architecture", Revision 2.3, May 2010, pp. 2:59-2:60, pp. 2:564-2:565.
Intel, "Intel Itanium Architecture Software Developer's Manual, vol. 3: Intel Itanium Instruction Set Reference", Revision 2.3, May 2010, p. 3:29, p. 3:53.
Nicholas P. Carter, Stephen W. Keckler, William J. Dally. "Hardware Support for Fast Capability-based Addressing", ASPLOS-VI Proceedings—Sixth International Conference on Architectural Support for Programming Languages and Operating Systems, San Jose, California, Oct. 4-7, 1994. ACM SIGPLAN Notices 29(11) pp. 319-327.
Joe Devietti, Colin Blundell, Milo M. K. Martin, Steve Zdancewic. "HardBound: Architectural Support for Spatial Safety of the C Programming Language", ASPLOS-XIII Proceedings—Thirteenth International Conference on Architectural Support for Programming Languages and Operating Systems, Seattle, Washington, Mar. 1-5, 2008. ACM SIGARCH Computer Architecture News 36(1) pp. 103-114.
Bennet Yee, David Sehr, Gregory Dardyk, J. Bradley Chen, Robert Muth, Tavis Ormandy, Shiki Dkasaka, Neha Narula, Nicholas Fullagar, "Native Client: A Sandbox for Portable, Untrusted x86 Native code," sp, pp. 79-93, 2009 30th IEEE Symposium on Security and Privacy, May 17, 2009.
"Hardware Support for Safety Interlocks and Introspection"—Dhawan, et al, IEEE SASO2012 Adaptative Host and Network Security Workshop, Sep. 14, 2012.
[WMHK-2009] Daniel Wilkerson, David Alexander Molnar, Matthew Harren, and John D. Kubiatowicz. "Hard-Object: Enforcing object interfaces using code-range data protection". Technical Report UCB/EECS-2009-97, EECS Department, University of California, Berkeley, Jul. 8, 2009.
[KCWWK-2009] Kevin Klues, Derrick Coetzee, Daniel Wilkerson, Mark Winterrowd, and John Kubiatowicz. "Evaluating Hard Object: a lightweight module isolation system", Dec. 11, 2009.
[WGBAJF-2011] Daniel ShawcrossWilkerson, Simon Fredrick Vicente Goldsmith, Ryan Barrett, Erick Armbrust, Robert Johnson,

(56) References Cited

OTHER PUBLICATIONS and Alfred Fuller. "Distributed transactions for google app engine: Optimistic distributed transactions built upon local multi-version concurrency control". CoRR, abs/1106.3325, 2011. http://arxiv.org/abs/1106.3325.

[Lamport-1979] L. Lamport. "How to make a multiprocessor computer that correctly executes multiprocess programs". Computers, IEEE Transactions on, 100(9):690-691, 1979.

"Capability based addressing"—Wikipedia, Mar. 14, 2013, https://web.archive.org/web/20130314091608/http://en.wikipedia.org/wiki/Capability-based_addressing.

"Capability based security"—Wikipedia, Feb. 21, 2013, https://web.archive.org/web/20130221114055/http://en.wikipedia.org/wiki/Capability-based_security.

"Transactional memory"—Wikipedia, Jan. 19, 2013, https://web.archive.org/web/20130119011129/http://en.wikipedia.org/wiki/Transactional_memory.

"The Intel iAPX 432"—"Capability-based Computer Systems", chapter 9, pp. 159-186, Henry M. Levy, Digital Press, 1984.

"Intel MPX"—Wikipedia, Jun. 26, 2014, https://web.archive.org/web/20140626075901/http://en.wikipedia.org/wiki/Intel_MPX.

"Language and Framework Support for Reviewably-Secure Software Systems" - Mettler, Adrian Matthew, PhD Thesis, UC Berkeley, Fall 2012.

\* cited by examiner

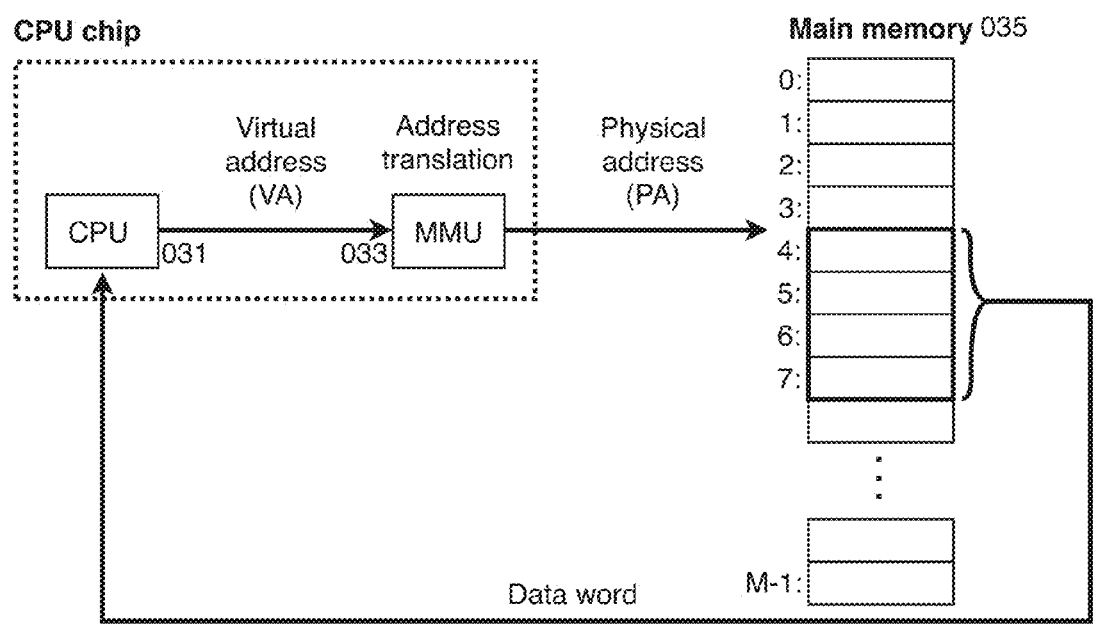
Figure 3 -- Prior Art

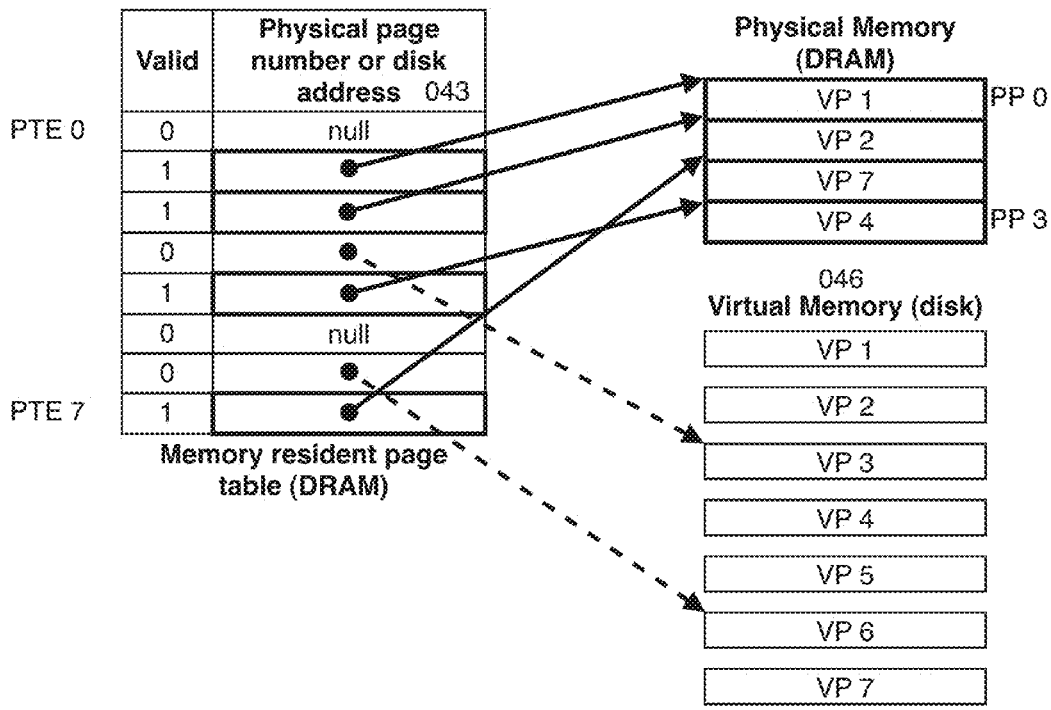
Figure 4 — Prior Art
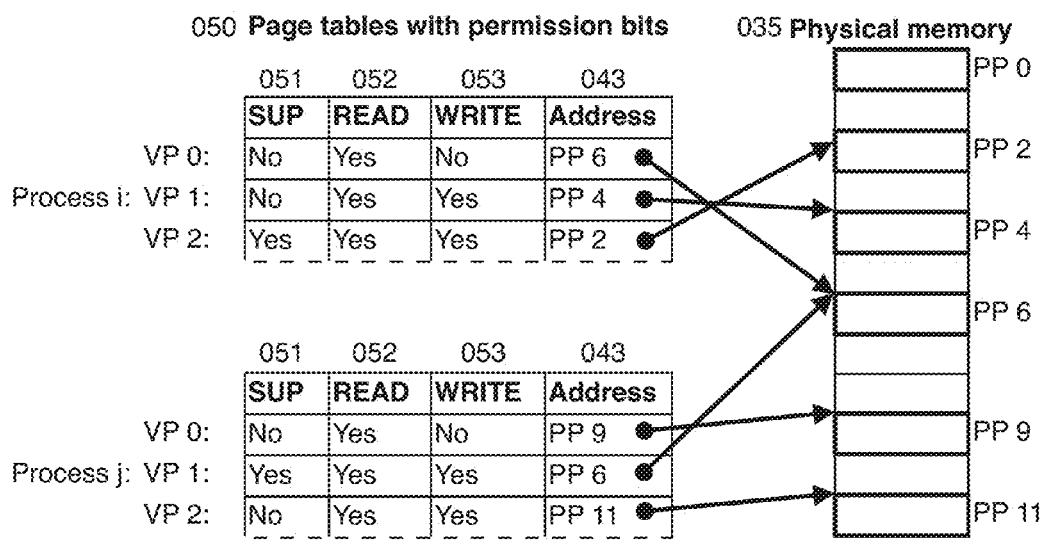
Figure 5 — Prior Art

Module aspect:
- annotated on data addresses:
  - mod-ownable-id 070.
- annotated on instruction addresses:
  - mod-owner-id 071.

Figure 6

Reference aspect:
- annotated on data addresses:
  - obj-version-number 080.
  - refable-target-flag 081.
- annotated on pointers:
  - time address bits 082.
  - ref-flag 083.
  - ref-retainable-flag 084.
  - ref-writing-flag 085.

Figure 7

Agency aspect:
- register:
  - current-agent-id 090.
- instructions/operations on an object:
  - sync(object) 091.
  - unsync(object) 092.
- annotated on data addresses:
  - agent-gate-id 093.
  - agent-gate-readable-str-suff-len 094.
  - agent-gate-syncable-str-suff-len 095.
  - agent-gate-sync-flag 096.
- alternative to agent-gate-sync-flag:
  - agent-gate-sync-state 097, having states:
    * synced 098.
    * unsynced 099.
    * open 09A.

Figure 8

HARD OBJECT: LIGHTWEIGHT HARDWARE ENFORCEMENT OF ENCAPSULATION, UNFORGEABILITY, AND TRANSACTIONALITY

REFERENCE TO RELATED APPLICATIONS

This is a continuation patent application of U.S. Pat. No. 9,569,612, entitled "Hard Object: Lightweight Hardware Enforcement of Encapsulation, Unforgeability, and Transactionality", which issued Feb. 14, 2017 and which claimed benefit of provisional application Ser. No. 61/782,363, filed Mar. 14, 2013, entitled "Hard Object: Lightweight Hardware Enforcement of Encapsulation, Unforgeability, and Transactionality". The aforementioned applications are hereby incorporated herein by reference.

The subject matter of this application is related to U.S. Pat. No. 8,364,910, entitled "Hard object: hardware protection for software objects", which issued on Jan. 29, 2013, US Published Application 2012/0151184, entitled "Hard Object: Constraining Control Flow and Providing Lightweight Kernel Crossings", published on Jun. 14, 2012 and now abandoned, and US Published Application 2013/0283017, entitled "Hard Object: Constraining Control Flow and Providing Lightweight Kernel Crossings", published on Oct. 24, 2013. The aforementioned patent and published applications are hereby incorporated herein by reference.

FIELD

This work relates to improvements in microprocessor hardware architecture providing
- module isolation and single-address space operating systems,
- capabilities and capability-based operating systems, and
- transactions, in support of
- software correctness, specifically the enforcement of invariants, and
- computer security, specifically protecting parts of programs from each other within a single process.

1 BACKGROUND

Engineers who build machines made of atoms (rather than of software) rely on locality of causality to make machines mostly safe in the presence of failure or attacks: cars have a firewall between the engine and the driver; houses have walls and a lockable door between the inside and the outside. However, computer hardware engineers have worked very hard to eliminate all locality of causality within a computer: that is, on a modern computer, within any given process, any instruction can access any data in the entire address space of the process. Hardware engineers did this because giving the software engineers freedom to use any instruction to access any data makes it very easy to write programs that do what you really want; however having this much freedom also makes it very easy to write programs that do what you really do not want. Although software engineers separate programs into modules (code that exclusively maintains the invariants of its data), they lack appropriate fine-grain hardware primitives with which to efficiently implement enforcement of this separation. This state of affairs contributes to the problem that. "machines made of software" (programs) tend to be much less reliable than machines made of atoms.

1.1 Software Correctness Generally

The punishing exactitude and overwhelming complexity of computer programs make the task of writing correct software almost impossible. Further, the stakes are high: we need only cite the title of a 2002 NIST study: "Software Errors Cost U.S. Economy $59.5 Billion Annually: NIST Assesses Technical Needs of Industry to Improve Software-Testing." Due to software bugs (a) organized crime controls millions of computers, (b) large infrastructural projects are delayed or fail, and (c) people even die. The problem is that one can never do enough testing to ensure program correctness—something else is badly wanted.

Programmers follow certain disciplines designed to reduce mistakes, a common one being "modularity" a software embodiment of locality of causality mentioned above: programs are separated into parts called "modules" where each module has its own data together with code to manage it. Further, to ensure correctness, the module's code is written in such a way as to maintain certain "data invariants": properties of the module data which are always true. Some modules manage multiple instances of their data's state, each instance sometimes called an "object" and the module the "class" of the object. While this modularity discipline works well, current computer hardware systems do not protect a module within a program from any possibly errant or malicious behavior of other modules that may violate the module's boundaries: see FIGS. 1 and 2 for examples of one module attacking the data of another. Therefore all modules are vulnerable to the threat of a single mistake, or a deliberate attack, from any one module: the correctness of the whole program is extremely brittle.

1.1.1 Static Analysis

Even when all of the authors of a program are cooperating, even basic partial correctness properties of a program are hard to ensure. There is a sub-field of Computer Science called "static analysis" which amounts to using an analysis program to read in a target program as its input and then attempt to ensure that no matter what input is given to the target program when it runs, certain kinds of errors cannot occur. (This kind of analysis is called "static" because it only examines the program, in contrast to a "dynamic" analysis which examines the program running with a particular input.)

Static analysis of program is quite difficult. It can be made much easier if the hardware upon which the programs run restricts the potential behavior of the program. Putting code into modules and constraining code to operate only on data of its own module is one way to do that. Constraining code that has access to the super powers of kernel mode (see below) is another.

1.2 Modern Computers Generally

Modern microprocessors are organized in a fairly standard way. A very readable and thorough reference on this topic is Randal E. Bryant and David R. O'Hallaron "Computer Systems: A Programmer's Perspective" Prentice Hall 2003; for brevity we refer later to this reference as "BO-2003". At a high level of abstraction, a single-core microprocessor consists of a central processing unit 031, a random access memory 035, and peripherals.

The "central processing unit" (CPU) performs one of a fixed set of actions one after another according to the instructions of a program, much as a very reliable, tireless, obedient, and utterly unimaginative person might theoretically follow a detailed set of instructions. The CPU has a small amount of scratch space called "registers"; typically there are on the order of 100 or fewer registers to a CPU. Further, some registers ("CPU status registers") hold special CPU "status" bits or fields which indicate the current mode of the CPU (such as user vs kernel mode; see below) or other properties of the current state of execution. Some registers are exposed to the program; others are for internal use and can be used for purposes such as saving internal temporaries for the duration of an instruction.

The "random access memory" (RAM) is a passive device which maps (1) an "address" to (2) a "datum" stored in a cell at that address, much as cubbyholes on a wall map each cubbyhole's number to the cubbyhole's contents. (While RAM size is also fixed, it is typically on the order of a billion (1 Gigabyte) cells.) The CPU may either:

(1) "load": read information to a register from a memory cell at a given address, or
(2) "store": write information from a register to a memory cell at a given address.

The computer's CPU/RAM core is also connected to "peripherals": external devices enabling interaction with the outside world, such as disk drives, displays, keyboards, mice, etc. To allow a program to interact with these devices, the hardware has either (1) special instructions for sending data to or receiving data from them, or (2) "memory-mapped I/O": special RAM cells repurposed by the hardware such that writing or reading from these cells interacts with the device (rather than storing the data, as RAM cells would usually do).

A computer is typically designed to move several bits around together in a block, often called a "word". A computer is characterized by the number of bits in its word, its "word size", much as an engine is characterized by the total volume of its cylinders. Typical modern computers have 32-bit or 64-bit words and are therefore referred to as "32-bit machines" or "64-bit machines" respectively. For specificity we speak below of a 32-bit machine but nothing prevents the same ideas from application to machines of other word sizes, such as 64-bits.

1.2.1 Software

Information stored in RAM cells can be interpreted as either "data" or as "program", as follows. There is one special CPU register called the "program counter" (PC) which contains an index into RAM where the next instruction to be followed by the CPU is held. The operation of the computer typically works as follows to "execute" a program:
(1) load the contents of the RAM cell pointed to by the PC,
(2) interpret that data as an "instruction" and follow that instruction.
(3) increment the PC (unless the instruction set it to a new value),
(4) repeat.

"Instructions" to the CPU are typically of one of the following kinds: (a) a data "access", which is either a "read" (or "load") of data from RAM into a CPU register, or a "write" (or "store") of data from a CPU register into RAM, (b) a logical, fixed-point-arithmetic, or floating-point-arithmetic operation on two registers, or (c) a "jump/branch" which sets the PC to a new value, sometimes only if a certain register has a certain value. Such collections of instructions are called "programs" as opposed to the "data" on which they operate. Instructions plus data is called "software", bits, as opposed to the "hardware", a machine made of actual atoms, which interpret the software.

Writing and maintaining programs at the low abstraction level of these very small steps tends to be tedious, error prone, and mind-numbing. Therefore, programs are typically written in higher-level "programming languages" providing more useful constructs with which to construct programs. One of the most useful constructs is the "function": a re-usable sub-program; a function has an "interface" specifying the format and meaning of data "argument(s)" passed as input and "return value(s)" obtained as output (note that hardware instructions and operations can also take "argument(s)"). Programs written in these higher-level languages are translated into executable machine instructions by a special program called a "compiler". Even after a function is compiled however, the resulting low-level instructions often occur in a contiguous block or can be made to occur in a contiguous block by the compiler, if desired.

1.2.2 Multi-Processing and the Kernel

Special software called the "kernel" runs in a special CPU mode called "kernel mode" which gives it extra powers over normal "user mode": (1) some data can only be accessed in kernel mode, sometimes indicated by annotating that data with a SUP (supervisor) bit (see FIG. 5, discussed further below), (2) some instructions must be run in kernel mode or have more powers when run in kernel mode, (3) I/O (input/output) devices typically must be accessed in kernel mode (either through special instructions or by a technique called "memory-mapped I/O" where accesses to certain memory addresses are intercepted and interpreted by hardware as access instructions to particular devices); if an instruction attempts to violate these constraints, the CPU faults.

A "multi-processing" computer can run more than one program at once, where each instance of a running program is called a "process". The kernel uses its powers to manage processes, such as putting them to "sleep" when a resource is requested and "waking" them up again when that resource is available.

Much like a city government, the kernel (mayor) coordinates with further special "software libraries" and "utility programs" (public servants) to: (a) provide commonly-needed but often messy utility services for the processes (citizens), such as interfacing to a particular kind of disk drive, and (b) protect the processes from each other (more on this below). Taken together the kernel and these utility libraries and programs are called the "operating system" (OS) (the city government in our metaphor). Users ask for services using a special hardware instruction called a "system call" or "kernel crossing".

Whereas the kernel, just like a government, is the only agent with the power to take certain special actions, the kernel can take actions at the request of user processes if it determines that the user is allowed to take the action. That is, the hardware will allow certain operations only when in kernel mode, however these operations may be "wrapped" with a system call to allow the user to request the kernel to do the operation; one example is intermediating between user programs and hardware peripherals.

Further it is important to note that, just as in real life, asking the government to do something for you is slow; that is, for a user program to do a system call/kernel crossing is much slower (usually at least an order of magnitude slower) than for a user function to simply call another user function. Therefore reducing the number of kernel calls in a program is an important efficiency concern.

1.2.3 Operating System

The kernel is sometimes called "the executive". This usage continues our metaphor of the computer as a city: just as not all of the services provided by a city are provided directly by the office of the executive, not all of the services that users expect to have provided run in kernel mode. The entirety of the services provided to the user is called the "operating system"; it consists of (1) the kernel executive plus (2) other "trusted system software/programs" which provide services but do not run in kernel mode.

One of these trusted system programs is called the runtime "linker-loader": it loads programs into memory from the disk and prepares them to run. Modern formats for encoding executable programs include facilities for annotating parts of programs with meta-data; some of these annotations can be interpreted as instructions to the linker-loader. For simple programs, there may not be much to do, but some programs link in other modules at runtime, and so this process can be complex in that case. One service that the Java linker-loader provides is running a "verifier" that checks if the code that is about to be run adheres to certain rules which allow that code to be safely run even if that code is untrusted.

1.3 Memory Management Generally

Globals: A program that needs only a fixed amount of memory during its run can allocate all of that state in one place at the start; such state is called "global" state (it is globally associated with the whole program) and is the first of three separate parts into which a process's memory is organized.

Stack: A particular function of a program needs its own local/temporary memory, called its "frame". A "caller" function, $f$, may invoke a "callee" function, g, to solve a sub-problem; during the execution of g, the execution of $f$ is suspended. The frame of memory for the execution of g is allocated immediately below (typically) that of $f$, and when g is done, the memory space that was g's frame may be re-used by a later call. That is, the frames "push" on and "pop" off, like a stack of plates, and so this second part of memory is called the "stack". Note that since each function call has its own frame, a function $f$ may even call itself and the operation of the two instances of $f$ do not mutually interfere. Some special registers help the program stay located within the stack: (a) sometimes a "frame-pointer" is used to point to the top of the temporaries of the current frame (typically where the arguments stop and the temporaries start), (b) usually a "stack-pointer" is used to point to the "top" of the stack, that is to the next free word (or last used word) on the stack. By convention, the stack usually grows down in memory, leading to the potentially confusing invariant that the "top" of the stack has the "lowest" address and in particular is lower than the "top" of the frame.

Heap: Sometimes a program requires long term "data-structures" (that need to last longer than a stack frame) also do not fit into the fixed-sized global state. There is an area of memory managed by a system "memory allocator" library to which a program can make a request to have a specific amount of contiguous addresses or "space" reserved or "allocated" for a particular use. The library finds some available unused space and returns its initial address called a "pointer to" the space. Once in use for a specific purpose the space is typically called an "object". When an object is no longer needed it can be "deleted" or "freed" for re-use by making a different call to the same memory allocator library. This third part of memory where such objects are allocated and freed has no simple organizational structure and is called the "heap". When accessing the data pointed to by an object by a pointer, we are "accessing (reading or writing) through" the pointer.

1.3.1 Virtual Memory

Figure 10:
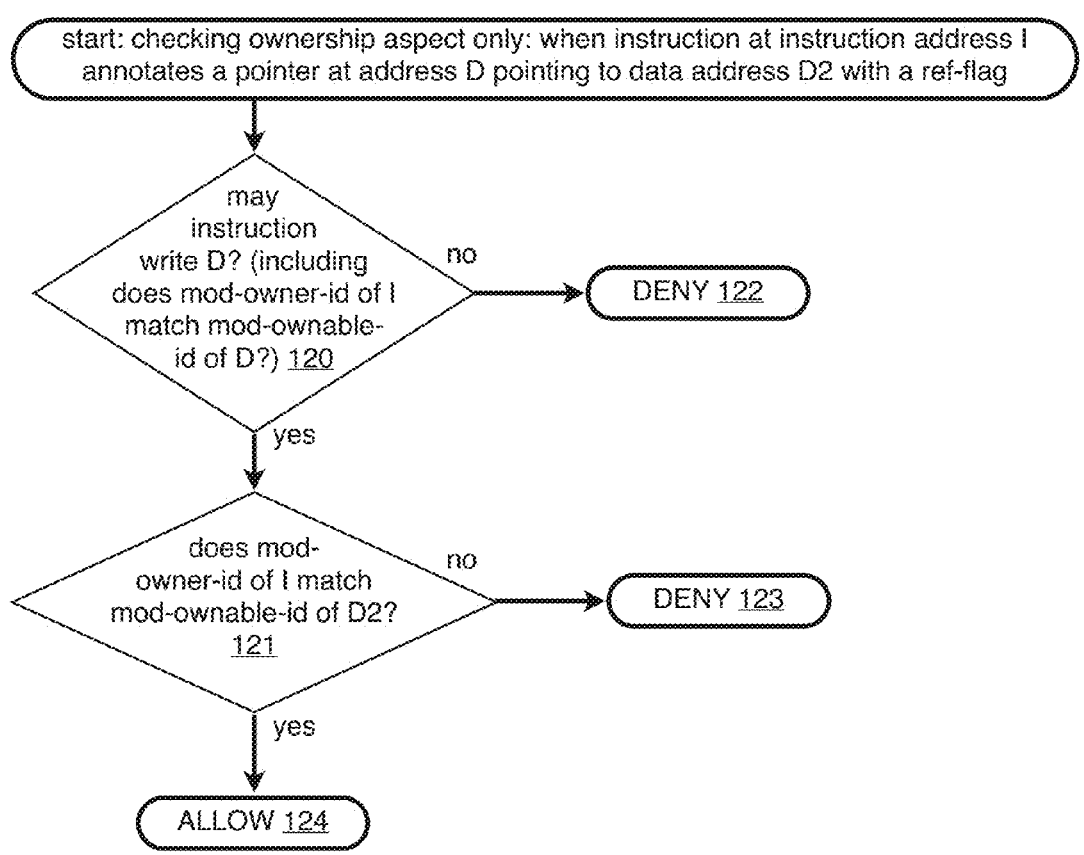

A problem arises in that there is sometimes not enough physical memory 035 to store all of the data of all of the running processes. The usual solution is a scheme called "virtual memory". Quoting [BO-2003, Section 10.1 "Physical and Virtual Addressing" ] (Note that any and all editing is in square brackets; emphasis of non-square-bracket text is in the original):

[M]odern processors designed for general-purpose computing use a form of addressing known as virtual addressing. (See figure [FIG. 3] [which is a copy of [BO-2003. FIG. 10.2]).

With virtual addressing, the CPU accesses main memory by generating a virtual address (VA), which is converted to the appropriate physical address [043] before being sent to the memory. The task of converting a virtual address to a physical one is known as address translation . . . . Dedicated hardware on the CPU chip called the memory management unit (MMU) translates virtual addresses on the fly, using a look-up table stored in main memory whose contents are managed by the operating system.

1.3.2 the Memory Hierarchy

Thus the MMU 033, in cooperation with the operating system, stores some of the data from virtual RAM on physical RAM 035 and the rest on an external disk drive 046. Any process requesting access to data that is actually on disk is paused, the data is brought in (often requiring other data to be sent out), and then the process re-started. To support this feature, memory is grouped into "pages" that are moved in and out as a whole. Pages may be of different sizes, but in current practice 4-kilobytes is typical and for specificity we speak of this as the page size, though other sizes will work. The external device that stores the pages that are not in RAM is called the "swap" device.

We can see at this point that there are many kinds of memory, some with fast access and small capacity, some with slow access and large capacity, and combinations in between. These kinds of memory are arranged in "layers", the fast/small layers used when possible and the slow/large layers used when necessary, as follows. (1) Most CPU instructions use CPU registers, access to which is very fast. (2) When the registers are full, the program resorts to using RAM, which is slower, but much larger. RAM actually (usually) has at least two layers: (2.1) small amounts of fast memory where frequently-used RAM address/data pairs are stored called the "cache", and (2.2) normal RAM. Moving data between the cache and RAM is (usually) handled by the hardware. (3) As described above, when RAM is full, the operating system resorts to using a swap disk, which has huge capacity but is far slower still. (4) Some people may still back up their disks to tape. This whole system is called the "memory hierarchy".

1.3.3 Page Tables and Page Meta-Data

The MMU and/or OS clearly must track which virtual pages map to which physical pages or disk blocks. That is, for each page of data, "meta-data", which is data about data, is kept. Quoting [BO-2003, Section 10.3.2 "Page Tables"]:

FIG. 4 [which is a copy of [BO-2003, FIG. 10.4]] shows the basic organization of a page table. A page table is an array of page table entries (PTEs). Each page in the virtual address space has a PTE at a fixed offset in the page table. For our purposes, we will assume that each PTE consists of a valid bit and an n-bit address field. The valid bit indicates whether the virtual page is currently cached in DRAM. If the valid bit is set, the address field indicates the start of the corresponding physical page in DRAM where the virtual page is cached. If the valid bit is not set, then a null address indicates that the virtual page has not yet been allocated. Otherwise, the address points to the start of the virtual page on disk.

The example in figure [FIG. 4] shows a page table for a system with 8 virtual pages and 4 physical pages.

Two virtual pages (VP 1, VP2, VP4, and VP7) are currently cached in DRAM. Two pages (VP 0 and VP 5) have not yet been allocated, and the rest (VP 3 and VP 6) have been allocated but are not currently cached.

1.3.4 Process Address Spaces

Another problem arises in that if all of these application processes use the same RAM it is difficult for them to cooperate in such a way as to not write on each other's data. The virtual-memory solution is for the operating system and hardware to present an illusion (or abstraction) that each process is the only process running on the computer and has all of RAM to itself; this abstracted RAM is the process's "(virtual) address space". Quoting [BO-2003, Section 10.4 "VM as a Tool for Memory Management"]:

To this point, we have assumed a single page table 050 that maps a single virtual address space to the physical address space. In fact, operating systems provide a separate page table, and thus a separate virtual address space, for each process.

Note however that sometimes multiple "lightweight processes" or "threads" are run in the same address space even on a machine that also runs processes in separate address spaces. One common design is that the kernel/operating system also manages these threads and another design is that user-mode (not kernel) "thread manager" software within a process manages them.

1.3.5 Memory Protection

Virtual memory thus prevents processes from accidentally or deliberately overwriting each other's data or that of the operating system itself. This protection aspect of virtual memory has become quite important. Quoting [BO-2003, Section 10.5 "VM as a Tool for Memory Protection"]:

Any modern computer system must provide the means for the operating system to control access to the memory system. A user process should not be allowed to modify its read-only text section [that is, its executable program code]. Nor should it be allowed to read or modify any of the code and data structures in the kernel. It should not be allowed to read or write the private memory of other processes, and it should not be allowed to modify any virtual pages that are shared with other processes, unless all parties explicitly allow it (via calls to explicit interprocess communication system calls).

As we have seen, providing separate virtual address spaces makes it easy to isolate the private memories of different processes. But the address translation mechanism can be extended in a natural way to provide even finer access control. Since the address translation hardware reads a PTE each time the CPU generates an address, it is straightforward to control access to the contents of a virtual page by adding some additional permission bits to the PTE. Figure [FIG. 5] [which is a copy of [BO-2003, FIG. 10.11]] shows the general idea.

In this example [FIG. 5], we have added three permission bits to each PTE. The SUP 051 bit indicates whether processes must be running in kernel (supervisor) mode to access the page. Processes running in kernel mode can access pages for which SUP is 0. The READ 052 and WRITE 053 bits control read and write access to the page.

If an instruction violates these permissions, then the CPU triggers a general protection fault that transfers control to an exception handler in the kernel. Unix shells typically report this exception as a "segmentation fault".

As you can see, prior art systems usually partition pages into (a) "text" (or executable program code) and (b) "data". After the program has been loaded into memory, text pages are marked to be executable and read-only by setting the permissions bits in the page table; similarly data pages are usually marked to be non-executable and read-write, though read-only data is possible.

1.3.6 No-Execute (NX) Bit

An operating system with support for the NX bit may mark certain areas of memory as non-executable. The processor will then refuse to execute any code residing in these areas of memory. The general technique, known as executable space protection, is used to prevent certain types of malicious software from taking over computers by inserting their code into another program's data storage area and running their own code from within this section. Intel markets the feature as the XD bit, for eXecute Disable. AMD uses the name Enhanced Virus Protection. The ARM architecture refers to the feature as XN for eXecute Never; it was introduced in ARM v6. While such a system does annotate an entire area of memory as non-executable, it does not allow (1) modification of the operation of only specific kinds of instructions, nor (2) modification of the operation of instructions while they continue to operate.

1.4 Control Flow Generally

Recall that the program counter register points to an address on a text page. At each memory cycle, the data pointed to by the program counter is loaded into the CPU and interpreted as an instruction to be executed by the CPU. The default behavior is that after the instruction is executed, the program counter is incremented by the size of the instruction and the process repeats. Recall further that some instructions can change the program counter so that the "control flow" of execution is transferred to another part of the program. See BO-2003, Section 3.6 "Control".

The "control transfer" caused by such a "control flow" instruction may be conditional upon the value of another register. If such a change is unconditional it is usually called a "jump" and if conditional, it is usually called a "branch". Another kind of control transfer is the function/procedure call, detailed in the next section. A function call is initiated by a "call" instruction (in the "caller" function) and terminated by a "return" instruction (in the "callee" function).

How the control flow instruction should modify the program counter in the event of a transfer is specified by a target argument to the control flow instruction. This target argument to a jump, branch, or call instruction can be a constant embedded into the text page; in this case the control transfer is called "static"; this static argument may be specified as an absolute address or simply as an offset to the current address. Alternatively, the argument to a jump, branch, or call instruction can specify a register containing a value to be used as the new program counter; in this case the control transfer is called "dynamic". (Note: we mean the target argument to the hardware instruction; software function calls also take function arguments; that is, a call instruction initiating a function call has a target argument while the function it initiates separately takes function arguments.)

The return instruction is a bit different. The previous matching call instruction (which made the function call from which the return instruction is returning) pushed the return address to which the call should return onto the stack; the return instruction finds that argument on the stack and uses that as its target argument.

1.4.1 Function/Procedure Calls

Programmers find it convenient for a function to be able to (1) suspend its execution in order to call another function to compute some sub-part of the execution and then (2) resume the first function where it left off upon the return from the sub-function. Note that even these sub-functions may be suspended in order to call further sub-sub-functions, and so on. At the point of call, the function suspended is called the "caller" and the sub-function called is called the "callee". See BO-2003, Section 3.7 "Procedures".

Recall that each function needs its own space for its variables that is preserved across calls to sub-functions; this space is called a (stack) frame. The suspend-resume nature of function calls makes it very natural to stack these frames so that those of suspended functions remain present in memory as new frames are added (traditionally below in memory) and removed as sub-functions call and return. That is, as sub-functions are called, the top of the stack of frames grows down (traditionally) and as sub-functions return, the top returns upward to where it had been.

Calls to sub-functions often take arguments at their point of call; for example, a function to compute the area of a circle may take the radius as an argument. Arguments are usually passed either in registers or by putting them on the stack where they appear as variables to the called sub-function. After the arguments are ready, the caller function transfers control to the callee function. Transferring control and pushing the return address is so common that there is often a special instruction for doing both called "call". An additional argument is passed to the callee which is the value of the program counter to which control should return when the callee completes: the "return address". Returning from a function by jumping to the return address stored on the stack is also often implemented by a special instruction called "return".

Note that, similarly to a jump or branch, how a call instruction should compute the new program counter to which it transfers control may be specified either (1) statically by an value fixed in the program text or (2) dynamically by the value of data in a register. The difference between static calls and dynamic calls is important as dynamic calls can be quite difficult for a programmer to constrain.

The caller and callee functions must both adhere exactly to a protocol/contract saying how to exchange this information and cooperate in several ways. The first concern is simply how to exchange information; when a caller function calls a callee function, much data is interchanged between them: (1) the arguments to the callee, (2) the address to which the callee should return when done, (3) the return value from the callee. There are at least two other concerns: (a) "caller-save" vs "callee-save": who is responsible for saving and restoring registers that the callee may wish to use that already contain values important to the caller; (b) "caller-cleanup" vs "callee-cleanup": who cleans up the temporaries left on the stack by the callee and resets the stack pointer to where it was before the call. The protocol states how these concerns are handled is called the "calling convention"; note that it has both hardware and software aspects.

Another way to implement a function call from a caller to a callee is for the body of the callee to be wholly inserted into the body of the caller at the point of call (also adjusting the renaming of variables), obviating the need for the usual kind of call/return control transfer or for the creation of a stack frame; this technique is called "function inlining" and is often performed by the compiler, but could be performed by a system linker-loader.

1.4.2 Stack Meta-Data

The stack of frames does not only hold temporary values used by the user program; each frame also holds additional data about the stack data. Recall that data about data is called meta-data, so we call this "stack meta-data". Some meta-data typically stored on the stack:

(1) The "return address": often the call instruction pushes onto the stack the address to which the subsequent return instruction should return control.

(2) The "frame-pointer": some systems maintain a register pointing at the top of the temporaries of the current frame called the "frame-pointer". Some software pushes the frame-pointer on the stack at some point during the calling sequence and restores it from the stack at some point during the return sequence.

1.4.3 Jump Tables

A jump table is an array of function pointers: the table maps an index to a function. The usual usage is that a function has an index indicating a function to be called, it uses a jump table to map the index to a function pointer and then uses a dynamic call instruction to call that function. If an entire page is devoted to holding this array then virtual memory protections can be used to protect the table in various ways, such as by making it read-only.

1.4.4 Exceptional Control Flow

Situations arise that may not have a well-defined behavior, such as dividing by zero or dereferencing a null pointer. A mechanism is provided for handling these, called "trapping to an exception handler", as follows. Each exception kind has a number. A special exception table base register points at a special jump table mapping each exception kind number to a function called the "exception handler" for that exception kind. When an exception occurs, the hardware maps the exception number through the exception table to get the address of the exception handler and then calls that handler. When this call returns, control is returned either (a) to the instruction at or (b) the instruction after the one that trapped to the exception, depending on the exception kind. See BO-2003, Section 8.1 "Exceptions", Section 8.2 "Processes", Section 8.3 "System calls and Error Handling", and Section 8.5 "Signals".

1.4.5 Relationship Between Control Flow and the User/Kernel Boundary

Recall that the CPU has a special mode called kernel mode where instructions have the power do to anything on the machine. Only certain software runs in kernel mode; this software is called "the kernel". Most of the time programs are running in user mode which constrains them so that, they cannot take actions that could harm other programs, such as writing in the virtual address space of other programs or performing input or output. These actions are "dangerous": they can only be performed in kernel mode. Thus, if a user mode program wants to take one of these actions, it must make a call to the kernel to ask for the action to be taken on its behalf. See BO-2003, Section 8.2.3 "User and Kernel Modes".

The kernel data and functions live in a special area of memory that cannot even be called into when in user mode. This restriction is to protect kernel data and to ensure that kernel functions cannot be attacked by being called anywhere other than at the top of a "public" kernel function. Therefore another method must be provided for user code to request services from the kernel.

The common method is to provide "system call instruction" which generates an "system call" exception. The purpose of this instruction is not to handle an exceptional circumstance, but simply to halt the processing of the user function, switch into kernel mode, and call to the top of the system call exception handler. Before making the system call the user program puts the system call number and other arguments in registers or on the stack where they can be found. Note that the kernel has the power to simply switch itself back into user mode when desired. This transfer of control from a user mode program to the kernel is called a "system call" or a "kernel crossing". (Note that the data of the kernel is within the address space of every process but is marked as accessible only when the CPU is in kernel mode.)

The complexity of this system call mechanism makes system calls an order of magnitude (or more) slower than function calls.

1.4.6 Scheduling

Multiple "processes" can pretend to run at the same time, each in their own virtual address space. In reality, the processes usually take turns using the hardware as there are usually more software processes than hardware CPUs to go around. The kernel uses its powers to manage processes, such as putting them to "sleep" when a resource is requested and "waking" them up again when that resource is available. The part of the kernel that manages which processes run and which sleep waiting for their turn is called the "(process) scheduler".

It is possible to run multiple "threads of control" within the same address space; these are called "threads" and, similar to processes, have a "thread scheduler". Since multiple threads are all within the same address space, there must be multiple separate stacks of their function temporaries as well: however, threads usually all share one heap.

1.5 Background—Prior Art

For ease of readability, the system disclosed herein is hereinafter referred to as "Hard Object".

While reviewing the prior art pertinent to the present Hard Object work, for convenience both similarities and contrasts between the prior art and the Hard Object system are discussed together. Please see "List of Non-Patent Reference Keys", below, for the meanings of reference keys in square brackets.

1.5.1 Prior Work on Hard Object

The first article on Hard Object [WMHK-2009]. Another evaluation done of Hard Object as a class project [KCWWK-2009].

1.5.2 Intel X86 Segmented Addressing

As mentioned above, many architectures support a means of managing permissions on text and data as organized into pages. The Intel x86 architecture is one such. Quoting [I-2005]:

The concept of privilege for pages is implemented by assigning each page to one of two levels: Supervisor level (U/S=0)—for the operating system and other systems software and related data. User level (U/S=1)—for applications procedures and data . . . . When the processor is executing at supervisor level, all pages are addressable, but, when the processor is executing at user level, only pages that belong to the user level are addressable.

Virtual memory protection allows operating system and user programs to interact without danger to the operating system. However two different user modules within the same program, and therefore the same virtual address space, are not protected from one another. In contrast the Hard Object system disclosed herein can isolate two modules even if they are in the same address space.

The Intel x86 architecture, [G-2005], also supports a means of managing permissions on text addresses and data addresses as organized into "segments" which manage the association of permissions and privilege levels to both text and data addresses. Quoting [I-2005]:

The concept of privilege is implemented by assigning a value from zero to three to key objects recognized by the processor. This value is called the privilege level. The value zero represents the greatest privilege, the value three represents the least privilege . . . . [T]hese levels of privilege can be interpreted as rings of protection. The center is for the segments containing the most critical software, usually the kernel of the operating system. Outer rings are for the segments of less critical software . . . . The processor automatically evaluates access to a data segment by comparing privilege levels . . . . [A] procedure can only access data that is at the same or less privileged level.

Note that in this prior art Intel system, there are only four such privilege levels. Further, this restriction to a small number, such as four, is pervasive throughout the design—for example, each privilege level has its own stack and so generalizing the design by increasing the number of privilege levels seems infeasible. Therefore it seems that this small number of privilege levels may constitute the maximum number of "protection domains" into which the set of modules may be partitioned (however also see a different way of using segments hypothesized below). In contrast a Hard Object system can easily have an arbitrary number of domains.

The levels of these prior art Intel domains are ordered and therefore apparently they cannot be made mutually exclusive, thus members of a domain with stronger privilege will always have access to the data of a domain with weaker privilege; in contrast the Hard Object system disclosed herein can partition domains in a mutually-exclusive way.

In most systems in the event of a function call, arguments are passed from caller to callee on the stack, but in the Intel system when functions call across privilege levels the function arguments must be copied from the stack of one privilege level to the stack of the other. In contrast, due to the Hard Object stack protection mechanism, a call across a protection domain in a Hard Object system requires no such copying.

In the above-cited Intel system, instructions that manage the segment permissions can only be executed in kernel mode; in contrast Hard Object allows any module to transfer "ownership" of memory addresses to another module without the need to run a privileged instruction or make a system call—where "ownership" is a concept introduced below to indicate the right of code to access memory addresses and/or also the right to transfer this right to other code.

In the above Intel system, segments of memory can be marked with permissions (or the absence of permission) such as "read-only" or "executable"; however there are major design differences between Intel segments and Hard Object owner module-ids. An Intel segment is associated with the current CPU state and refers to a range of addresses that may be accessed; therefore when a protection boundary is crossed, instructions must execute to change the segment registers that are the embodiment of this CPU state. In contrast a Hard Object owner module-id is associated with an address itself and selects a subset of program text that may access this address; this owner module-id is checked whenever an instruction accesses an address and therefore in a Hard Object system when a protection boundary is crossed by the program counter no kernel calls need be made.

1.5.3 Intel Itanium Protection Keys

The Intel Itanium architecture [Intel-Itanium-2010] provides a mechanism for protecting memory called "protection keys" [Intel-Itanium-2010, volume 2] that has two components:

(1) Each Page Table Entry is annotated with a field called a "protection key"
(2) The CPU is provided with 16 additional "protection key registers".

When protection keys are being used, when the CPU attempts to access a page, the hardware checks if the value of the protection key field of the PTE of a page matches the value any of the protection key registers; if not, the access faults: if so they access may be allowed as further mediated by other bits annotating the protection key registers.

Quoting [Intel-Itanium-2010, Section 4.1.3]:
Protection Keys provide a method to restrict permission by tagging each virtual page with a unique protection domain identifier.

Quoting [Intel-Itanium-2010, Section 5.1.2.1]:
it is the responsibility of the OS to use protection keys and the protection key registers (PKRs) to enforce protection.

Considering the above quotes, it seems that it must be the case that changing a protection key register requires a system call; unfortunately we cannot find a direct quote in the documentation that states this explicitly, but without this requirement protection keys would not "enforce protection" [emphasis added] of data.

Therefore the way in which software seems to be required to use Intel Itanium protection keys differs considerably from the way software can use Hard Object owner module-ids, as follows. A system call currently costs at least a order of magnitude more than a function call; in contrast, in a Hard Object system, when the control flow moves from the code of one module to that of another, the cost incurred is no more than that of a function call, as, due to the Hard Object hardware mechanism, the data pages that may be accessed change automatically with the movement of the program counter.

Most software tends to exhibit a property where most of the computation time is spent in an "inner loop"; therefore introducing a delay in that inner loop can easily change the performance of the software by an order of magnitude. Should an inner loop of a program cross a module boundary (1) a Hard Object system would still be performant, whereas (2) a system attempting modularity separation using Intel Itanium protection keys could easily lose an order of magnitude in performance due to the cost within the inner loop of the system calls or fault handling required to change either (a) the protection key registers or (b) the protection keys on the data pages being accessed.

1.5.4 Mondriaan Memory Protection

Of particular interest, Mondriaan Memory Protection, [WCA-2002; WA-2003; W-2004], and U.S. Pat. No. 7,287,140 Asanovic et al, attaches meta-data to addresses at the word-granularity using a special hardware "permissions tables".

Protection Domains

In the Mondriaan design there is a concept of "protection domains". Each domain has its own "permissions table" (plural permissions tables) which attaches "permission values" meta-data to memory addresses. At any particular time, a single protection domain is active, as indicated by the current value of the Protection Domain ID register. Note that the active permissions table must be swapped out on cross-domain calls. This is a heavyweight activity compared to a traditional function call. The Mondriaan scheme does not provide any specific efficient means to perform this swapping. Quoting [WA-2003]:

We believe CPU designers will be motivated to accelerate cross-domain calls to enable the benefits of protected execution.

In contrast, Hard Object meta-data refers to specific module-ids and, indirectly, their associated subsets of instruction and data addresses. The program counter changes naturally at a function call as part of the calling process and thus little extra work is required when the call also crosses a protection domain boundary. Said another way, the Mondriaan Memory Protection mechanism requires considerably more state to be changed (in the form of a change from one table to the other, with the potential flushing of corresponding caching structures) as a result of a protection boundary change than does Hard Object.

Stack Protection Mechanisms

The Mondriaan design discloses a method of stack data protection using a "frame base" register and a "stack limit" register [WA-2003, Section 3.3]. The Hard Object design does something possibly similar with slightly different names ("caller-protect." and "stack-limit"). However the Mondriaan mechanism for performing a function call across domains requires the use of a heavyweight mechanism they call "call gates" to pass information from one protection domain to another; it seems that in the Mondriaan design, data cannot even be simply passed on the stack as is traditional and fast in both prior art systems and the Hard Object system. Quoting [WCA-2002, Section 3.8]:

Parameters are passed in registers. More elaborate data structures are passed using a very simplified form of marshalling which consists of the caller traversing the data structure and granting appropriate permission to the provider domain . . . . If two domains call each other frequently, they can copy arguments into buffers which are properly exported.

In contrast, a cross-domain function call in Hard Object system requires no such call-gate mechanism and allows very fast traditional use of the stack to (1) pass data as arguments and (2) return data as return values on the stack even when the two functions are in mutually untrusting modules.

Ownership and Managing Permissions

The Mondriaan design anticipates the Hard Object rule of allowing only an owner to have the ability to set the owner of the address to another module (be careful reading their articles as they actually they use the word "own" to mean more than one thing; I cite the meaning closest to that of Hard Object). [WCA-2002, Section 3.1]: "Every allocated region of memory is owned by a protection domain, and this association is maintained by the supervisor." [WA-2003]: "Only the owner of a memory region may revoke permissions, or grant ownership to another domain." Note however that the Mondriaan design requires these actions taken by an owner be done using a kernel crossing: [WA-2003] "The MMP supervisor software can enforce additional memory usage policies because all calls for permissions manipulation are made via the supervisor." However, in contrast Hard Object does not require a kernel crossing to change the owner of some addresses, as a user-mode hardware instruction is provided for this purpose.

1.5.5 Nozue et al.

Of particular interest, [OSSNMS-1992] and U.S. Pat. No. 5,890,189 Nozue, et al. (which is a continuation of U.S. Pat.

No. 5,627,987 Nozue, et al.) propose both a "capabilities" system and an "access control lists" (ACLs) system for protecting data pages.

Protection Regions Using Hardware Text Ranges

The Nozue ACLs system associates data pages and text pages that can read and write them, similar to Hard Object, as well as providing other functionality. While the Nozue design seems to contain hardware features that would provide to software the same functionality as the Hard Object owner module-id functionality—though not the Hard Object user-mode ownership transfer feature nor the user-mode integrity bit—the Nozue design contains more hardware complexity than would be needed by software designed for Hard Object hardware. For example, the Nozue design calls for a PTE to contain three access control entries and a pointer to further entries, allowing the construction of an arbitrarily-large linked list of entries which must be read at each access check. In contrast, in the Hard Object design only requires a constant amount of state to be annotated onto a PTE and further all Hard Object checks read only a constant amount of data during the check.

Ownership and Managing Permissions

In the Nozue system it seems that setting the ACLs on a page requires a call into the kernel. In current microprocessor architectures and operating systems, kernel calls are expensive (however they do further suggest a change to a Single Address Space Operating System where kernel calls might be cheaper). In contrast the Hard Object method of transferring address ownership uses a single user-mode hardware instruction (the set-owner-module-id instruction).

The Nozue design does not seem to provide any equivalent of the Hard Object integrity bit.

Stack Protection Mechanisms

The Nozue system also does not seem to provide any method for protecting the stack frame of a function in one module from the code in another module or at least not in a way that would also allow for the traditional contiguous software stack organization (where, for example, function arguments and return values can be passed on the stack): in contrast Hard Object provides a hardware mechanism for protecting the stack frame of a suspended function from an attack by the currently executing function.

1.5.6 Google's Native Client

Google's Native Client [Google-NaCl-2009] is an Open Source software project which attempts to provide isolation between different programs using purely software mechanisms. As such it differs considerably from Hard Object which offers hardware mechanisms. The Native Client project addresses some of the same software problems as Hard Object does, such as the problem of constraining dynamic control flow transfer. They constrain dynamic control transfer by requiring software to mask off the low bits of the target address of a dynamic control transfer so that the transfer can only target an address that is a multiple of, say, 32. They then ensure that instructions on such locations are executable only if a given location is a legitimate target of a dynamic control transfer. In contract, Hard Object solves this problem using a hardware mechanism that indicates which locations are legal targets of dynamic control transfers.

1.5.7 Others

U.S. Pat. No. 4,408,274 Wheatley, et. al. is a hardware capabilities system which associates capabilities to a process; Hard Object works the other way, associating data addresses and code that may operate on it. A similar contrast occurs with U.S. Pat. No. 5,892,944 Fukumoto, et al. which seems to attach their rights to threads; again, Hard Object attaches rights to addresses, not threads. In U.S. Pat. No. 6,542,919 Wendorf, et al. and U.S. Pat. No. 5,845,129 Wendorf, et al. a method is disclosed where a memory page is associated with a group of threads; again, in contrast a Hard Object system associates rights to addresses, not threads. U.S. Pat. No. 4,442,484 Childs, Jr., et al. uses privilege levels per task to protect software objects; in contrast, Hard Object requires no need of privilege levels and does not decide access at the whole-task granularity, but instead in a different way by distinguishing rights by module-ids associating instruction and data address.

U.S. Pat. No. 6,941,473 Etoh, et al. provides hardware support for detecting stack smashing; in contrast, Hard Object protects the heap as well as the stack. U.S. Pat. No. 4,701,846 Ikeda, et al. provides hardware support for separation of the heap and the stack; in contrast, Hard Object goes further and separates the heap in a fine-grain way.

U.S. Pat. No. 5,075,842 Lai and U.S. Pat. No. 5,157,777 Lai, et al. provide hardware support for marking some data as special meta-data. U.S. Pat. No. 5,075,845 Lai, et al. and U.S. Pat. No. 5,075,848 Lai, et al. provide pointers to objects stored next to permissions meta-data. In contrast, Hard Object puts its meta-data into the page table, leaving the program's virtual address space uncluttered.

U.S. Pat. No. 4,525,780 Bratt, et al. provides each software object with a 128-bit identifier; in contrast Hard Object requires no special identifiers for software objects (beyond their usual address) and objects are not even a "first class" concept in the hardware, only modules are, U.S. Pat. No. 4,434,464 Suzuki, et al. seems to associate program regions with memory regions and then seems to change access permissions on transition through a jump table when crossing module boundaries; however they require indirection through a jump table rather than allowing direct function calls and they do not seem to supply a method for protecting stack data requiring calling only trusted modules or using separate stacks; in contrast, Hard Object allows direct function calls and protects the stack temporaries of the caller from untrusted callees. Similarly, [WS-1992] proposes associating to memory pages an Access Identifier (AID) and to processes Protection Identifiers (PID) where the PIDs of a process associate protections to a page with a matching AID; in contrast Hard Object requires no such PIDs/AIDs and associates data addresses and instruction addresses, not data addresses and threads/processes.

iWatcher and AccMon, [ZQLZT-2004; ZQLZT-2004b; ZLFLQZMT-2004], check many kinds of memory accesses in a best-effort way that is different from the Hard Object system.

U.S. Pat. No. 7,134,050 Wenzel isolates the objects of each module from other modules such that the objects of a module can only be operated on only by the program text of the same module; however, modules may only communicate through a special message subsystem: "The illustrated embodiments result in a fault containment sub-environment, or set of interfaces, that surround the module instances, deliver messages, schedule execution of the module instance when a message is delivered, and manage memory key (de)activation when each instance is called." In contrast, the present Hard Object work requires no special message subsystem: modules communicate by normal function calls and no special scheduling mechanism is required.

[EKO-1995] disclose user-readable page table entries: "The page table should be visible (read-only) at application level." User-readable and writable page table entries seem to be disclosed by [HP-1998] (the emphasis is mine):

64-bit system space refers to the portion of the entire 64-bit virtual address range that is higher than that which contains PT space . . . system space is further divided into the S0, S1, and S2 spaces . . . . Addresses within system space can be created and deleted only from code that is executing in kernel mode. However, page protection for system space pages can be set up to allow any less privileged access mode read and/or write access . . . . The global page table, also known as the GPT, and the PFN database reside in the lowest-addressed portion of S2 space. By moving the CPT and PFN database to S2 space, the size of these areas is no longer constrained to a small portion of S0/S1 space. This allows OpenVMS to support much larger physical memories and much larger global sections.

The Exokernel paper, [EKO-1995], on page 4 tantalizingly refers without citation to another hardware design where there is a concept of memory addresses being owned:

Some Silicon Graphics frame buffer hardware associates an ownership tag with each pixel . . . . The application can access the frame buffer hardware directly, because the hardware checks the ownership tag when the I/O takes place.

2 BRIEF SUMMARY OF THIS WORK

HARD OBJECT is a lightweight modification to existing hardware platforms providing these properties:
  encapsulation: operations on objects are allowed only by the code of their module/class;
  unforqeability: operations on objects are allowed only through references made by their module;
  transactionality: operations on objects exhibit Isolation and Sequential Consistency.

As a result, mutually untrusting programs written in systems languages, such as C and C++, may be safely and efficiently run in the same address space. That is, we make software objects hard.

The enforcement provided by Hard Object allows for pervasively-deconstructed software designs, obtaining more reliability, due to more modularity, and more security, due to trusted code base reduction.

We may eliminate installed software: deconstruct a web browser into network and UI libraries and dispense with the myriad interpreters, simply running untrusted mobile programs natively. The enforcement works in kernel space: we may deconstruct a kernel to a micro-kernel without using message-passing. We may build a capability-based single-address-space operating system; if we retain hardware support for separate address spaces, we may run a separate OS in each and eliminate the need for a virtual machine layer. Further, using versioned references, we may greatly reduce the workload on a garbage collector (CC), thereby enabling the use of GC for a wider range of programs and with better and more predictable performance.

First-class transactionality provides a means for software to communicate to hardware when a core has exclusive access to an object. This prevents the need to monitor other caches for conflicting updates and improves the scalability of SMP systems.

Nothing is new about the desirability of these properties for providing correctness and security of software; our contribution is that we provide a lightweight way to provide them. Our insights are that (1) providing these properties amounts to enforcing locality of causality, and (2) the relevant, forms of software locality map through the architecture abstraction to natural forms of hardware locality. Thus we provide straightforward and lightweight hardware enforcement of the above software properties by enforcing natural boundaries of hardware locality.

3 BRIEF DESCRIPTION OF THE DRAWINGS

FIG. 1: The heap protection feature preventing the function evil from violating the integrity of an object of module/class A.

Figure 2:
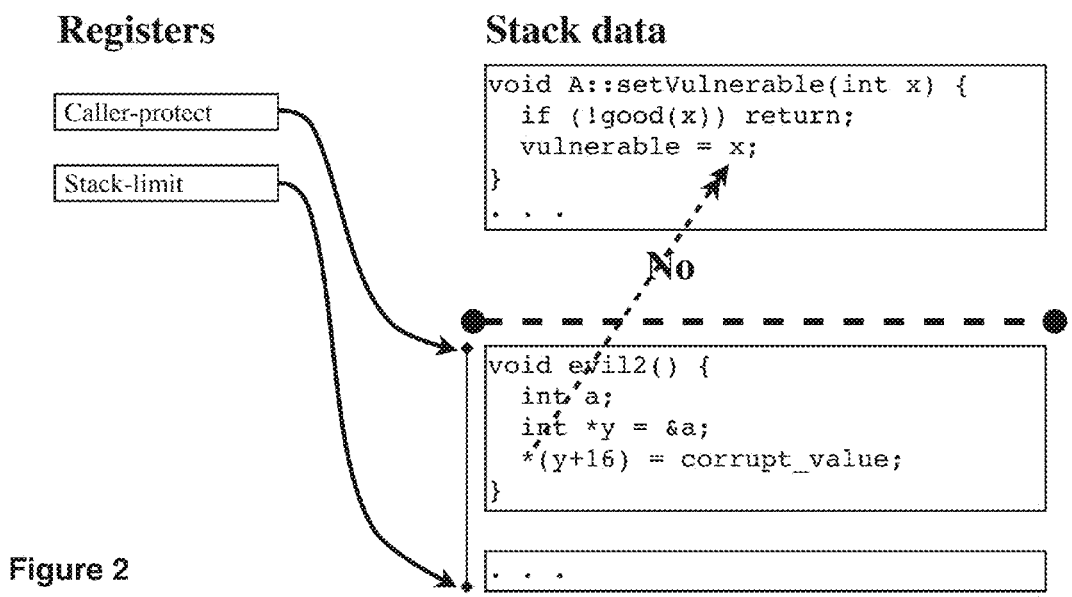

FIG. 2: The stack protection feature preventing the function evil2 from violating the integrity of the stack frame of function A::setVulnerable.

FIG. 3—Prior Art: shows the Memory Management Unit's place in the virtual-to-physical address translation process; this figure reproduced and slightly simplified from [BO-2003, FIG. 10.2].

FIG. 4—Prior Art: shows a basic page table; this figure reproduced from [BO-2003, FIG. 10.4].

FIG. 5—Prior Art: shows a virtual memory system being used to provide page-level process protections; this figure reproduced from [BO-2003, FIG. 10.11].

Figure 9:
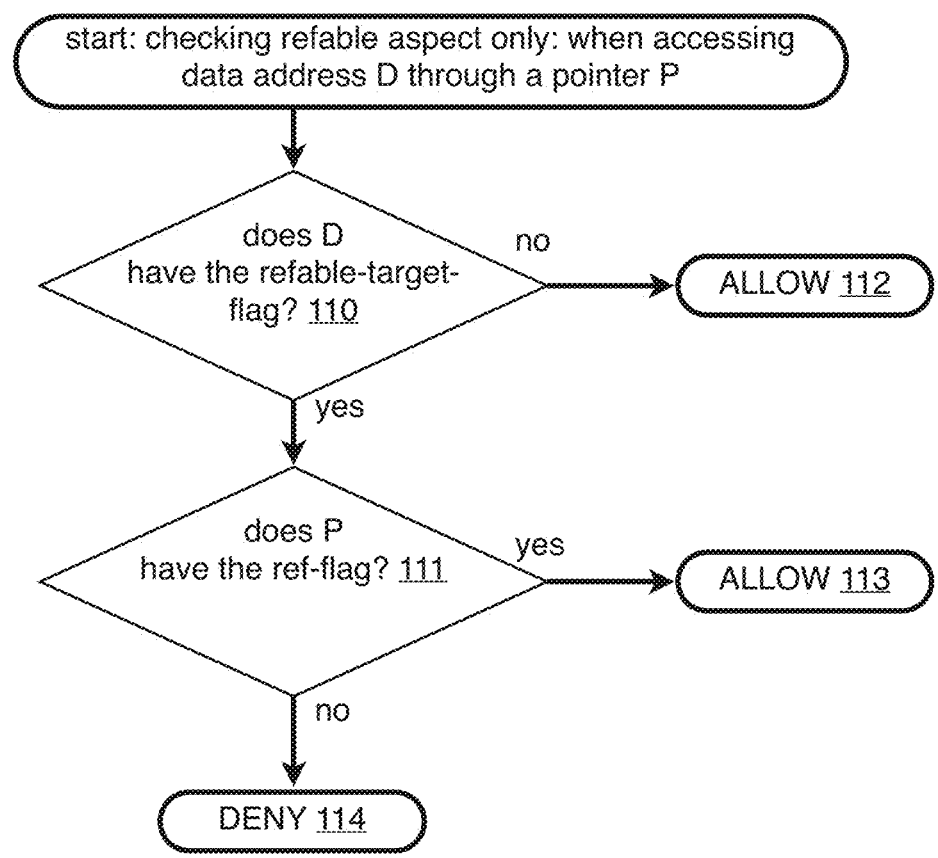
Figure 11:
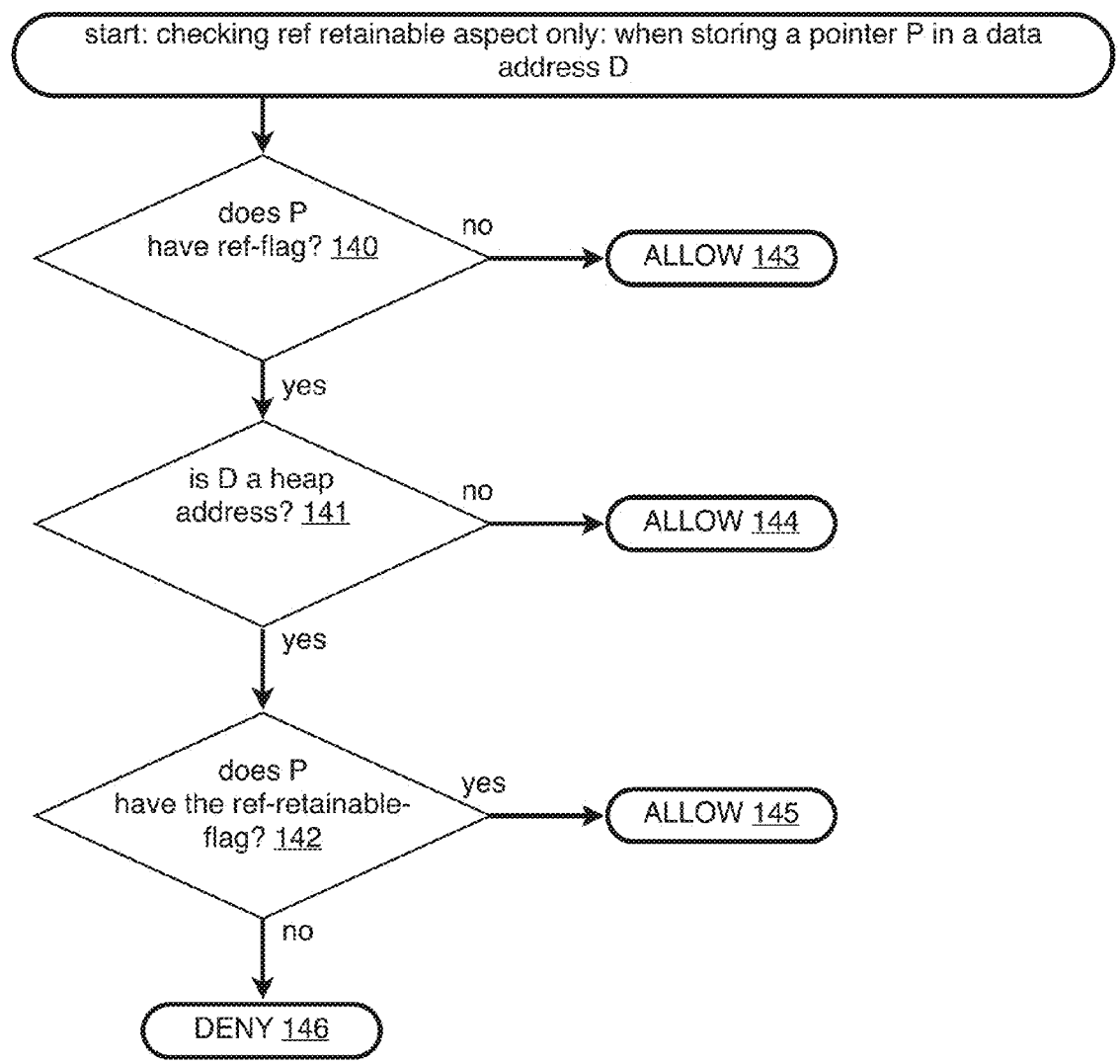
Figure 12:
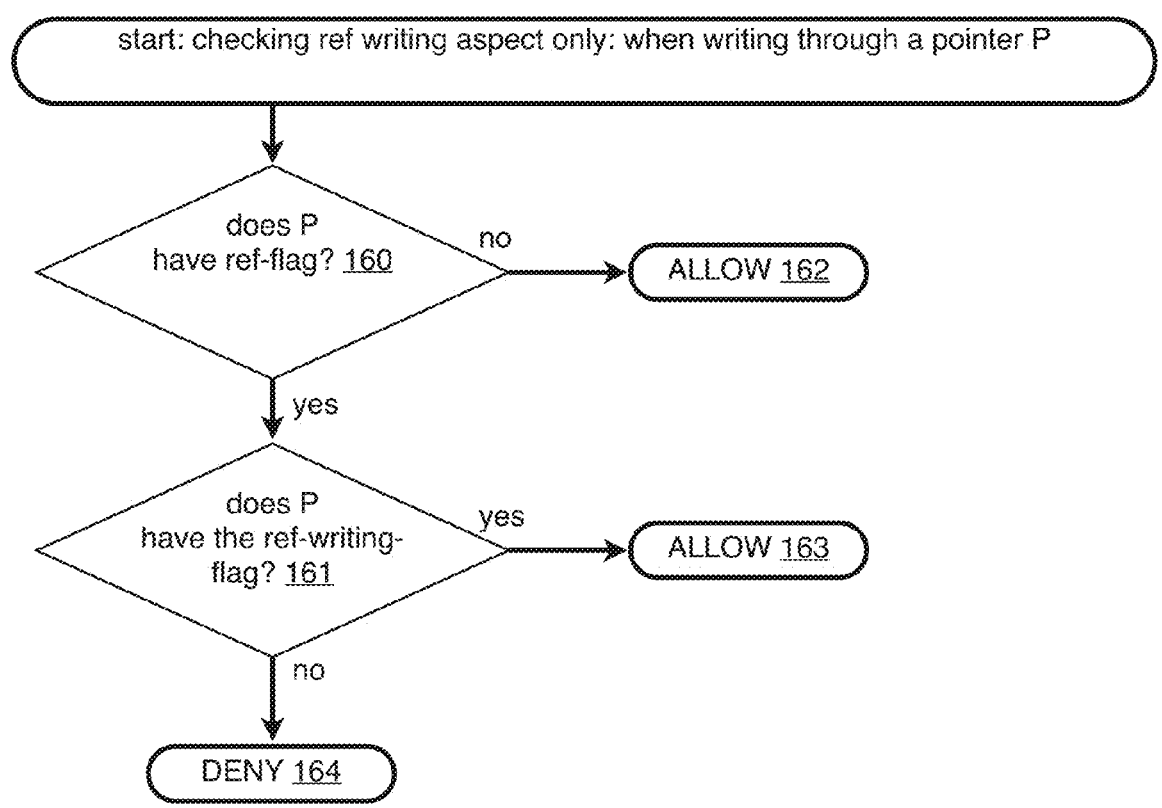
Figure 13:
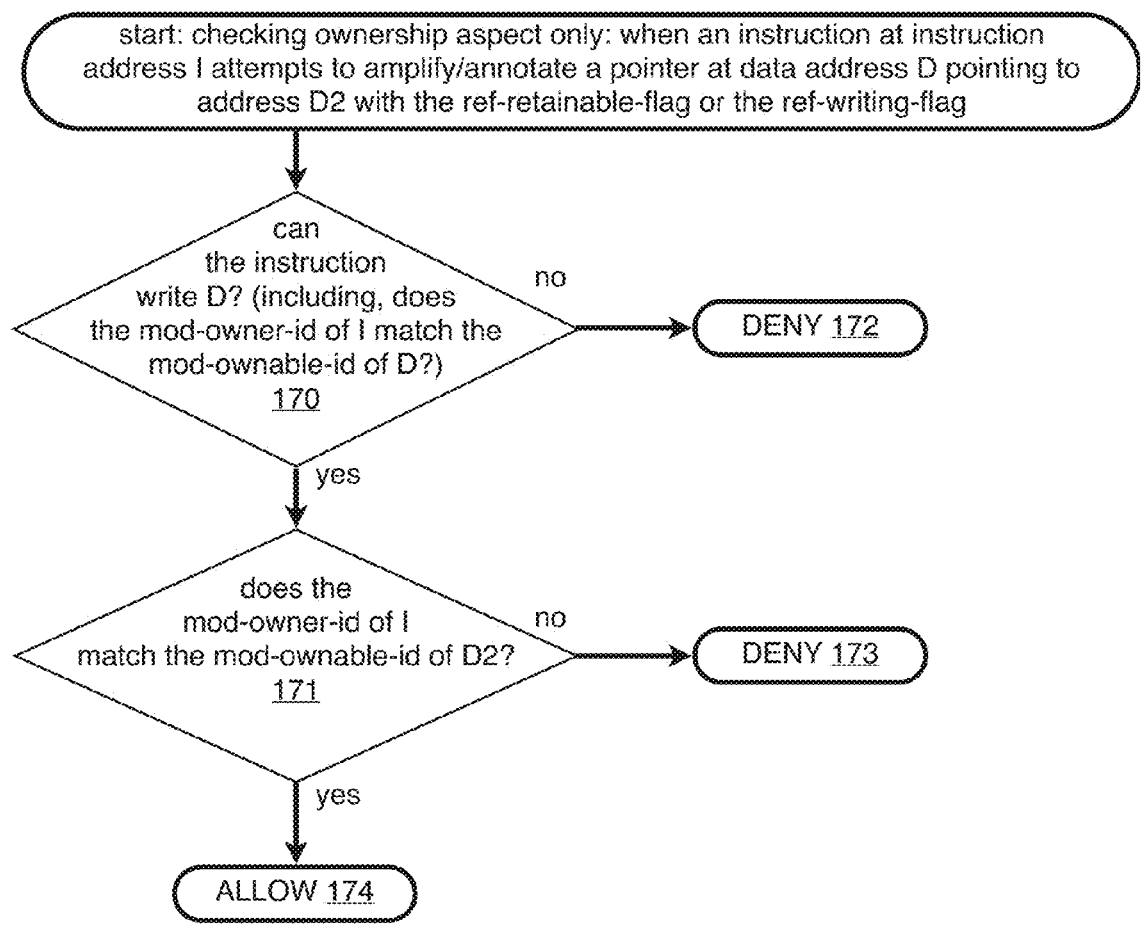
Figure 14:
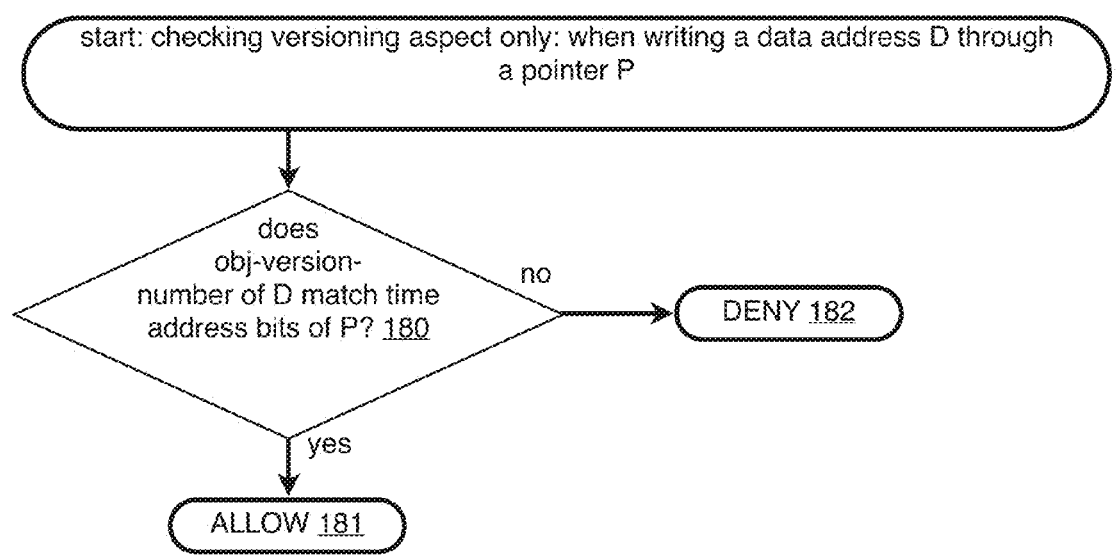
Figure 15:
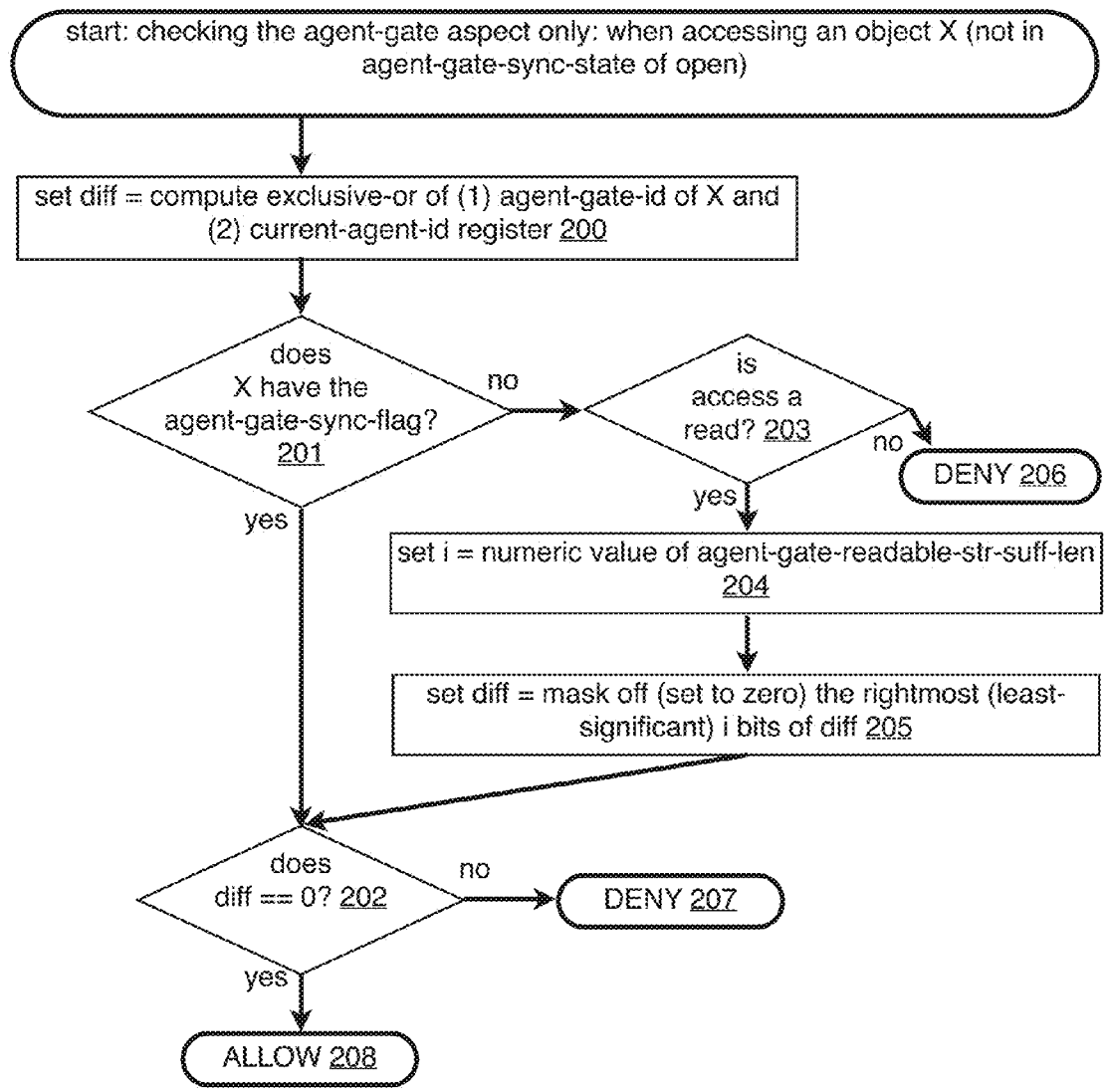

FIG. 6: Elements of the module aspect.
FIG. 7: Elements of the reference aspect.
FIG. 8: Elements of the agency aspect.
FIG. 9: Checking refable aspect only: when accessing data address D through a pointer P FIG. 10: Checking ownership aspect only: when instruction at instruction address I annotates a pointer at address D pointing to data address D2 with a ref-flag FIG. 11: Checking ref retainable aspect only: when storing a pointer P in a data address D FIG. 12: Checking ref writing aspect only: when writing through a pointer P FIG. 13: Checking ownership aspect only: when an instruction at instruction address I attempts to amplify/annotate a pointer at data address D pointing to address D2 with the ref-retainable-flag or the ref-writing-flag FIG. 14: Checking versioning aspect only: when writing a data address D through a pointer P FIG. 15: Checking the agent-gate aspect only: when accessing an object X (not in agent-gate-sync-state of open)

Figure 16:
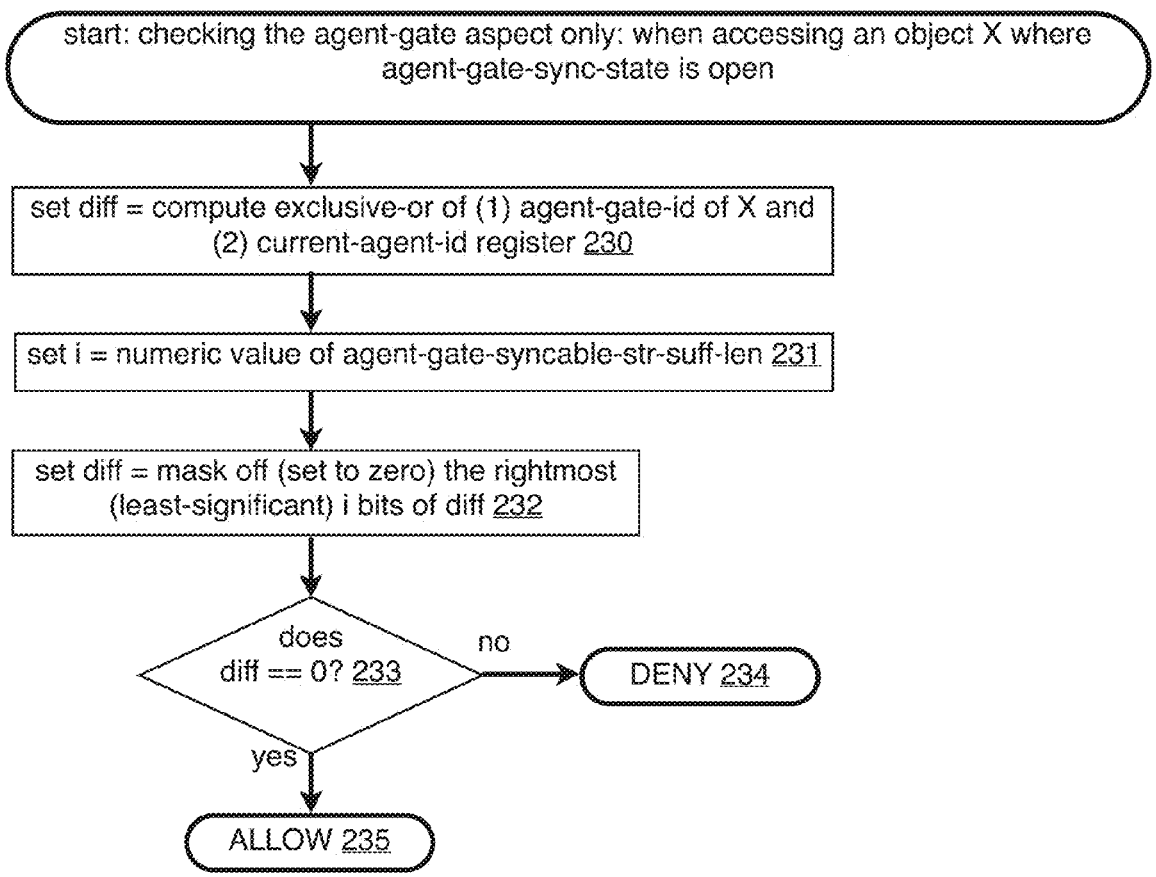
Figure 17:
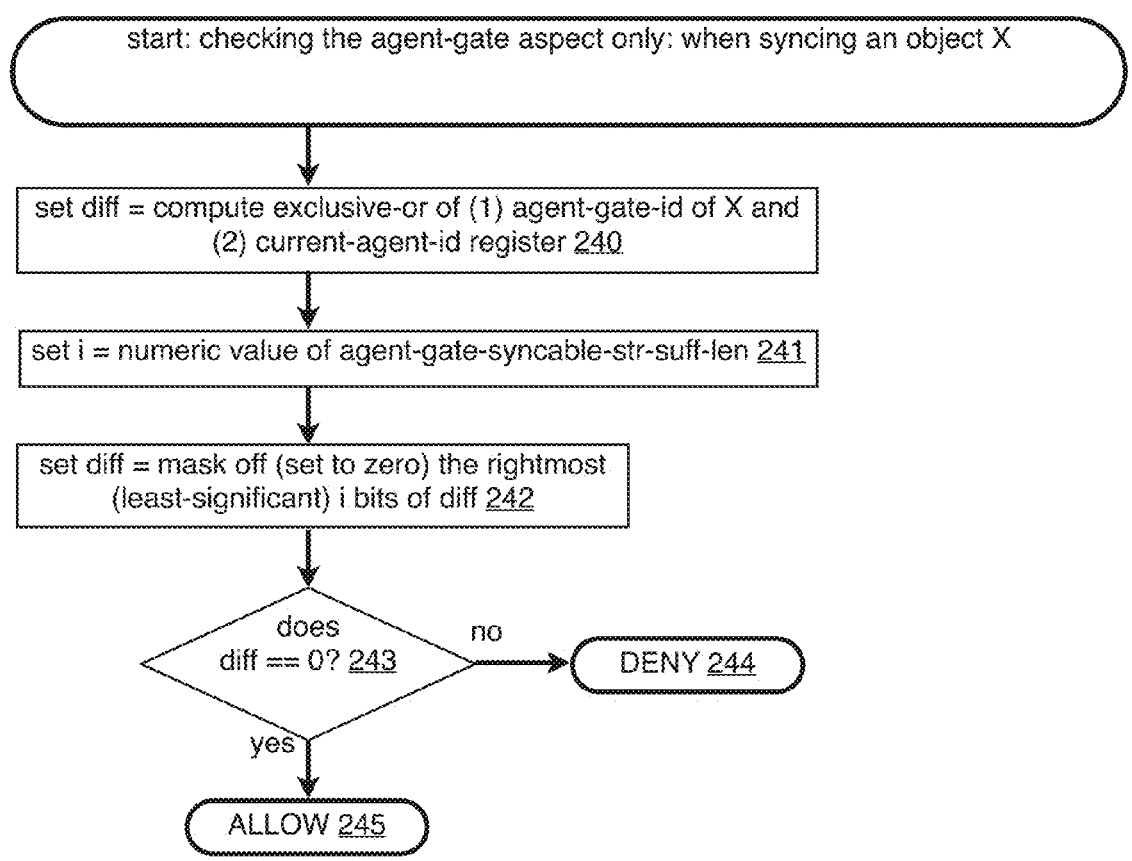
Figure 18:
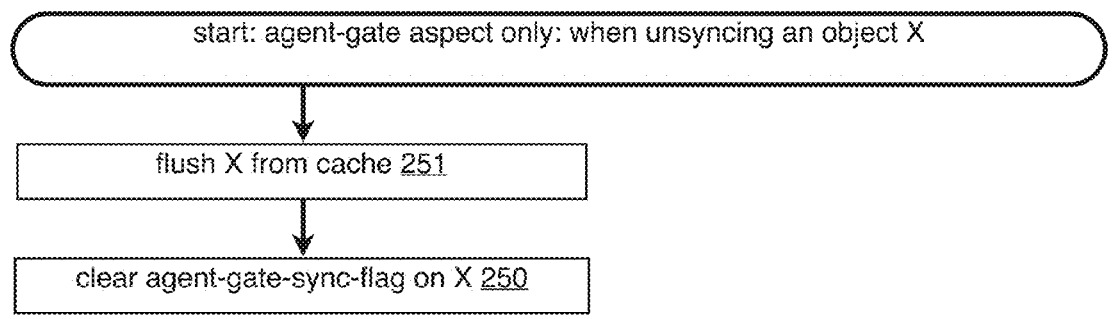

FIG. 16: Checking the agent-gate aspect only: when accessing an object X where agent-gate-sync-state is open FIG. 17: Checking the agent-gate aspect only: when syncing an object X FIG. 18: Agent-gate aspect only: when unsyncing an object X

4 DETAILED DESCRIPTION

It will be understood that while the invention will be described in the following description with respect to specific numbers of bits, these are intended as examples only, and other numbers of bits are possible within the teachings of the invention.

Accordingly, it is to be understood that the embodiments of the invention herein described are merely illustrative of the application of the principles of the invention. Reference herein to details of the illustrated embodiments is not intended to limit the scope of the claims which will be filed in a utility patent application claiming benefit from this provisional application, which will themselves recite those features regarded as essential to the invention.

For ease of readability, throughout this document "Hard Object" means the herein disclosed invention. Throughout this document, "legacy" means "prior art" unless specified otherwise.

4.1 Introduction

Software correctness and security are critical to modern computing infrastructure: people now use mobile phones for banking. Further, in a networked world, software by different authors often intimately cooperates: plug-ins, mash-ups, and mobile code are increasingly common examples.

It is beyond the state of the art to construct software such that abstraction violations, whether errant or malicious, never occur. Today prior art attempts to achieve partial solutions to this problem exhibit one of three pathologies: the extreme isolation of separate address spaces, the clumsy bluntness of a type-safe runtime, or the nightmarish tedium of formal verification.

As a result, the whole domain of software is buggy and unsafe. The entire system is a house of cards. Something must be done.

4.1.1 Correctness and Security Require Locality of Causality

Engineers who build machines made of atoms (rather than of bits) rely on locality of causality to make machines behave correctly in the presence of failure or attack: cars have a firewall between the engine and the driver; houses have walls and a lock-able door between the inside and the outside.

However, hardware engineers have worked diligently to eliminate all locality of causality within software: that is, on a modern computer, within a given memory space, any instruction can access any data. Hardware engineers did this because giving software engineers such freedom makes it easy for them to write programs that do what you want; however, having this much freedom also makes it easy to write programs that do what you really do not want.

Although software engineers localize programs into modules (data and code that operates on it), they lack appropriate fine-grain hardware primitives with which to efficiently enforce this localization. This state of affairs contributes to the problem that machines made of bits (programs) tend to be much less reliable and secure, that is, less correct, than machines made of atoms.

The problem of correctness is intractable at scale. Our plan is to give software engineers the power to enforce sufficient locality of causality upon software such that the problem of correctness becomes tractable.

Our Insight: Software Locality Maps to Hardware Locality

Our insight is that the locality of many software idioms maps through the architecture abstraction to the locality of hardware idioms. Therefore by enforcing several aspects of existing hardware locality we provide a backbone for enforcing software locality in a straightforward and lightweight manner.

Locality enforcement requires runtime checks of boundary violations. Runtime checks work well in hardware when the information needed is in the right place, at the right time, and of constant size. Our design amounts to localizing information such that all required checks have this property.

- Code locality, calls: We ensure dynamic control transfer may enter modules only to the top of public functions by requiring that a cross-module call land on a special no-op instruction having an argument guaranteed to be unforgeable.
- Stack locality, frames: We protect stack data by (1) delimiting the stack and the current frame using special registers and (2) asserting on each read or write to a stack page that the target, is within the current frame; see FIG. 2.
- Heap locality, pages: We protect heap (and global) data by (1) extending page table entries with a mod-id field having a unique value for the text and data pages of each module, and (2) asserting on each access to the heap that the mod-id of the page holding the data accessed matches the mod-id of the page holding the instruction operated; see FIG. 1.
- Control locality, threads: We constrain the transitive closure of the causality of a thread by (1) mapping each thread to a unique agent-id, (2) tracking the agent-id of the current thread in a user-immutable register, (3) extending page table entries with an agent-id field, and (4) asserting on each access to the heap that the agent-id of the page holding the data accessed matches the agent-id of the thread running the instruction operated.

Refining Regions to Sub-Page Granularity:

Further, we refine the granularity of the protection of heap (and global) data by (1) extending page table entries with a page-kind enum, which indicates a partitioning scheme of the page, and then (2) annotating each resulting part of the partition with its own Hard Object meta-data (embedded within the page or on a nearby page).

This scheme of parts-plus-metadata allows the hardware to provide Hard Object protections on each part independently, thereby obtaining a fine-grained version of the protections provided for pages above, such as would be required for an object model.

4.1.2 the Three Aspects of Hard Object

Hard Object provides three independent properties which constrain access to data: encapsulation, unforgeability, and transactionality. We allow an access only when the conjunction of all three properties are satisfied, but for simplicity, below we explain the mechanism of each separately.

Modularity Provides Encapsulation

In order to provide encapsulation, we provide a first-class notion of a module, an association of data and code which operates on it; see §4.4 and §4.5. The data of a module may be changed only by atomic invocations of the procedures of the module. We thereby allow a module author to ensure the integrity of the invariants of the module without trusting the behavior of other modules.

We provide a means to constrain the inter-module control flow graph so that a module may be called only at the top of its public functions. We also provide a means for a function to know its caller module.

We provide a means to constrain the intra-module control flow graph. In this embodiment, doing so allows a static analysis to compute a modest over-approximation of the control flow graph that cannot be escaped at runtime. In this embodiment, this property further allows for insertion of dynamic checks/analyses that cannot be avoided by the software.

We show how to construct an object model in software using only page granularity access constraints: (1) we map a class to a module using a slab allocator (one page holding objects of only one class) and (2) we compile class methods to use on-page meta-data to verify that any returning this pointer (supposedly pointing to one of the class's objects) coming from an untrusted client does, in fact, point to a valid object.

In the above object model, the Hard Object protections are provided at the page granularity and sub-page organization is managed in software by a slab allocator. In §4.11 we show how mark a page so as to (1) indicate to the hardware (2) the boundaries of the partition of the page (3) made by the slab allocator. The hardware now collaborates with the slab allocator by enforcing the object model boundaries at the object-instance granularity. Further, hardware may now enforce other meta-data annotated onto objects; later we will use this ability to implement reference and agency.

By designating a special kernel module we eliminate the need for system services to be provided through a trap to a special CPU mode: what were expensive kernel crossings are now simple function calls. Further, by identifying hardware ports with special mod-ids we remove the need for hardware drivers to have kernel powers. Even further, a monolithic kernel is no longer required and may be deconstructed into a micro-kernel without resorting to message-passing.

REFERENCE PROVIDES UNFORGEABILITY

In order to provide unforgeability, we provide a first-class notion of a reference, an unforgeable pointer to a live datum; see §4.6. Specifically:
Hardware enforces that a pointer to an object of a module may only be made into a reference by code of that module (such as in a constructor).
Hardware enforces that code of a module may transfer a reference that has been given to it, but may not forge a reference to an object of another module.
An object of a module may be annotated by the code of that module to indicate that access to the object be allowed by the hardware only through a reference.

That is, the unforgeability of these references means that access to the data to which a reference refers is limited to the module that creates that reference and the modules to which that reference has been passed. Note that module authors may elect to allow objects to be accessed by pointers; that is, pointers still work as usual, including pointer arithmetic.

To make pointers into references, in this embodiment we must annotate them as such. Any pointer is held either in a register, on the stack, or on the heap (here including globals). For each of these locations we have a scheme mapping a pointer to a bit which serves as the reference flag of its pointer: the pointer is a reference exactly when this bit is set.
References are annotated with the following flags:
retainable: the reference may be stored on the heap;
writeable: object data may be written through the reference;
auto: available to user code for any purpose, but recommended to be used for auto_ptr [Wiki-Smart-Pointers. Wiki-auto-ptr] semantics.

Any code that may write a reference may attenuate the reference by clearing any of these flags on that reference (even if it could not create the reference in the first place). Code of the module of the object to which the reference points may amplify the reference by setting any of these flags. These properties provide flexible expressive power for software using references.

Clearly we can use references to construct module-granularity capabilities [Wiki-Cap-Addr, Wiki-Cap-Sec]. Further, the ability of any code to clear the retainability flag on a reference solves a long outstanding problem with capabilities, namely that if one module gave a capability to another, the second module could keep it after it returned and use it later. The solution of this problem alone helps make capabilities a more realistic mechanism for object system design.

We also provide a reachable flag on each object in order to support concurrent garbage collection; when used together with references, this garbage-collection may be exact.

Further, using versioned references, we may greatly reduce the workload on a garbage collector (GC), thereby enabling the use of GC for a wider range of programs and with better and more predictable performance.

Agency Provides Transactionality

Hard Object provides a first-class notion of an agent, an association of data and a thread of control which operates on it. The agent abstraction solves several long-outstanding problems of parallel computation by providing the following desirable properties.

Isolation and Atomicity: We provide Isolated interaction across sets of objects (note that Isolation implies Atomicity). Like databases, we allow transactions on arbitrary sets of objects; however, unlike databases, we do not require accessing objects through the indirection of a trusted library. That is, during a transaction, objects may be read and written directly, as they are in C and C++.
For pessimistic transactions, no system software intervention is required at all: in this embodiment, the hardware wholly implements the entire life cycle of the transaction.
For optimistic transactions, in this embodiment, the system software may be needed to initiate and commit the writes of a transaction, but need not mediate access to writes during the transaction (nor mediate reads at all).

Further, note that these transactions are guaranteed, not best-effort; that is, none of our mechanisms assume that some counter will not roll over.

Whole-Object Sequential Consistency:
On x86, Sequential [Time-] Consistency [SC] is provided only at the cache-line granularity; this results in potential problems for multi-threaded access to objects that span a cache line. We solve this problem by (1) providing Sequential Consistency at the whole-object granularity for to the software abstraction while (2) requiring Sequential Consistency only at the single-word granularity for the basic reads, writes, and compare-and-swap operations at the memory-bus abstraction.

Simple, Scalable Cache Coherency:
Standard Shared Memory [SMP] architectures exhibit a fundamental problem of maintaining a coherent view of memory across the caches of multiple cores.

Cache in-coherency arises due to a failure of software to provide an explicit order of operations to hardware. We may view this as two different problems: stale reads and conflicting writes. We handle these separately as follows.
Stale reads can be prevented by use of pessimistic transactions or simply be allowed to occur and then discarded by the commit protocol of optimistic transactions.
Conflicting writes can be prevented by allowing write access through a mechanism which forces software to choose a unique agent at any time to have exclusive write access to the object.

Doing this prevents the need of the hardware to monitor other caches for conflicting updates. Our protocol is simple and local in a way that should scale arbitrarily, and thereby removes a major bottleneck to scaling many-core SMPs.

Lightweight Single-Address Space Operating System:
By annotating an object with the agent which may currently access it, we also obtain lightweight support for fine-grained address space separation. That is, agents can be used to construct a single-address-space operating system where objects may be safely shared across threads in a fine-grained way. If hardware support for separate address spaces is retained, we may run a separate operating system in each, thereby eliminating the need for a virtual machine/hypervisor layer.

4.1.3 Simple is not Minimal, Simple is Well-Factored

If there is an invariant of a program that must be maintained for the program to be correct, then that invariant, must be maintained by a combination of checks, made either in software or hardware. You only know that a program is correct because someone or something is checking that: either a machine, or a human, or both. Now matter how you look at it, checking is the fundamental resource: checking correctness is a computation that must be performed somewhere, somehow.

There is a law of conservation of this correctness computation: we cannot eliminate it, we can only factor it better. The real question is: for any given invariant, where is the best place to put the checks which ensure it? Hard Object is a refactoring of the problem of checking correctness. While Hard Object makes the hardware more complex, we assert that the complexity that it adds to hardware is less than the complexity that it removes from software.

An aesthetic of minimality misses the big picture: simple is not minimal, simple is well-factored.

4.1.4 Overview of Mechanism

We add hardware primitives which provide modularity, reference, and agency. We emphasize that the integrity of one module does not depend on the behavior of other non-system modules nor their compilers.

Unlike many other software correctness and security schemes, Hard Object protects you from others, but not from yourself. We assume module authors are motivated to protect their own modules and will therefore use a mechanism for self-protection when provided with one. Therefore we often discuss what behavior is in the self-interest of the author of a particular module or agent as part of our correctness and security argument.

All Hard Object hardware operations are constant-time and memory-hierarchy-friendly. For specificity, we assume an underlying prior art 64-bit x86-64 architecture [Wiki-x86-64], but with straightforward modifications our technique applies to other architectures. In this embodiment, the changes we make to the hardware are lightweight:

In this embodiment, we add a 64-bit word to each page table entry plus we require the use of 2 bits from the existing page table entries.

In this embodiment, we add about 10 registers (depending on architecture) and we add 1 bit to any existing registers that can hold a data pointer.

In this embodiment, we modify the memory access semantics of some standard instructions and we add some new instructions.

In this embodiment, we change the semantics of the cache such that a word being in a cache means the current agent has access to it; doing this implies changes to the cache; see §4.7.10.

In this embodiment, Hard Object induces different data-flow patterns, particularly the meta-data of the first-class object model; therefore, in this embodiment, changes to the layout of the cache may be required for efficient operation.

Alternative Embodiment: Annotating Hard Object Meta-Data onto Data Using Mechanisms Other than the Page Table Entry Above we annotate Hard Object meta-data onto pages by extending the system page table entry. Note that, as an alternative embodiment, such Hard Object meta-data may be annotated onto data (pages or small regions) using other mechanisms, such as keeping the meta-data in other parts of memory and setting up some association between the data and the meta-data that annotates it. Further, also note that the Hard Object meta-data annotating data could be more than just the one machine word (here, 64-bits) that we use in this embodiment, and therefore all of the fields discussed could be implemented using more bits that we say here.

4.2 Abbreviations

To keep names as short as possible, we maintain the following set of standard abbreviations.
br2=base root 2,
enum=enumeration,
exp=exponentiated,
hdr=header,
len=length,
loc=location,
mod=module,
obj=object,
pos=positive,
ptr=pointer,
pub=public,
ref=reference,
str=strict,
suff=suffix.

4.3 Primitive Meta-Data Types

All components in hard object are of one of the following types.
enum: one of a constant-sized set.
flag: a boolean flag which is "clear" or "set".
flag-array: an array of flags.
size: a whole number starting at 0.
pos-size: a whole number starting at 1 (add 1 to the bit representation).
exp-size: a whole number determined by exponentiating 2 to the value of the field.
exp-pos-size: a whole number starting at 2 determined by exponentiating 2 to the value of the field, which starts at 1 (add 1 to the bit representation before exponentiating).
exp-br2-size: a whole number determined by exponentiating the square root of 2 to the value of the field, as follows:
  exponent: all but last bit is a base 2 exponent;
  three-halves-flag: the last bit, indicating, if set, that after exponentiating the result should be multiplied by 3/2;
  the configuration $2^0 \cdot (3/2) = \infty$.
suff-len: a whole number starting at 0, used to partition an id (below) into two parts, where when compared to another id, only the left part is used.
str-suff-len: a whole number starting at −1 (subtract 1 from the bit representation), used to partition an id (below) into two parts, where when compared to another id, only the left part is used, and where −1 is interpreted to make the comparison so strict as to not match even when the two ids are identical.
ptr: a general-purpose pointer.
tag: a string meant to uniquely identify an object.
id: a string meant to uniquely identify an object, the id space further having an implicit hierarchical structure where the bits are considered as a path down a binary tree when read from left, to right; determines an internal node of the tree when used in conjunction with a suff-len.

Throughout the design we suffix schema members by their type.

Alternative Embodiment for Exp-Size/Exp-Pos-Size/Exp-Br2-Size/Etc. Encoded Meta-data Types Some of the meta-data types are encoded as exponents. Note that one alternative embodiment would be to simply encode them not as exponents, but in the usual way of encoding fixed-point numbers as signed (such as 2-s compliment) or unsigned binary (base-2) numbers (in the C-language, an int, signed or unsigned). Doing so requires more bits; the size of the memory assigned to encode such meta-data could be expanded to accommodate this requirement.

4.4 Modularity Core

Bjarne Stroustrup [Stroustrup-1997], creator of C++ (emphasis in the original):

Over the years, the emphasis in the design of programs has shifted from the design of procedures and towards the organization of data. Among other things, this reflects an increase in program size. A set of related procedures with the data they manipulate is often called a module. The programming paradigm becomes:

Decide which modules you want; partition the program so that data is hidden within modules.

Software engineering is a constant challenge to maintain correctness in the face of complexity. Reasoning about correctness in the face of complexity is often formulated as the enforcement of invariants. Experience shows that often we may factor a program into localities such that the correctness of each locality may be reasoned about independently. If one locality encapsulates all of the data of which an invariant speaks, maintaining this invariant becomes a local problem. We may then use a combination of unit tests and formal methods to obtain the correctness of each locality.

Hard Object provides a first-class notion of a module, an association of data and code which operates on it. We provide a module author with the ability to enforce the invariant that the data of such a module may be changed only by atomic invocations of the procedures of the module. Modules may be easily configured to operate as classes having objects. No other module may violate the invariants of such Hard Objects.

4.4.1 a Page-Granularity Object Model

Our goal in this section is to provide just enough features to get us to our first major win: constraining runtime accesses to the semantics of the traditional C++ object model, as long as we (1) make all fields private and (2) make all methods either public or private.

At the end of this section (in §4.4.6) we show how to use the hardware features here to obtain this simple object model. Note that we speak of preserving the same semantic object model, however we will require modification of the object layout.

In this embodiment, to provide modularity, we must constrain the behavior of code. To organize our presentation we consider computational models of increasing power according to the Automata Hierarchy [Wiki-Chomsky-Hierarchy].

(1) Absent control flow, programs on modern machines are locally straight-line code (SLC) running on constant-sized register machines; we constrain straight line code in §4.4.2.

(2) Adding control transfer results in a Deterministic Finite (Constant) Automaton (DFA); we constrain control transfer in §4.4.3.

(3) Adding a stack (recursive function calls) results in a machine over-approximated by a Push Down Automaton (PDA) (a real stack is large, but has size bounded by a constant); we constrain stack access in §4.4.4.

(4) Adding a heap (brk/malloc) results in a machine over-approximated by a Turing Machine (TM) (a real heap is large, but has size bounded by a constant, and, though addressing an exponentially larger space, real pointers are of constant size); we constrain heap access in §4.4.5.

In this section we provide hardware protections at the page granularity, building the finer-grained object model in software in §4.4.6. Later in §4.10 we refine the hardware protections to the object granularity, building the object model in hardware in §4.11.

To see the schema of the entire Hard Object design, see §4.14.

Distinguishing Page Kinds

Hard Object annotates pages with metadata by extending the prior art page table entry structure (in this document sometimes abbreviated as "PTE"). (Note that extending the PTE is only one possible method of annotating meta-data onto memory locations; other methods are possible, such as the hardware or the kernel keeping other data structures in memory which hold the meta-data and which are put in correspondence with the memory locations which they annotate, such as using a hashtable, or using a formula to compute the address holding the meta-data from the address which the meta-data annotates; for example, such a formula could include shifting of some of the low the bits of the address being annotated and substituting some of the high bits.) (Later we refine the granularity of annotation to that of sub-page regions which can be used to annotate individual objects; see §4.10.)

Add a 2-bit page-kind-enum to each legacy page table entry. (In this embodiment, for the purposes of this section we must distinguish between text and data pages; however, later we create 3 kinds of data pages and one kind of text page, so in that embodiment 2 bits are required for the page-kind.)

Add a 64-bit Hard Object header to each page table entry. This header contains meta-data fields which will be discussed as the features they support are introduced in this and subsequent sections.

Note that it is impossible to discuss Hard Object without making a few forward references; these will be stated in parentheses. (Only master can alter the page-kind-enum; see §4.5.3.)

Distinguishing Modules

Again, the primary feature of the modularity aspect of Hard Object is (1) partitioning of data and code into modules and then (2) constraining access to a datum to be allowed only from code of its module. In this embodiment, to do this we must first somehow distinguish in hardware the partition of data and code pages into modules.

Add a 31-bit mod-owner-id 071 to the Hard Object header for text pages. See FIG. 6.

Reserve a special nobody-mod-id(0); in this embodiment, code cannot run as nobody. (In this embodiment, the mod-owner-id of a text page can be altered only by master; see §4.5.3.)

Note that data object slots owned by nobody are interpreted as being unallocated (changing the mod-owner-id to the nobody-mod-id is cheaper than un-mapping a page); see §4.6.2.

4.4.2 Constraining Straight Line Code at the Module Granularity

We want to constrain the emergent partition of code into basic blocks to be a refinement of our Hard Object partition into modules; that is, basic blocks should not span modules.

Add a 31-bit current-mod-owner-id register which is readable but not writeable by user-mode code; if the module id of the executing text page does not match the current-mod-owner-id, the hardware immediately faults (unless that page has the control-flag set; see §4.5.2).

Make cross-module control transfer instructions set the current-mod-owner-id register to the module id of the instruction's target text page upon control transfer.

Note that, on a register machine, the dataflow paths of different basic blocks of straight line code do not interact as long as such basic blocks set and clear user registers when they start and stop; doing so is within both the power and self-interest of each module author.

4.4.3 Constraining Control Transfer at the Call Granularity

We distinguish three aspects of control flow, each of which has different possible values.

locality: (module-) internal, cross-module.
kind: jump (and branch), call, return.
dynamism: static, dynamic.

In this embodiment, we want to constrain cross-module control flow to only calls going to the top of a public function, and
returns going to the instruction following their corresponding call.

The linker may easily constrain static control flow. However predicting dynamic control flow is undecidable and thus, in this embodiment, dynamic control must be constrained by additional mechanism, as follows.

Prohibit cross-module jumps and branches (for architectures that implement calls using jumps, in this embodiment we need distinct instructions).
(software) The linker/loader allows static cross-module calls only to the tops of public functions.
Add a dyn-target-pub no-op instruction; a dynamic cross-module call faults unless it targets this instruction (except in legacy code; see §4.5.4); see below for how we prevent a dyn-target-pub from being forged.

Constraining returns amounts to protecting stack metadata from corruption; we address that concern in conjunction with protecting stack data in §4.4.4.

Preventing Control Transfer Target Forgery:

In many instruction sets it is not possible locally to distinguish instruction boundaries and therefore unaligned combinations of data and instruction fragments on text pages could forge dyn-target-pub instructions; in this embodiment we need a mechanism to prevent this.

Add a 21-bit dyn-target-tag to each text page Hard Object header. (In this embodiment, the dyn-target-tag can only be altered by master.)
Add a 21-bit immediate argument to the dyn-target-pub instruction; a dyn-target-pub instruction faults unless this argument matches the dyn-target tag of its text page (except in legacy code; see below).
Distinct-Dyn-Target-Tag Invariant: (software) We prevent dyn-target-pub forgery by requiring the dyn-target-tag to be distinct from any other bit string of the same length on the same text page.

In this embodiment we need the dyn-target-tag to have sufficient bits so that the Distinct-Dyn-Target-Tag invariant is always satisfiable. That is, in this embodiment, we need the dyn-target-tag to have strictly more bits than the logarithm of the number of tags, starting on byte boundaries, that can fit on the page. Specifically, in this embodiment, on a 4K-byte text page we need a dyn-target-tag to have 12 bits (=log 4K bits) and on a 2M-byte text page we need it to have 21 bits (=log 2M bits). We do not support text pages larger than 2M-byte (however we do support larger data pages); we rather suspect that there is not much demand for such super-jumbo text pages (see §4.13.7).

For the purpose of constraining cross-module control flow to the tops of public functions, it is within both the power and the self-interest of the module author to chose for each page a dyn-target-tag satisfying the Distinct-Dyn-Target-Tag invariant; therefore such pages may just be mapped into memory without any form of inspection. (However constraining internal control flow is a different story; see §4.5.1).

The mechanism of the dyn-target-pub (and related instructions; see elsewhere) instruction together with the dyn-target-tag could fail to provide the desired properties if the text (code) page on which the dyn-target-pub (and others) instruction could be written. Note however that (1) we prohibit the writing of text pages except in the case of legacy text pages and (2) this Hard Object feature does not operate on legacy pages. Thus, in this embodiment, such a problematic situation cannot arise.

Whitelisting/Sandboxing

A module author may make a function/method private by (a) not telling the system loader/linker to allow static linking to it, and (b) not placing a dyn-target-pub no-op at the top of the function body.

Another kind of access control is potentially useful where a function constrains access only to a whitelist, or alternatively prohibits access from a blacklist. Doing this is only possible if a callee function knows the module of its caller.

Add a caller-mod-owner-id register.
Augment the behavior of the call instruction so that on cross-module calls it sets the caller-mod-owner-id to the value of current-mod-owner-id before changing the current-mod-owner-id.
Note that the caller-mod-owner-id register may be saved and restored by user-mode code. (Later we introduce internal protected calls which do not set the caller-mod-owner-id (see §4.4.4), and cross-module unprotected calls from legacy which do set the caller-mod-owner-id (see §4.5.4).)

The Mod-Id Prefix-as-Subtree Idiom:

People naturally group software into hierarchies; it is easy to imagine that in many situations it would be natural to express access control in terms of the subtrees of such a hierarchy (such as, for example, is done with Java package-level access).

We may consider the bits of a module id such that, as the bits of a module id are read from left to right, they determine a path down a binary tree from the root to a leaf. Given a module hierarchy, one may then name (that is, pick module ids for) each module such that each module subtree corresponds to a module-id prefix. In such a scheme, checking for membership in a subtree, such as when implementing a whitelist, becomes a single prefix check. We call this the prefix-as-sub tree idiom.

(Note that an id may also denote a prefix if the id is accompanied by a length delimiting how much of the id constitutes the prefix. We use this id-and-prefix-length idiom throughout the design: see the mod-owner-suff-len in §4.4.5, the mod-guest-suff-len in §4.4.6, and the agent-gate-readable-str-suff-len and agent-gate-syncable-str-suff-len in §4.7.)

4.4.4 Constraining Stack Access at the Frame Granularity

We want to constrain stack data access (reads or writes) to be only to the current frame. Please note that this entire subsection serves only as an overview and forward reference for the full treatment of §4.9. (Here we assume the Mainline stack design of §4.9.7.)

Delimiting the Stack

We add new registers to delimit the current stack frame from other memory.

Add a register stack-base-ptr which points at the last word of the data above the stack.

Add a register caller-protect-ptr which points at the last temporary of the previous frame.

Add a register flow-protect-ptr which points at the saved return address.

Add a register stack-limit-ptr which points at the maximum extent of the stack.

(In this embodiment, these registers cannot be modified by user-mode code; they are managed by the call and return instructions or by master; see §4.5.3.)

(Note that a mod-ownable-id set to the nobody-mod-id denotes an unallocated heap object and therefore in order to avoid ambiguity, stack pages should have a mod-ownable-id of something other than nobody-mod-id. We suggest that stack pages be large object pages (see §4.10.4) having mod-ownable-id set to the master-mod-id (see §4.5.3).)

Constraining Access to the Stack

We allow a user-mode access to stack data when the target datum is (1) within the current frame and (2) is not the return address:

stack-base-ptr>target, AND
caller-protect-ptr>target, AND
target≠flow-protect-ptr, AND
target≥stack-limit-ptr.

Protected Call and Return

We want to create a notion of a protected call, where the caller is protected from the callee, separate from the notion of a cross-module call, so that we may allow protected calls from a module to itself; in this embodiment, to do this we need two call instructions.

call-unprotected: the legacy call instruction as implemented on current systems; faults if attempted cross-module (unless made from the legacy module; see §4.5.4).

call-protected: a call instruction which updates the registers delimiting the current frame (above); in this embodiment a protected call must also save all registers (use the caller-save calling convention, see §4.9.2 and §4.12.1); protected calls may be internal or cross-module.

In this embodiment we must also augment the return instruction to reverse the effect of different call instructions depending on the state of the stack (see for example §4.9.7 and below).

Notice that in this embodiment all cross-module calls (not from legacy) and returns (not to legacy) must be protected, whereas internal calls and returns may be protected or non-protected.

Maintaining Stack Integrity:

Note that, in this embodiment, for the call instruction to be able to set the caller-protect register correctly, the caller must communicate the boundary between the callee arguments and the caller temporaries to the call instruction. This can be done in several ways, detailed later in §4.9.

The return instruction can discern whether it is returning across a protected call or not and whether it is returning cross-module or not; see §4.9.7.

There are further stack meta-data invariants that we do not give here; see §4.9.2. Checks are done during protected call and return to ensure that, in this embodiment, the integrity of the many invariants cannot be violated; the proof that these checks suffice is in §4.9.7, §4.9.8, and §4.9.9.

Use the Caller-Save Calling Convention:

Note that in this embodiment we compile protected function calls to use the caller-save calling convention so as to not require the caller to trust the callee to save and restore the caller's registers. The callee-save calling convention may be used for unprotected module-internal calls or calls made by legacy code; see §4.12.

Maintaining Caller-Mod-Owner-Id:

The caller-mod-owner-id of §4.4.3 can be saved and restored by user-mode code and so a module can work out its own protocol for handling preservation of caller-mod-owner-id information in the presence of delegation to other modules.

Note that on an internal protected call, the caller-mod-owner-id is not updated; therefore if a module wants to call itself "at arms length" by making a protected call to itself, then it can just set the caller-mod-owner-id before making that call. While calls through function pointers may not know at static time if they are cross-module or not, this technique accomplishes an at-arms-length call either way.

Stack-Base-Ptr Idioms:

Using the stack-base-ptr and stack-limit-ptr, we can create a discontiguous (meta-)stack and make very fine-grained garbage collection with only tiny garbage collection pauses; see §4.9.10.

4.4.5 Constraining Heap and Code Access at the Page and Module Granularity

We want to constrain heap writes to access only data that is owned by the current module. In this embodiment, we do so as follows: (Here we constrain such heap accesses at the page granularity, however in the final design we refine the granularity of heap access to that of parts of pages; see §4.10.2, §4.14.5, and §4.14.5.)

Add a 31-bit mod-ownable-id 070 to the Hard Object header for data pages. See FIG. 6.

Allow a user-mode access to a heap or global page only when the current-mod-owner-id register matches the mod-ownable-id of the data page (where "matches" means close enough according to the mod-owner-suff-len, §4.4.5; access is also allowed when the code has master powers, §4.5.3).

(The mod-ownable-id of a data page can be altered by master or when the current-mod-owner-id is the mod-ownable-id, excepting the last current-mod-owner-suff-len bits; doing so also clears the integrity-flag; see §4.4.5.)

Constraining Access to Code:

In this embodiment, we want text pages to be accessible, but only to be read and only by their own module. Thus, this embodiment takes the following steps:

Allow a user-mode read of a text page only when the current-mod-owner-id equals the mod-owner-id of the page (or when the code has master powers; see §4.5.3).

In this embodiment, text pages cannot be written (even when having master powers, except legacy pages can be written by legacy code; note that the master module can turn a text page to a data page in order to write it and then turn it back into a data page; see §4.5.3.)

Allowing Pages to be Public-Readable

We want to allow a module to make some of its a data pages publicly readable.

Add a mod-pub-readable-flag to data pages; allow any module to read the page if the public-readable flag is set. Only the page mod-owner may set this flag.

Note that any privacy we get by not setting the mod-pub-readable-flag is only naive privacy in that we do not attempt to prevent side-channel attacks [Wiki-Side-Channel] in this embodiment.

(We allow much finer-grained control on reading and writing in §4.10 and §4.11, eventually refining readability control to the object granularity. Agency also constrains reading; see §4.7.)

Providing Ownership Transfer of Pages

We also want to provide for (module) ownership transfer of pages. However ownership transfer admits of a Trojan Horse attack [Wiki-Trojan-Horse]: one module can give another module a page that has been subtly corrupted. Thus we also want a way for a module to know if a heap page has been initialized into a known state. (Corruption of on-page meta-data is the real problem; see §4.10 for fine-grained hardware support of such meta-data.)

- Add a mod-ownable-integrity-flag to each Hard Object data page header.
- Add instruction page_set_owner
  (target_page_ptr, new_owner_page_ptr) which atomically (1) sets the mod-ownable-id of the data page pointed to by target_page_ptr to the mod-owner-id of the text page pointed to by the new_owner_page_ptr and (2) clears the mod-ownable-integrity-flag of the data page pointed to by target_page_ptr. Only the mod-owner may transfer ownership of a page.
- Add instruction page_set_module_integrity
  (target_page_ptr, new_module_integrity) which sets the mod-ownable-integrity-flag of the data page pointed to by the target_page_ptr. Only the mod-owner may set the mod-ownable-integrity-flag of a page.
- Add instruction page_get_module_integrity
  (target_page_ptr) which gets the mod-ownable-integrity-flag of the data page pointed to by the target_page_ptr. Only the mod-owner may get the mod-ownable-integrity-flag of a page.

A module should not trust the meta-data in a Hard Object header or the data on its associated page if that header does not have the mod-ownable-integrity-flag set. If an incoming page was expected, a module should first ensure the header meta-data and any on-page meta-data are to its liking and then set the mod-ownable-integrity-flag.

The usual object access instructions should simply fault on access to an object that does not have the integrity-flag set. Note, however, that to check object contents before setting the integrity flag, or to otherwise manipulate non-fully-formed objects, in this embodiment, an alternate, more permissive, access mode is also needed.

Allowing Multiple Classes of Data Per Module

We want to allow a module to distinguish internally between different kinds of data pages; for example, some pages may hold client data and other pages may hold internal meta-data. In general, doing this requires providing a run-time class id. (More technically in this embodiment, to truly treat data as objects we must provide a co-product operation on the category of data; that is, an object is (a) data where (b) the construction operation may be inverted.)

Providing a class id is straightforward on pages that have on-page meta-data; however, at times, an entire page may be used for data (see §4.10.4) and, in this embodiment, a few bits must be found somewhere else. The natural place to re-purpose unused bits is in the module id that already annotates a data page. To this end we parameterize the number of bits of a module id that matter when the module ids of a text page and of a data object are compared; since the remaining bits do not matter for this comparison, they may therefore be used as an internal class id by the module.

Doing so generalizes our notion of the module id of a text page matching that of a data object. Again consider the space module ids as a binary module-id tree, as follows.

- Annotate data objects with a tree leaf.
- Annotate text with a (possibly internal) node.
- Allow text to access data at its subtree's leaves.
- No-Mod-Ancestor-Of-Another Invariant: (software) The linker/loader prevents the return of the Trojan Horse attack [Wiki-Trojan-Horse] of §4.4.5 by ensuring that no internal node of the module tree is an ancestor of another (including the special modules).

In this embodiment we need some additional structures to implement the above plan. Data objects are already annotated with a module-id, however, in this embodiment, text annotations need to be extended. Note that denoting a substring of a 31-bit id requires 5 bits to count from 0 to 31 (inclusive, inclusive).

- Add a 5-bit mod-owner-suff-len on each Hard Object text page header.
- Add a 5-bit current-mod-owner-suff-len register.
- Add a 5-bit caller-mod-owner-suff-len register.

(As with mod-owner-id, the mod-owner-suff-len may only be altered by master in this embodiment; see §4.5.3.)

In this embodiment, we must also augment the semantics of previously-presented Hard Object hardware to maintain and use each module-id and its owner-suff-len as a unit:

- On a control transfer, when setting the current-mod-owner-id to the mod-owner-id of the target text page, also set the current-mod-owner-suff-len to be the mod-owner-suff-len of the target text page.
- Similarly, also maintain the caller-mod-owner-id and caller-mod-owner-suff-len as one unit.
- When checking if the current-mod-owner-id matches the mod-ownable-id of a data object, ignore the rightmost current-mod-owner-suff-len number of bits of them both.

4.4.6 Modularity Idiom: Providing an Object Model

We can now enforce the traditional C++ object model access constraints if we (1) make all fields private and (2) make all methods either public or private. To do this, organize classes as follows.

- (software) Map each class to a module.
- (software) Use a slab allocator [Wiki-Slab-Alloc] for objects, where in this embodiment, each page holds objects of only one class.

Further, if we wish we can make all fields public-readable using the public-readable-flag. (In the final design we can do more, such as having fields marked individually as public-read or public-write; see §4.10 and §4.11.)

(We can also support a limited version of friend using the module-id tree of §4.4.5. We can go even further: by using linker/loader inlining, the control-flag, and the set_cur_mod_owner( ) functionality, we can inline getters and setters, effectively making selected fields friend-accessible for a specific friend class.)

Provide a Module-Local Slab Allocator:

Using a slab allocator amounts to the C++ idiom of overriding the per-class operator new( ) and getting memory at the page granularity from malloc( ). In this embodiment, such a slab allocator must also provide support for deciding if an incoming this pointer points to the top of an allocated object of the right class; this can be easily done using some on-page meta-data. (In the full design we provide a means to implement this checking in hardware; see §4.6, §4.10, and §4.11.)

Put Objects that are Accessed Cross-Module on the Heap:

Recall that stack allocating objects has special semantics in C++ as the destructors for such objects are guaranteed to be called in reverse order of their construction as they go out of scope; note however that the compiler may provide such destruction semantics while actually allocating objects on the heap.

Un-Embed Cross-Module Data Members or Embed their Text:

We may "un-embed" the relationship between a containing object and any contained member object; that is, instead we point at the contained object. In the C++ object model, providing implementation inheritance amounts to (1) having an embedded superclass member and (2) auto-delegating method lookup to it. To accomplish this, in this embodiment we must un-embed the superclass member and point at it, as is done for C++ virtual inheritance. Splitting an object like this may result in an object invariant which spans multiple modules; we address this concern below in §4.4.6.

Alternatively, instead of un-embedding the data of a contained member/superclass, we may leave the data embedded and instead copy the text of its methods, in the manner of C++ templates. In this embodiment, note that the compiler/linker/loader performing this embedding must ensure that the methods of the contained object access only the fields of the contained class; this could be difficult and therefore this method is recommended only when using trusted libraries.

Maintaining Cross-Module Invariants

In the above embodiment mapping of the C++ object model, we sometimes require un-embedding an embedded member or superclass. The class may however have depended upon an invariant being maintained across the data which is now separated into two modules. Therefore in this embodiment we must provide an idiom for maintaining a cross-module invariant: an invariant which speaks of data held by multiple modules.

More precisely, in the OO world-view, object a of class A may point to an object b of class B, where class B wishes to provide access to object b only when requested by class A; that is, object b is semantically "guest owned" by guest class A and held by host class B. This relationship only works if module A trusts module B; however, in this embodiment, even if A does trust B, B must be able to distinguish the objects it hosts for A from those B hosts for other modules. This may be accomplished by having slab allocator (see above) maintain a "guest owner" meta-datum annotation on each object, as follows.

- Add a 31-bit mod-guest-id and a 5-bit mod-guest-suff-len annotation to each instance of B. (In §4.10.7 we make this a hardware feature.)
- (software) When B constructs an object b, the constructor records the caller module that requested its construction by (1) setting the mod-guest-id of b to the caller-mod-owner-id and (2) the mod-guest-suff-len of b to the caller-mod-owner-suff-len.
- (software) At the top of each method B::m( ) of B, the method B::m( ) throws an exception unless the caller-mod-owner-id matches the mod-guest-id of *this, excepting the rightmost mod-guest-suff-len bits.

Class B may provide in software the feature that a guest class A may transfer its guest-accessibility of object b to another module C. Unlike the case with ownership transfer of pages, the guest is not providing a service depending on meta-data stored in the object, so a "guest mod-ownable-integrity-flag" is not necessary, but could be provided in software by module B. Use of the mod-guest-suff-len can be generalized to allow a whole subtree of modules guest-accessibility to an object.

The entire guest-accessibility idiom is only necessary to enforce cross-module invariants; many objects may simply be accessible to all modules. (Note that no amount of guest ownership can prevent the Confused Deputy Problem [Wiki-Confused-Deputy]; we address it later using a different mechanism; see §4.6.)

Note that a mod-guest is not a mod-ownable: a mod-guest may be open to an entire subtree of guest modules, whereas a mod-ownable is owned by exactly one.

4.5 Modularity Extensions

The Hard Object partition of programs into modules is too strict for the organic nature of software. Further there are more opportunities for simple features that enhance expressive power. Here we provide additional features addressing these issues.

4.5.1 Providing Support for Static and Dynamic Analysis

We want to allow a static analysis to compute a useful over-approximation of the control flow graph (CFG).

- Add a control-flag on each text page header.
- Add a dyn-target-priv no-op instruction; when the control-flag is set on a page, in this embodiment, any module-internal dynamic function call must land on a dyn-target-priv or dyn-target-pub instruction having an argument matching the dyn-target tag of the target page.
- Add a dyn-target-jump no-op instruction; when the control-flag is set on a page, in this embodiment, any module-internal dynamic branch or jump (such a computed goto) must land on a dyn-target-jump instruction having an argument matching the dyn-target-tag of the target page.

(In this embodiment, the control-flag can be altered only by master. The control-flag is never considered to be set when the current-mod-owner-id is legacy-mod-id.)

We say a page having the control-flag set is a controlled page; otherwise a page is non-controlled. Controlled pages differ in many ways from non-controlled pages, as we will detail in subsequent sections.

Having a CFG is a prerequisite for almost any other kind of static analysis one might wish to do to ensure properties of the code. Enforcing this CFG also allows for the insertion of instrumentation or dynamic assertions which can enforce properties that are undecidable to ensure at static time.

In this Embodiment, Linker-Loader Inspection is Needed for Pages Having the Control-Flag Set Recall that in this embodiment the control-flag mechanism works when the Distinct-Dyn-Target-Tag invariant (§4.4.3) is satisfied. When the control flag is set, the dyn-target-tag mechanism is extended to also constrain internal control flow.

Note that constraining internal control flow is not in the self-interest of a module written by an attacker: for example, defeating constrained control flow might allow the module to jump over any inserted dynamic checks on its behavior.

Therefore in this embodiment the system linker/loader does not trust the compiler of a module using controlled pages to have set the dyn-target-tag-s correctly. So for each text page using the control-flag, in this embodiment, the linker/loader must scan the text page, compute a CFG, and set the dyn-target-tag-s and arguments to dyn-target-*instructions (all of them, including dyn-target-pub) so as to maintain the Distinct-Dyn-Target-Tag invariant (§4.4.3).

Note that, in this embodiment, we must also check dyn-target-pub in order to prevent a subtle control flow escape that can be accomplished by a module coordinating an attack on itself with cooperation from another module. (Further, in this embodiment, the linker/loader must check for any set_cur_mod_owner( ); see §4.5.2.)

Linker-Loader Inspection is not Needed for Non-Controlled Pages:

Note that non-controlled Hard Object text pages (not having the control-flag set) may be loaded in the familiar manner by simply (1) mmap( )-ing them into memory and (2) running them without any examination by the linker/loader. Note that we could even have allowed self-modifying code on pages not having the control-flag set (and in fact we did for legacy code; see §4.5.4); we disallowed self-modifying code on Hard Object pages because we think that in general self-modifying code is not a beneficial point in the design space.

4.5.2 Providing a Means to Inline Across Modules

We want to allow for controlled inlining across modules; this will become particularly useful in §4.5.3.

Decoupling Current-Mod-Owner-Id from Mod-Owner-Id on Controlled Pages:

In this embodiment, We must first allow for fine-grained changes to the current-mod-owner-id.

Add a current-control-flag register that identifies the current value of the control-flag; whenever the program counter enters a new text page, the hardware sets this flag to the value of the control-flag of that page.

The current-control-flag may be read by the current thread; it may not be written by software (even if current-mod-owner-id is master-mod-id; doing this allows controlling the kernel).

When the current-control-flag is set (when executing instructions on pages having the control-flag set), the current-mod-owner-id is allowed to not equal the mod-owner-id of the text page.

In this Embodiment, the Linker/Loader Must Constrain Straight Line Code on Controlled Pages In this embodiment we must use new methods to prevent the problems that the relaxed rule saved us from before: that control flow might simply fall from one module to another without going through a first-class cross-module mechanism (such as a protected call or return).

(software) The linker/loader ensures that control never falls from a controlled page to an uncontrolled page by examining the CFG.

(software) The linker/loader ensures that control never falls from an uncontrolled page to a controlled page by putting a halt instruction at the top of every contiguous region of controlled text pages (perhaps preceded by a "no-op slide", a region of single-byte no-ops, to prevent instruction alignment difficulties).

Allow Alteration of the Current-Mod-Owner-Id:

In this embodiment we need to be able to programmatically change the current-mod-owner-id and current-mod-owner-suff-len.

Add a set_cur_mod_owner(new_mod_id, new_mod_suff_len) instruction which, if the current-control-flag register shows a set control-flag, (1) sets the current-mod-owner-id to the new_mod_id and (2) sets the current-mod-owner-suff-len to the new_mod_suff_len; on a non-controlled page, simply faults.

In this Embodiment the Linker/Loader Must Constrain Use of Set_Cur_Mod_Owner( )

Recall that having the control flag set on a page means that the linker/loader can compute an over-approximation to the control flow graph, allowing it to perform static analysis on the code. The linker/loader should use such a static analysis to ensure that the set_cur_mod_owner( ) is being used in only ways that can be proven to be safe. Here is a simple workable policy.

Trusted system libraries are allowed to use set_cur_mod_owner( ) (in particular this is necessary to obtain master powers so that they may perform functions traditionally assigned to a kernel; see §4.5.3 below), and User-mode modules are written with no inlining, instead using method calls to communicate; however the linker/loader may perform cross-module inlining which will be guaranteed to be correct by construction.

Otherwise, in this embodiment, simply prohibit the use of the set_cur_mod_owner( ) altogether on controlled pages (again, in this embodiment it does not even function on non-controlled pages).

Note that the linker/loader inlining of hot code paths could be done either (a) as suggested at static time by the code's author/compiler or (b) as observed at dynamic time with the linker/loader performing inlining at, say, the request of a JIT.

Note that it is important that the linker/loader only allow arguments that maintain the No-Mod-Ancestor-Of-Another invariant (§4.4.5).

4.5.3 Providing an Executive to Mediate the Model

We want to allow for some trusted executive code to maintain the Hard Object model and sometimes override it.

Reserve a special master-mod-id(1); code running as master can access any data and read any text (to write a text page, temporarily turn it into a data page).

Note that having master powers allows code to simply override the boundaries of Hard Object. Throughout, code not having master powers is referred to as user-mode code; code running with master powers is sometimes referred to simply as "master".

Note that code having master powers is no longer protected from other code having master powers and therefore, in this embodiment, all such code must be trusted to coordinate with each other so as to not corrupt each other's state.

Master Powers Obviate the Need for a First-Class Kernel:

Code that needs to bypass the Hard Object constraints can temporarily set the current-mod-owner-id to the master-mod-id. Code running as master may alter any page table entry and set any register, thereby bypassing any Hard Object constraints. In this embodiment, services that need access to master powers include debuggers, profilers, exception frameworks, serialization frameworks, task schedulers, garbage collectors, and JIT compilers.

Note that, in this embodiment, code running as master can crash the kernel; however very little code need run as master. In particular, it is never necessary for a text page to have an mod-owner-id of master: instead have the linker/loader allow such a module to set the current-mod-owner-id to master for the few instructions requiring master powers and then return the current-mod-owner-id to its previous value when done. This idiom is akin to the Unix idiom of using sudo to run only one command at the shell rather than running as root. The consequence is that the number of instructions in the entire system which run as master can be made tiny in comparison to modern prior art kernels which require entire pages of instructions to have master powers.

Further, driver modules do not even need to resort to master powers: we assign each hardware device interface a device mod-id. In this embodiment, we allow access to that hardware interface only when the current-mod-owner matches the device mod-id; when direct memory access is allowed for devices, allow it only to access data objects owned by the mod-id of the device.

Together with the module protections above, the master-mod-id and the set_cur_mod_owner( ) allow us to dispense with kernel mode and kernel crossings altogether. In this embodiment, only a very few simple modules that wrap around critical data structures need to have any master powers at all; the modules which compute complex behaviors, such as the scheduler and the file system, can be entirely user-mode; see §4.8.11.

4.5.4 Providing a Path to Adoption

We want to provide a path to adoption for legacy programs. More specifically, we want to be able to run any legacy code out-of-the-box alongside Hard-Object-aware code. This property allows a program to be gradually ported from its legacy version to its Hard Object version and continue to operate fully during this porting process. As in this embodiment legacy code does not make use of Hard Object mechanisms, in this embodiment Hard Object will therefore not protect legacy code from Hard-Object-aware code; however Hard Object will protect Hard-Object-aware code from legacy code.

Reserve a special legacy-mod-id(−2); legacy code running as the legacy-mod-id works out-of-the-box and may even be self-modifying.

(By "legacy module id" we mean that it is a module-id with which legacy/prior art software would be annotated when run in a Hard Object system (so that the Hard Object system may easily distinguish it, from software explicitly written to run on a Hard Object system), but we do not mean to suggest that the legacy-mod-id or its other accompanying or related mechanisms in the Hard Object design are themselves prior art.)

Legacy code can use any calling convention: (1) caller-cleanup or callee-cleanup, and (2) caller-save or callee-save. Further, legacy code using any calling convention may link with Hard Object modules. As unmodified legacy code is not aware of the Hard Object instructions necessary to make cross-module calls, we allow a non-protected call across modules when calling from the legacy module (such calls also do the necessary accounting, such as setting the caller-mod-owner-id to legacy-mod-id).

In this embodiment, further modifications for the special-case of legacy code are required. For example, the control-flag is interpreted as being off when the current-mod-owner-id is the legacy-mod-id, since dyn-target-*instructions could change in the presence of self-modifying code. See §4.12 for more.

Avoiding the Brittleness of all-or-Nothing Systems:

In many other systems for supporting software security and correctness the presence of a single line of code that lies outside the constraints of the system violates the soundness of the entire system. This this brittle, all-or-nothing quality is a serious weakness of such systems. Hard Object's system of running legacy code avoids this problem; that is, Hard Object protections degrade gracefully in the presence of partial use.

Legacy Kernel:

In §4.5.3 we pointed out that it is both inadvisable and unnecessary to make an entire text page owned by master when instead changing the current-mod-owner-id to master for the duration of a few instructions will do. Just as we need a legacy-mod-id to get started in porting user-mode software to Hard Object, in this embodiment we allow an entire text page to be owned by master in order to make it easy to get started porting a legacy kernel to Hard Object.

Note that, in this embodiment, the notion of "legacy" for the kernel differs a bit from that of user code: the legacy kernel still must be re-compiled to use the new protected calls and to make other local changes, whereas legacy user-mode code running as the legacy-mod-id need not even be recompiled.

See §4.8.11 for more on changes to the kernel.

4.5.5 Allowing Multiple Modules Per Text Page

One can imagine partitioning programs so finely that many modules/classes have less code than fits on a page, thereby producing text-page memory fragmentation. We therefore want to allow multiple modules per text page. To do this, in this embodiment, we must address all of the places in the design where the module id must be determined from the text page. In this embodiment at each such point we must allow an alternative mechanism where the module id can be determined in a way consistent with a fine-grained partitioning of module text.

Providing a Means of Identifying Partitioned Text Pages:
  Reserve a special multi-mod-id(−1); when the module id of a page is looked up and this id is returned, then the question of finding the id is delegated to the alternative mechanisms of this section; call such a text page a multi-mod-id page.
  In this embodiment multi-mod-id-pages must be controlled (§4.5.1): if either (1) control enters a multi-mod-id-page or (2) an instruction reads data from a multi-mod-id-page then (in this embodiment) both (a) the current-mod-owner-suff-len must be 0 and (b) the control-flag must be set, or the instruction faults.

In this embodiment, the mechanisms of this section require the use of annotations and instructions in the text. Such annotations can only be relied upon in the presence of constraints on the control flow graph (CFG), hence the above requirement, in this embodiment, for the page to be controlled. (Note that, just as their cousin non-multi versions, the target-instructions below are no-ops when encountered by straight-line code.)

Annotate Cross-Module Control Transfer Targets with the New Current-Mod-Owner-Id:
  In this embodiment we need a way for a control transfer instruction to check if the transfer it is about to make is cross-module or internal. Normally this is done by looking at the mod-owner-id of the page holding the target, however, in this embodiment, on a page where mod-owner-id is multi, instead it must look at the target instruction.
    Add a 3-arg dyn-target-pub-multi instruction; in this embodiment, when the mod-owner-id of a page is multi, any cross-module dynamic function call must land on a dyn-target-pub-multi instruction.
    Add a 3-arg dyn-target-return-multi instruction: in this embodiment, when the mod-owner-id of a page is multi, any cross-module return must land on a dyn-target-return-multi instruct ion.
  The arguments to both instructions are as follows.
  In this embodiment, the first argument must match the dyn-target tag of the target page.
  The second and third arguments provide a new_mod_owner_id and new_mod_owner_suff_len.
  Upon execution, the current-mod-owner-id and current-mod-owner-suff-len are altered to these in the same manner as the set_cur_mod_owner( ) instruction. The instructions fault if the mod-owner-id of the page is not multi and if the control-flag is not set.

Annotate Internal Control Transfer Targets with the Expected Current-Mod-Owner-Id:

In this embodiment we also need a way to prevent internal control transfers from crossing to other modules on the same page.

Add a 2-arg dyn-target-priv-multi no-op instruction; in this embodiment, when the mod-owner-id of a page is multi-mod-id, any module-internal dynamic function call must land on a dyn-target-priv-multi or dyn-target-pub-multi instruction.

Add a 2-arg dyn-target-jump-multi no-op instruction; in this embodiment, when the mod-owner-id of a page is multi-mod-id, any module-internal dynamic branches or jumps (such a computed goto) must land on a dyn-target-priv-multi or dyn-target-pub-multi instruction.

The arguments to both instructions are as follows.

In this embodiment, the first argument must match the dyn-target tag of the target page.

In this embodiment, the second argument must match the current-mod-owner-id.

Note that (1) for the dyn-target-pub-multi and dyn-target-return-multi instructions, the module-id argument is active in that they alter the current-mod-owner (id and suffix-length), (2) whereas for the dyn-target-priv-multi and dyn-target-jump-multi instructions, the module-id argument is passive in that they result in checks against the current-mod-owner, but they do not alter it.

Reading Text Pages:

In this embodiment we normally allow user-mode code to read a text page only when the current-mod-owner-id equals the module id of the page (or when the code has master powers). In this embodiment we need special rules to preserve this constraint in the presence of multi-module text pages. We use these rules in this embodiment:

Hardware allows an instruction to read a target multi-module text page only if (1) the page of the instruction is controlled and (2) the target of the read is static (known at static time).

(software) In this embodiment, the linker/loader must check for each controlled load instruction having static target, and, if said target is on a multi-module text page, then require that the module of the instruction match that of the target datum.

4.6 Reference

Not all correctness properties of programs can be stated as local invariants. Suppose module L provides a doubly-linked list service and suppose module A deputizes L to maintain a linked list of A's objects. If module L enforces an object model, then, in this embodiment, module Evil cannot violate the doubly-linked-ness invariant of module A's list held for it by its deputy module L. However, module Evil may still simply call method L::delete_list( ) on module A's list, confusing A's deputy L into attacking A. That is, an object model alone does not prevent what is called the Confused Deputy Problem [Wiki-Confused-Deputy]. One way to prevent this attack is to not allow module Evil to get a handle on module A's list in the first place, motivating our notion of an unforgeable reference which, in this embodiment, has the following properties.

Lifetime of reference is bounded by the lifetime of its object. Only the constructor for a module can create a reference to one of its (presumably allocated) objects and the reference ceases to function when its object is no longer allocated.

References cannot be forged and therefore can move only by genuine dataflow. Due to this property, references may be used as capabilitzes [Wiki-Cap-Addr, Wiki-Cap-Sec] at the module granularity. (Using a static analysis, the granularity of the ownership of capabilities can be further refined from that of a module "having" the capability to that of only one object of that module "having" the capability.)

In this section, we show how to build a reference abstract ion assuming first-class stack frames and objects and the ability to annotate objects and frames with meta-data. Hardware support for frames and objects is detailed later in §4.9, §4.10, §4.11.

Advantages of Capabilities being Optional:

That fact that capabilities are optional in Hard Object makes a Hard Object system very flexible.

Pointers are still allowed alongside references. References are optional and provided only for those who want guarantees on top of what pointers will give them. Further, the requirement of an object to be addressed through a reference (instead of just a pointer) may be configured per object.

Public references allow exact garbage collection without functioning as capabilities. If you do not desire full capability semantics (anyone may have access to an object) but do want reference semantics (no confusing references and ints), you can just make your references module-public readable.

Capabilities can be temporary. A caller function may temporarily give a reference to a callee function in a library module (by clearing the retainable flag on a reference) and when that library function has returned, the caller knows that, in this embodiment, the library module cannot have retained a copy of the capability (as the reference cannot be stored on the heap).

Modularity and agency also constrain data access. Recall that modularity and agency constraints still function in conjunction with reference constraints. Hard Object does not exhibit the weakness of systems that have only one method of providing security and correctness, which we suggest makes Hard Object less brittle than such systems.

Capabilities are not a mandatory organizing paradigm. Hard Object does not require the construction of a "capabilities based" operating system, however it does provide all of the mechanisms necessary to support one. Further, using capabilities is not an all-or-nothing decision: some aspects of the operating system may use capabilities while others do not.

4.6.1 Desired Properties of References

We want a reference to be a pointer having the following additional properties.

Authenticity:

Creation: A reference to an object may be created only by the module which owns the object.

Propagation: Outside of the owning module, a reference may only be dereferenced, copied, attenuated (see below), or destroyed.

Duration:

Initialization: A reference can only be created to an existing object.

Expiration: When an object is destroyed, all references to it cease to be honored as references.

Attenuation:
  Retainable: A reference on which this flag is set may be stored outside the stack and registers; otherwise it may only be stored in a register or on the stack.
  Writeable: An object may be written through a reference only if that reference has this flag set; otherwise the object may only be read through that reference.
  Auto: Available to user code for any purpose, but recommended to be used for auto_ptr [Wiki-Smart-Pointers, Wiki-auto-ptr] semantics.

The ability to alter these flags exhibits an asymmetry: any code owning a reference can attenuate that reference by clearing any of the above flags, whereas only the host module which owns the object can amplify the reference by setting one of these flags.

4.6.2 Object Meta-Data

Given first-class objects and references, in this embodiment we need some object meta-data to mediate the reference/object relationship.

Allow Re-Use of Object Slots

Later in Section §4.10 we introduce hardware support for a particular memory-allocation scheme which includes slab allocators. Our scheme is organized in a manner typical of slab allocators: a particular region of memory is designated as an object slot which (1) may be in an allocated or unallocated state and (2) has additional space for meta-data.
  On each object slot, add a mod-id field which constrains client access to particular modules;
  (software) use this field to denote that the object is unallocated by setting this mod-id field to the nobody-mod-id (and in the small uniform object case, also setting the mod-guest-suff-len to 0).

(Which field this is depends on the kind of object slot: (1) on large objects and small ad-hoc objects, this field will be the mod-ownable-id and (2) on small uniform objects this field will be the mod-guest-id.)

Allow the Use of References to be Optional

References have a cost as well as a benefit, and therefore we want to make them an optional tool in the Hard Object toolbox. We therefore want to allow a module to require the use of references to access an object, however we also want to allow for objects which may be accessed by a plain pointer (such as by legacy code). Further, some prior art software requires the ability to encode pointers in clever ways that would be prevented by the restrictions on references; for example, the xor trick for storing the pointers in a doubly-linked list using only one word.
  Add a refable-target-flag 081 to each object; when a pointer is used to access a field of an allocated object having the refable-target-flag set 110 (otherwise allow 112), if the pointer is not annotated as a reference 111, then the hardware immediately faults 114 (otherwise allow 113). See FIGS. 7 and 9.

(Note in §4.10 when we add fine-grain partitioning of memory into objects we constrain all access to those objects by the delimited object bounds, whether accessed through pointers or references and whether or not the object has the refable-target-flag set.)

Allow for Concurrent Exact Garbage Collection

We want to support garbage collection in case people want to use it. Note that we suggest a scheme for handling use-after-free and garbage in a more efficient manner in subsequent sections.
  Add a refable-reachable-flag to each object.
  The refable-reachable-flag is simply a bit reserved for use by any garbage-collection algorithm; all it does is make garbage-collection easier. Note that just this one flag suffices to provide concurrent garbage collection without any garbage-collection pauses; see §4.6.2.

Concurrent Mark-and-Sweep Garbage-Collection:
  Garbage collection is a popular memory reclamation strategy and Hard Object provides support for it.
  All objects are annotated with a refable-reachable-flag which can be used to implement the classic concurrent (no garbage-collection pause) and exact (no guessing if an int is a pointer) mark-and-sweep garbage collection algorithm, as follows. In this embodiment, when references are used, the collection can be exact, however, for pointers, the collection must be conservative. For reference we state the prior art mark and sweep garbage collection algorithm.
  (1) Mark: Start with all objects having a clear refable-reachable-flag. Traverse the heap graph rooted in the global and stack pages, marking every object found. During marking, if any objects are allocated, mark them as well.
  (2) Sweep: When marking is finished, sweep through the heap. Put any unmarked objects onto the free list for their bloc. Semantically un-mark all objects.

Semantic un-marking is most efficiently done by maintaining a global flag holding which value of the current mark flag means "marked" and just inverting that flag. This method is more efficient because, in this embodiment, (1) it only requires the objects being deleted to be written (whereas the objects being kept are only read) and (2) reading is cheaper than writing.

(For the small uniform object slab allocators, one free list will do for the entire bloc. Large objects and small ad-hoc objects are powers of 2 in size and size-aligned and so should use a binary buddy system allocator; one free list can be maintained for each power of 2 size of slots. See §4.10.)

Recall from §4.9.10 that the stack-base-ptr mechanism allows for a garbage-collection thread to walk the stack temporaries of a target thread without unduly pausing the thread.

Allow References/Pointers to be Versioned

Use-after-free is a deep and persistent problem in computation and use-after-free errors are frequently the source of security holes. There is no easy answer to this problem because there is no easy way to find all of the names of an object. However, perhaps surprisingly, it is possible to greatly reduce the cost of solutions to this problem.

Two traditional answers are: (1) manual memory management: don't make a mistake, or (2) automatic memory management: use a garbage collector. Automatic management has the advantage that the possibility of memory errors is gone. However programmers who write high-performance code frequently find that there is a severe cost, not only due to the amount of extra memory required to make it work, but also due to the loss of control of the behavior of the program.

We allow for an alternative strategy that has most of the advantages of manual memory management and the safety of automatic memory management.

On current 64-bit machines, the virtual address space is not actually 64 bits; for example, currently AMD uses only 48 bits, addressing 256 Terabytes of virtual memory. We call the number of bits actually used for addressing the number of bits of virtual space, S.

Some prior art architectures have prohibited the use of the remaining bits and require that they be set to a constant; in this embodiment, we choose an alternative design, as follows.

We call the remaining 64−S bits the number of bits of virtual time, T, and use these bits as a version number on the object pointed to by the space bits.

That is, for any object:
the least-significant bits of a pointer are S space address bits, encoding the address of the object, and
the most-significant bits of a pointer are 64−S=T time address bits 082, encoding the version of the object. See FIG. 7.

This feature only activates when requested by the object, as follows:

Add a refable-versioned-flag to each object; when this flag is set on an object, the first word of the object operates as an object-version-triple annotating the object. When a reference or pointer is used to access a field of an object having the refable-versioned-flag set, if the high T bits of the reference/pointer 082 do not equal 180 the high T bits of the objects object-version-triple 080, the hardware immediately faults 182 (otherwise allow 181). See FIGS. 7 and 14.

Alternative embodiments can annotate the object-version-triple onto an object by other means, such as by storing in other memory not on the page. When an object-version-triple annotates a Large Object page, an alternative embodiment is to locate the object-version-triple in an additional word in an expanded page table entry for that page.

Version Number Maintenance Protocol:

We may now implement a simple version number memory safety protocol as follows (note that this is just an example and other protocols are possible). In software, we consider the object-version-triple (in one embodiment, the first word of the object) as comprising the following fields:

T bits obj-version-number 080, initially 0;
(software) $\lfloor S/2 \rfloor$ bits obj-version-ceiling, initially 1;
(software) $\lfloor S/2 \rfloor$ bits obj-version-next-ceiling, initially 1;

Interpret version numbers as points in a circular space modulo $2^T$. Maintain the following invariant:

Version-Ceiling-Delimits-Unused-Versions: there are no references in memory having a version>obj-version-number and < obj-version-ceiling To Allocate an Object:

In this embodiment, object-slots may be allocated as follows:

(1) If the object slot's obj-version-number+1< obj-version-ceiling, the object may be allocated; otherwise it may not.
(2) When allocating, increment obj-version-number on the object slot,
(3) set the high T bits on the reference to be given to the client to that version number.

Remember to also mark the object as allocated (see §4.6.2).

To Re-Use Version Numbers:

We conduct a version-number collection pass to find the least version of any reference to this object in memory (where "least" is taken in the circular sense, using the current obj-version-ceiling as zero) and then increment obj-version-ceiling to that value, freeing up more version numbers for the object to use. We do this search concurrent with object allocation and de-allocation (no "stop the world"), as follows:

(1) Endlessly loop over all objects that either (a) have the refable-versioned-flag set or (b) have references to other objects.
(2) When visiting an object having the refable-versioned-flag set, set its obj-version-ceiling to the value of its obj-version-next-ceiling, and then set its obj-version-next-ceiling to its obj-version number.
(3) When visiting an object having references, for each such reference: If the target of the reference has the refable-versioned-flag set and its obj-version-next-ceiling is greater (relative to its obj-version-ceiling) than the version of this reference, then set the target object's obj-version-next-ceiling to the version of this reference.

What if $\lfloor S/2 \rfloor$<T?: We assume that the version numbers can fit into the obj-version-ceiling and obj-version-next-ceiling. If this is not the case, we can always just use even more space on the object, but this is expensive. As an alternative, we can simply discard the least significant T−$\lfloor S/2 \rfloor$ bits, and then when comparing obj-version with obj-version-ceiling, just assume the worst case by rounding obj-version-ceiling down (setting the omitted least significant bits to zero). The same rounding down to assume the worst case can be done when setting obj-version-next-ceiling to the value of the version of a reference found to the object. Using this trick, in this embodiment, we only need one word for all three values, even if we want to use a very constrained memory space having, say, T=32 bits.

Initializing a Page:

If a page has never been used before, we may initialize all three version fields on an object slot to zero (recall the object slot starts in an unallocated state and to allocate, the first thing we do is increment the version number). However what if our class had (1) previously used this page, (2) returned it to the system allocator, and then the page (3) was returned back to us by the system allocator; there could still be a very stale pointer pointing into this page, but in this embodiment we have lost the version number information needed to prohibit its misuse. In this embodiment, on such a page we must initialize the version number space on each object as completely exhausted and only give out new versions after a version number collection pass. We do this by initializing the obj-version to 0, the obj-version-ceiling to 1, and the obj-version-next-ceiling to 1. (In this embodiment the collection pass must visit the object twice before it can actually be used.)

Details of the Version Number Collection Pass:

Note that this visitation is not done using a reachability search, as is done with object garbage collection. Instead, in this embodiment, we must guarantee in each pass to comprehensively visit all objects in the system having the two above properties. Note that this can be done rather efficiently by simply scanning through memory in a linear fashion, and just skipping pages that have meta-data which prohibits them from having either references or referenced-to objects.

Note that our version-number collection strategy is something far cheaper than standard garbage-collection: we have de-coupled waiting for the collection pass to complete from the ability to re-use objects. Further, our collection pass does not require following paths in the object graph like a garbage collection pass, but instead only scanning pages where the from-half of every reference visitation is done linearly; this is far more memory-hierarchy friendly than object graph traversal.

Even further, we can avoid visiting the to-half of many references as follows. Distinguish between "hot" and "cold" classes, where hot classes are those that are using up their version numbers rapidly. When performing a "hot" version number collection pass, (1) do not "roll" the obj-version-ceiling to the obj-version-next-ceiling and the obj-version-next-ceiling to the obj-version, and also (2) when visiting a reference, if it does not point to a page of a hot class, do not even follow the reference. (Note that, in this embodiment, interleaving "all" and "hot" passes must be done with care.) These hot passes are even more efficient.

4.6.3 Reference Meta-Data

In our design references are guaranteed to be word-aligned pointers and so the low 3 bits are unused; we therefore re-purpose these bits to annotate references with meta-data. We want to allow the attenuation of references to provide fine-grained control over the power of a reference; to that end we add flags that govern various uses of the reference. Below, we present these from the least significant bit towards the more significant.

See §4.6.4 for the conditions under which these flags may be set and cleared.

Allowing Attenuation to Non-Retainable References

We want to allow references to be used as capabilities [Wiki-Cap-Addr, Wiki-Cap-Sec], if desired. One useful feature is to be able to control whether a function may retain a capability after it returns.

Add a ref-retainable-flag 084 to each reference; when set 142, this flag enables 145 this reference (pointer having a ref-flag 140) to be stored elsewhere besides in a register or on the stack 141 (otherwise if not a ref, allow 143, or if storage location not a heap, allow 144); however if attempting to store a reference on a heap address without this flag, the storage attempt is denied 146. See FIG. 7.

Allowing Attenuation to Non-Writeable References

We want to allow a reference to be attenuated to allow read but not write access to an object.

Add a ref-writing-flag 085 to each reference; when set 161, this flag enables 163 the object data to be written when accessed through this reference 160 (otherwise, if not a ref, allow 162, and if a ref but does not have the ref-writing-flag, deny 164). See FIGS. 7 and 12.

Constraining objects to be non-writeable is a very effective technique for increasing the ability of a static analysis to reason about the semantics of a program. If this idiom is used for all objects it is called functional programming.

Allowing Attenuation to a Non-Auto Reference

We want to enable efficient use of the prior art auto-pointer memory management scheme (auto_ptr [Wiki-Smart-Pointers, Wiki-auto-ptr]), so we provide a means to annotate any reference as auto.

Add a ref-auto-flag to each reference; this flag has no hardware definition so classes can make it mean what they want. The recommended semantics is to indicate that the reference should be treated as a prior art auto_ptr [Wiki-Smart-Pointers, Wiki-auto-ptr].

In this embodiment, in the interest of uniformity, we enforce the same rules for mutating this flag as we do for other ref flags; see §4.6.4.

Truncating References:

Note that if we attempt an access through a reference and the target object has been deallocated, then we should throw an exception distinct from a null-pointer exception: a null pointer means end of linked list, whereas a no-such-object means someone chopped off the end of the list. While using reference version numbering (§4.6.2) allows for the detection of stale references to objects, it is helpful to have some value we can set a reference to to explicitly mark it as stale. Per the above argument, this value should be distinct from null, therefore we simply make such a thing.

Therefore in this embodiment we need a no-such-object-ref(1) which is (a) the integer 1 (to distinguish it from null-ref(0)), which (b) has been annotated as a reference.

For example, a garbage-collection pass might set references to deleted objects (which would have the ref-target-flag set) to the no-such-object-ref.

4.6.4 Implementing References

For each machine word that may be used as a reference, in this embodiment we need a corresponding ref-flag 083 which, when set, indicates that this word is being used as a reference. See FIG. 7.

In this embodiment, we want this flag to have further properties:

It cannot be written by user-mode code.

Hardware automatically propagates this flag whenever the word it annotates is copied.

Hardware automatically clears this flag whenever the word it annotates is set by other means (such as by a computation).

Whenever a word is used as a pointer to access an object (having the refable-target-flag; see below), hardware first asserts that the word is annotated with reference flag, faulting otherwise.

In this embodiment we need a null-ref(0) which is just a null pointer annotated as a reference (we sometimes call this a global polymorphic null to distinguish it from a null object of a particular class, a feature of some programming languages).

Note that references work fine in the hashtable idiom: a value is hashed to an int which is used as an offset into an array (not a table) which contains a reference.

The Global Polymorphic Null Reference May be Written by Anyone:

Note that, in this embodiment, we make an exception to the ref-writing rules so that any reference that may be written may always be set to null-ref(0); that is, anyone may "forge" the global polymorphic null reference.

Constructing Per-Class Null Objects:

Any class may construct a per-class null object that (1) does not represent an object having data but (2) carries the module-id class tag for that class, distinguishing it from objects of other classes, as follows:

Make a null object for this class and put it on a small ad-hoc page (even for a class that uses small uniform object pages or large object pages for the rest of its objects).

Make this particular object not public readable (nor writeable), even if its uniform object instances of the same class are public readable (and/or writeable), forcing a fault if the object is accessed by any client code.

Set the refable-target-flag on all objects of that class (requiring for each object that a reference, not just a pointer.

Adopt a convention in the linker that each class may export such a constant global null object for its class and that client code of that class may request that the address to this global constant null be linked into the client's own code.

Using this convention any client code for such a class may: (1) request a null object for the class, (2) test at runtime if a reference to this class is a reference to null (for that class), (3) extract that class from a per-class null, and (4) in its fault handler distinguish an attempted null deref to this class from other access faults.

Kinds of Isolation when Writing Reference Annotations

In this embodiment, references must be usable in a multi-threaded environment. Again, a reference has two parts, namely, (a) the pointer and (b) the ref-flag which annotates the pointer as a reference. In this embodiment, when reading or writing a reference, we must make sure that these two parts act semantically as one unit; that is, in this embodiment, we must constrain access to references to maintain isolation.

There are three constraint levels on writing reference annotations, as we detail in §4.6.4 and §4.10.8.

Dynamic-isolated: Whenever a hardware instruction changes a word that has a dynamic-isolated annotation, the same hardware instruction also updates that annotation to match the reference property of the annotated word. (That is, when a word is copied into a location governed by a dynamic-isolated flag, the ref-flag on the target location is set exactly when the source also has a ref-flag; otherwise the ref-flag is cleared, such as when arithmetic is performed on a pointer).

Sync-isolated and Page-isolated: In this embodiment we need to allow code to destroy references that it has. However, in this embodiment, some references are in locations that cannot be changed to be no longer annotated as references; one alternative is to allow the reference to be nulled (set to null-ref(0)). (Thus, if an operation attempts to write a non-ref value into a location governed by a non-dynamic-isolated ref-flag, null-ref(0) reference is written instead.)

(In the reverse circumstance, when an attempt is made to write a non-reference from a reference into a location governed by a non-dynamic-isolated ref-flag, the write does nothing.)

Note that the other synchronization constraints apply as well to non-dynamic-isolated locations; see §4.10.8.

Locations of Reference Annotations

There are several kinds of places a word can occur as a reference: register, stack, and several different places on the heap. Each of these kinds of places has a corresponding reference-flag location where that reference flag annotation is kept.

These reference-flag locations are not writeable by user-mode code and are maintained by hardware instructions which interact with references or by code using master powers.

The locations for each kind of data word are as follows. We organize these flags according to the three isolation kinds of §4.6.4 and §4.10.8.

Dynamic-Isolated:
Registers: Add a 1-bit ref-flag to each register which can hold a pointer.
Stack: Add a frame-ref-flag-array register, each flag of which annotates a word on the stack starting with the first word after the one pointed to by the caller-protect-ptr register. Note that any function requiring more than 64 temporaries can always perform the standard software transformation of making an object on the heap and using it for some of the state of the function. The frame-ref-flag-array never applies to any saved stack meta-data (including the saved return address). It is saved and restored across protected function calls in a way unique to the job of delimiting the stack; see §4.9.7.

Sync-Isolated:
Large objects: Add a ref-flag to the Hard Object PTE header; on large objects this flag is shared across all fields of the object.
Small ad-hoc objects: Add a obj-flag-array-ref-flag at bottom-of-bloc meta-data; in ad-hoc blocs these flags are one-to-one with the words of the bloc.
Software bloc header meta-data: Add a bloc-hdr-ref-flag-array adjacent to the software bloc header in the bottom-of-bloc meta-data; these flags are one-to-one with the words of the software bloc header.

Page-Isolated:
Small uniform objects: Add a obj-flag-array-ref-flag at bottom-of-bloc meta-data; in uniform blocs each such flag corresponds to the same field of all objects.

Rules for Manipulation of References

The reference annotation allows us to enforce in hardware the following rules for manipulation of references.

Explicit Operations:
Explicit operations on reference meta-data are done by use of new instructions (which are straightforward and therefore not provided).

Object owner: code that both (1) may write a pointer 120 (otherwise deny 122) and (2) owns the object pointed to by that pointer 121 (otherwise deny 123), may 124 promote or amplify. See FIG. 10.
Promotion: annotate a pointer as a reference.
Amplification: imbue properties to a reference.
Reference holder: code that may write a pointer may demote or attenuate.
Demotion: un-annotate a reference back to a pointer.
Attenuation: remove properties from a reference.

Discussion of Reference Amplification and Attenuation:
The host module may amplify 174 any reference (1) to which the host has write access 170 (otherwise deny 172) and (2) that points to an object that the host owns 171 (otherwise deny 173); this is effected by setting meta-data flags on the reference. See FIG. 13. In contrast, any code can attenuate the power of any reference to which it has write access by clearing any of these meta-data flags on that reference.

This object owner rule allows a host ctor function to both allocate an object and create the initial reference to it after allocation; it can then return the reference to the client.

While the hardware will enforce the attenuation of such references (even on the host), the host may also amplify or reverse-attenuate any reference passed back to it. For example, the host module may implement the C++ mutable keyword by reverse-attenuating the ref-writing-flag.

Implicit Operations Induced by Dataflow:
Implicit operations on reference meta-data occur as part of the usual computational dataflow, as follows.

Propagation: If a word annotated as a reference is copied, the target of the copy is annotated as a reference, subject to the considerations below; if a word is written in any way other than having a reference copied onto it, then its reference annotation is cleared.

Non-dynamic-isolated reference considerations: An attempt (1) to copy a reference (2) to a word which is annotated in a non-dynamic-isolated way to be not a reference (3) copies the word but not the reference annotation (an alternative embodiment would be to simply fault in this situation). An attempt (1) to copy a non-reference (2) to a word which is annotated in a non-dynamic-isolated way to be a reference (3) writes the target of the copy as a null-ref(0) reference (an alternative embodiment would be to simply fault in this situation).

Retainability considerations: An attempt to copy a reference 140 to a location that is not either a register or on the current stack frame (as delimited by the stack-base-ptr and stack-limit-ptr) 141 is allowed in this embodiment only if the reference has the ref-retainable-flag 142 set. See FIG. 11.

4.7 Agency

Hard Object provides a first-class notion of an agent, an association of data and a thread of control which operates on it. The agent abstraction solves several long-outstanding problems of parallel computation by providing the following desirable properties.

Isolation: We provide Isolated interaction across sets of objects. Like databases, we allow transactions on arbitrary sets of objects; however, unlike databases, we do not require accessing objects through the indirection of a trusted library. That is, during a transaction, objects may be read and written directly, as they are in C and C++.

For pessimistic transactions, no system software intervention is required at all: the hardware wholly implements the entire life cycle of the transaction.

For optimistic transactions, the system software may be needed to initiate and commit the writes of a transaction, but need not mediate access to writes during the transaction (nor mediate reads at all).

Further, note that these transactions are guaranteed, not best-effort; that is, none of our mechanisms assume that some counter will not roll over.

Whole-Object Sequential Consistency:

On x86, Sequential [Time-] Consistency [SC] is provided only at the cache-line granularity; this results in potential problems for multi-threaded access to objects that span a cache line. We solve this problem by (1) providing Sequential Consistency at the whole-object granularity for to the software abstraction while (2) requiring Sequential Consistency only at the single-word granularity for the basic reads, writes, and compare-and-swap operations at the memory-bus abstraction.

Simple, Scalable Cache Coherency:

Standard Shared Memory [SMP] architectures exhibit a fundamental problem of maintaining a coherent view of memory across the caches of multiple cores.

Cache in-coherency arises due to a failure of software to provide an explicit order of operations to hardware. We may view this as two different problems: stale reads and conflicting writes. We handle these separately as follows.

Stale reads can be prevented by use of pessimistic transactions or simply be allowed to occur and then discarded by the commit protocol of optimistic transactions.

Conflicting writes can be prevented by allowing write access through a mechanism which forces software to choose a unique agent at any time to have exclusive write access to the object.

Doing this prevents the need of the hardware to monitor other caches for conflicting updates. Our protocol is simple and local in a way that should scale arbitrarily, and thereby removes a major bottleneck to scaling many-core SMPs.

Lightweight Single-Address Space Operating System:

By annotating an object with the agent which may currently access it, we also obtain lightweight support for fine-grained address space separation. That is, agents can be used to construct a single-address-space operating system where objects may be safely shared across threads in a fine-grained way. If hardware support for separate address spaces is retained, we may run a separate operating system in each, thereby eliminating the need for a virtual machine/hypervisor layer.

4.7.1 Memory Safety can be Made an Agency-Local Problem

Further, within in a single-address space operating we may prevent one process from threatening the memory safety of another, even without a trusted garbage-collector, system by using agency (see §4.7), as follows. (Agency allows for richer semantics than we give here, such as a shared consumer-producer queue; here we just demonstrate that it can be used to make a partition of objects within one address space.) Note that the sync/unsync mechanism is described in §4.7.6.

Have the kernel partition the agent-id space between processes (including the kernel itself); once a process acquires (syncs) an object that it will depend on for correctness, it never lets it go (unsyncs it) until process termination.

Note that the above constraint of a process never unsyncing one of its objects does not apply to a client object temporarily given to a service (say a stat struct to be filled in by stat( )); that is, the client, rather than the service, depends on that object being correct long term.

In this embodiment, at process termination, before the kernel re-assigns the agent-id of a dead process to a new process, the kernel must make sure no objects are currently synced by the dead process; doing this is a simple memory-hierarchy-friendly scan, not a garbage-collection object graph traversal.

Data access is also independently constrained by agency. Agency (see §4.7) captures the transitive closure of causality, in a manner similar to separate address spaces, but with finer granularity and more flexibility. (If such references are still kept agency-private, then you will still have capability semantics, only at the agency granularity instead of the module granularity.)

4.7.2 an Agent Model Provides Locality of Intent

Generally, modern software is a co-existence of programs written by many different people and therefore may not exhibit coherence of intent. To constrain intent we want to constrain a kind of locality which encapsulates it, namely the transitive consequences of a thread of control. By tracking the transitive closure of causality originated by an application, we may bound the influence of a program that we may not completely trust. We arrive at our agent model is by making this kind of locality first-class, as follows.

4.7.3 Desired Concurrency Idioms

We want to allow the following concurrency idioms. Further, we want legacy code that is unaware of the agency mechanism to just run out of the box.

Private Objects:

A thread has a set of private objects it alone can access, similar to having its own fine-grained address space manifested as a collection of objects.

Client-Syncable Objects:

A group of threads can share a set of objects; they can temporarily sync on an object, excluding others from accessing it, and then release it again.

Pessimistic Transactions:

A group of threads can interact with a set of objects using a pessimistic transaction: the client specifies in advance which objects will be accessed during the transaction and a system transaction library preemptively locks those objects for the duration of the client function.

Optimistic Transactions:

A group of threads can interact with a set of objects using an optimistic transaction, as follows (See [WGBAJF-2011] for a detailed description and proof of correctness of this algorithm). (0) Annotate each object that can be accessed through an optimistic transaction with an "object version number". (Note that this version number need not be the same as the reference version number we discuss in section §4.6.2.) (1) During the client phase, (a) on reads, the client does the read and records the object version number and (b) on writes, the client caches the new state in a shadow object. (2) During the commit phase, a system transaction library locks the objects to be written, checks the versions of objects read, and then copies shadows to their corresponding client objects. This process is similar to (1) creating a patch and then (2) applying the patch.

Using an optimistic transaction (1) there is no need to specify in advance which objects will be accessed during the transaction, (2) reads may overlap without conflict, and (3) client objects are latched for only the short duration needed to commit, not the long duration of the operation of the client function (we still call these "locks" in the context of the commit, but in the context of the entire optimistic transaction it functions as a "latch" as it is not held for the duration of the transaction).

Please note that our scheme to provide optimistic transactions is implemented completely in software, and therefore other kinds of optimistic transactions are also possible.
Properties of the Idioms Certain properties are important to any system providing concurrency or transactions. (Again see [WGBAJF-2011] for a more thorough discussion of these concurrency/transaction properties.)

Atomicity: Pessimistic transactions can only be used when all possible error conditions are handled within the transaction: once you have locked a set of objects and started operating on them, you have to somehow finish in a good state and unlock. In the face of any error, optimistic transactions simply discard their shadow objects and the objects are left in their pre-transactional state.

Isolation: Pessimistic transactions exclude other threads. Optimistic transactions do not even apply the changes until the end and when they do, do so within a pessimistic transaction.

Object-Consistency: All synchrony is at the object granularity and thereby provides Object-Consistency when the thread has sync; in this embodiment, the argument for optimistic transactions is more subtle as version numbers must be incremented and checked in just the right order. (Note that in this embodiment any notion of "nested objects" must be constructed in software; we think we provide enough primitives.)

Sequential Time-Consistency: In this embodiment we assume Sequential Time-Consistency for hardware single-word reads and writes (which x86 provides; see §4.7.8); our way of doing transactions also provides this property to the client software.

Invariant-Consistency: the responsibility of the client layer.

Durability: provided optionally; that is, transactional operation on objects in memory implies by context that the durability of the operations is only as durable as the memory state. Optimistic transactions can be made durable using an on-disk log during the commit phase.

We have not yet provided the full range of the usual transactional properties; we therefore optionally provide certain additional ones.
Deadlock Avoidance:

In this embodiment, in the case of client-syncable objects, deadlock avoidance must be managed by the client; otherwise deadlock may arise. On the other hand, in both kinds of transactions, deadlock avoidance is managed by the library so nothing can deadlock. We provide more details in §4.7.7.
Non-Isolated Shared Reads:

In all of the idioms, we provide an optional feature where the group of threads may share read access to the objects independent of any writing that may be taking place. In the first three idioms, such shared reading is not guaranteed to provide Isolation (nor Object-Consistency). However in the optimistic transactions idiom, transactions that perform a set of reads that fail to exhibit Isolation (or Object-Consistency) will be later aborted. This reading-without-locking is the standard mode of reading in optimistic transactions.
Rollback:

Some client functions may be written so that they cannot throw an exception of any kind and are guaranteed to halt. In the first three idioms such functions do not need rollback and therefore may write directly to their target objects. However transaction rollback may be a desired feature in these idioms and is a required feature in the optimistic transactions idiom, so we provide rollback as an optional feature at the performance cost of some additional data copying.
Durability:

Many programs maintain their data-structures without any provision for Durability; however anyone who has lost data due to a power outage has has a vivid experience of the inadequacy of this point, in the design space. While any program can save data at any time it likes, we factor out Durability and provide it as an optional feature of the two transaction idioms.

4.7.4 Strategy for Constraining Access
Our general strategy:
Track the transitive consequences of a thread of control using an id in an immutable register whose value we call an agent.
Constrain access to objects to only certain agents by annotating them with an agent-gate (which functions as a mutex).
Allow an agent to temporarily reserve exclusive access to an object by syncing its agent-gate.
Use these mechanisms to construct the desired concurrency idioms.
Syncing and unsync-ing agent-gates also acts as a cache-coherency protocol, notifying a write-back cache to flush when the gate is unsynced; see §4.7.10 below.

4.7.5 Tracking Agency
We want to track the transitive consequences of everything a thread does.
Add a 14-bit current-agent-id 090 register. In this embodiment, the current-agent-id can only be changed using master powers. See FIG. 8.
The agent-id functionality is reminiscent of that of the IA-64 Itanium protection keys [Intel-Itanium-2010, volume 2]; however our approach is easier to use as it is data-centric rather than process-centric.
Thread-Refines-Agent Invariant: (software) The agent manager ensures that no two threads ever share a current-agent-id.
Allowing Calling Across Across Agency
We want to allow making a synchronous call "across agency", that is, changing the current-agent-id across the call and changing it back again on return. One example where this is natural is a web browser that wants to use agents to isolate plugins. While cross-agency communication can be effected asynchronously by, say, sending messages, this "turd-drop" anti-pattern is error-prone and un-responsive.
Tracking Agent Callers:
We want such calls to know which agent they are coming from.
Add a caller-agent-id register. When system software changes the current-agent-id, it also sets this register to the previous current-agent-id. In this embodiment, the caller-agent-id can only be changed using master powers.

Using a System Library to Effect Cross-Agency Calls:

In this embodiment, to make a call from function f to function g across agency, function f must call through a system agency mediator module having master powers. The agent mediator:
(1) Changes the caller-agent-id to the current-agent-id.
(2) Changes the current-agent-id to that of the target agent-id.
(3) Uses master powers to remove its own stack frame and replace it with an instance of that of the target function g, making it look exactly as if f had simply called g directly.
(4) Sets the return address to point into a callback in the agency mediator which will reverse this process.

Note that in this embodiment the agent mediator library must be careful to not violate the Thread-Refines-Agent invariant (§4.7.5).

Note that if agency is used to embody a privileged service, in order to (1) maintain the Thread-Refines-Agent invariant (2) in the face of multiple threads (3) without blocking them that it may be necessary to have an entire subtree of privileged agents which are re-used in a manner similar to a thread pool.

Using a System Library to Implement Co-Routines/Cooperative Multi-Threading:

The idiom of cooperatively-scheduled co-routines comprises multiple threads of control synchronously yielding back and forth. For example co-routines across agency could implement a synchronous produce-consumer (without using "turd-drop") idiom or an untrusted plug-in idiom. This idiom is sometimes more straightforward and efficient than using asynchronous threads governed by a thread scheduler.

Even when the (synchronous) threads are in different agents, achieving the co-routine idiom can still be accomplished in Hard Object by (1) maintaining a stack for each thread and (2) providing a yield(arg) function in the system agent mediator library. When called, this function (1) unschedules one thread and schedules another and (2) also passes the argument to the other thread. Optionally, yield (arg) should be configurable to transfer the agency of the argument to the agent of the receiving thread.

4.7.6 Gating Object Access Based on Agency

An object is protected by an agent-gale which governs which agents may access an object and whether those accesses may read and/or write. (Master can alter an agent-gate; user-mode code may make constrained alterations using the sync and unsync instructions below.)

Constraining Object Access

We want to constrain access to objects according to the current-agent-id.

Add a 14-bit agent-gate-id 093 on each data object. See FIG. 8.

Providing Sync-Isolated Access

We want to allow two modes of access: isolated writing and shared reading.

Add a 1-bit agent-gate-sync-flag 096 on each data object which indicates if the agent-gate is sync-ed. See FIG. 8.

The object may be accessed (read or written) 208 whenever (1) the agent-gate-sync-flag is set 201 and (2) current-agent-id equals agent-gate-id exactly 200 202 (otherwise deny 207). See FIG. 15.

Provide a new instruction sync(object) 091 that (1) sets the agent-gate-sync-flag and (2) changes the agent-gate-id of the object to the current-agent-id. See FIG. 8.

Provide a new instruction unsync(object) 092 that clears the agent-gate-sync-flag 250 (and leaves the agent-gate-id unchanged). See FIGS. 8 and 18.

For any object, let agent-gate(object) denote the agent-gate controlling access to the object. Between the operations of sync(object) and unsync(object), current-agent-id==agent-gate(object).agent-gate-id and agent-gate (object).agent-gate-sync-flag is set. In this situation we say that the current agent has sync on the object. We say that an agent has sync-isolated access if (1) the agent has sync on the object and (2) agent-gate-readable-str-suff-len is 0 or −1.

See §4.7.6 below for when sync and unsync are allowed on an object. See §4.7.6 for a discussion of Atomicity and Isolation of these instructions.

Making Sync Reentrant:

Note that sync is idempotent rather than reentrant: an agent that has sync on an agent-gate can get it again many times, but when unsynced, the agent-gate is "released" (when thought of as a lock). The fundamental difficulty in making a lock reentrant is knowing who holds the lock; we provide this property and therefore the lock may be made reentrant by the simple addition of a software counter, assuming that the counter does not roll over. (Note that this is the only place in the Hard Object design where we even suggest the use of a counter which could compromise correctness by rolling over; however (1) the counter is implemented in software and (2) there is no threat to security as the code which trusts the counter also maintains the counter and so said code can solve this problem however it likes.)

Note that to effect such a counter we want the sync( ) instruction to return a flag indicating upon a successful sync whether or not the lock was already held (whether idempotency was invoked).

Note the following potentially subtle point: sync( ) provides mutual exclusion between agents (threads) even if they are not cooperative and deliberately attacking each other. However when providing reentrancy we already have exclusion and so we may assume that all software accessing the same reentrancy counter is cooperating; therefore we need not argue for reentrancy working the presence of uncooperative entities. Further, therefore the software implementing the counter can be assumed to do something sensible in the face of a rollover and we need not consider the possibility of using the rollover as an attack vector.

Providing Inclusive Read Access

We want to provide a means to share the ability to read with a group of threads.

Add a 4-bit agent-gate-readable-str-suff-len 094 on each data object; interpret this as a number from −1 to 14. See FIG. 8.

The object may 208 be read 203 whenever current-agent-id matches agent-gate-id 200 202, excepting the rightmost agent-gate-readable-str-suff-len bits 204 205, where if agent-gate-readable-str-suff-len is −1, they are prevented from matching even if current-agent-id equals agent-gate-id exactly; otherwise the read is denied 206 207.

Note that any privacy we get by constraining agent-gate-readable-str-suff-len is only naive privacy in that we do not attempt to prevent side-channel attacks [Wiki-Side-Channel].

Providing Synchronous Gate Access

We want to provide a means to share the ability to get synchronous access with a group of threads.

Add a 4-bit agent-gate-syncable-str-suff-len 095 on each data object; interpret this as a number from −1 to 14. See FIG. 8.

The sync(object) instruction is allowed 245 whenever (1) the object may be written according to the modularity and reference aspects (see those sections), (2) agent-gate-sync-flag is clear, and (3) current-agent-id matches agent-gate-id 240 243, excepting the rightmost agent-gate-syncable-str-suff-len bits 241 242, where if agent-gate-readable-str-suff-len is −1, they are prevented from matching even if current-agent-id equals agent-gate-id exactly; otherwise the attempt to sync is denied 244. See FIG. 17.

The unsync(object) instruction is allowed whenever (1) agent-gate-sync-flag is set and (2) current-agent-id equals agent-gate-id.

In this embodiment, for user-mode code, any operation not explicitly permitted by the above rules is prohibited. An attempt to sync that fails returns a value indicating failure (similar to test-and-set or compare-and-swap). An attempt to access without having sync results in a fault.

Note that when agent-gate-syncable-str-suff-len is −1 unsync(object) relinquishes control of the object permanently; it is a way to say "I'm done with this object".

As usual, code having master powers can put an agent gate into any state; this is, in fact, the only way to initialize an agent-gate in this embodiment. Therefore when the agent-gate-readable-str-suff-len or agent-gate-syncable-str-suff-len are −1, the agent-gate may still be managed by a system library.

The High Bits of the Agent-Gate-Id are Immutable:

Note that even though the agent-gate-id changes when the gate is sync-ed, no combination of sync(object) and unsync(object) instructions can ever change the bits of the agent-gate-id left of the agent-gate-syncable-str-suff-len.

In this embodiment, we require the system agent library to maintain the following invariant.

Syncable-Implies-Readable Invariant: (software) The agent manager constrains agent-gate-readable-str-suff-len to be either −1 or ≥agent-gate-syncable-str-suff-len.

In the absence of this invariant, different agents taking turns sync-ing on the object would make the read-only access of other agents flutter off and on sporadically.

Atomicity and Isolation of Access to Agent-Gates

The sync/unsync instructions do two things: (1) the test for the conditions under which they are allowed to proceed (§4.7.6) and (2) alter the gate if the condition holds (§4.7.6). In this embodiment both of these must be performed as an Atomic and Isolated operation, similar to a compare-and-swap.

Alternative Embodiment: Agent-Gate-Sync-State

The agent-gate-sync-flag embodies two states that an agent-gate can be in: sync-ed or not. In this alternative embodiment, we disclose an additional possible state for an agent-gate; to embody it, we add a bit to the agent-gate-sync-flag changing it into a 2-bit agent-gate-sync-state 097 field of an agent gate. The third state we add is called open 09A (to go with the existing states of synced 098 and unsynced 099); when an agent-gate is in the open state then (1) all agents which could sync the gate 230 231 232 233 (2) have sync access 235 simultaneously (otherwise are denied sync access 234). See FIGS. 8 and 16. (Note that "all agents which could sync the gate" is all agents where the current-agent-id matches agent-gate-id 230 233, excepting the rightmost agent-gate-syncable-str-suff-len bits 231 232, where if agent-gate-readable-str-suff-len is −1, they are prevented from matching even if current-agent-id equals agent-gate-id exactly. Note that "have sync access" means may read and write the object annotated by the agent gate.)

Note that when the agent gate is in the open state it no longer functions as a mutex (for "mutual exclusion") and therefore the agents which may access the object annotated by the agent-gate may need to coordinate their access to that object in some other manner, such as by using prior art software techniques.

(Note that, for example, the agent-gate-sync-state could be represented using two bits as follows: 00=synced, 01=unsynced, 10=open.)

4.7.7 Providing the Desired Idioms

We show how to implement each desired idiom using the mechanisms we have introduced.

Run Legacy Code Out of the Box

We constrain the agency aspect of legacy code exactly as with Hard Object code. In this embodiment, legacy code only uses large objects the agent gates of which are set up by the system libraries, so legacy code need not know about agency constraints to run unmodified. Note that legacy code is protected from Hard Object code and legacy code running in other agents.

New and Delete

To obtain a new object we get one off of the free list rooted at the software bloc header in the bottom-of-bloc meta-data. (See the before and after configurations in §4.7.7 for the software bloc header and the object slot.)

(1) Sync the root of the list by syncing the agent of the entire software bloc header.

(2) Remove the head object from the list and sync it.

(3) Unsync the software bloc header and thus root of the list.

We unsync the software bloc header, but keep the agent-gate sync-ed on the object until its deletion. Even though agent-gate-syncable-str-suff-len on the object is set to all agents, as long as the current agent retains sync it has a private object.

When we delete the object, we reverse this process: temporarily sync the root of the free list, reverse the pointer manipulation to return the object slot to the list, and finally unsync the object slot and again unsync the root of the free list.

Note that when all of the slots in a bloc have been allocated or deallocated, a similar process is conducted by malloc( ) to allocate or deallocate whole blocs in service of the module's allocator. Note that the root of malloc( )'s bloc list is kept in a global (likely a small ad-hoc object) and this object has an agent-gate; therefore we may use the same method for adding/removing blocs from malloc( )'s list of blocs as we did for object slots above.

Private Objects and Client-Syncable Objects

We want a thread/agent to be able to have a private set of objects. We configure a pool of objects so that an agent may sync one for its private exclusive use as follows.

agent-gate-id=any agent.
agent-gate-sync-flag=clear.
agent-gate-readable-str-suff-len=−1.
agent-gate-syncable-str-suff-len=all agents.

Syncing an object results in this configuration of its agent-gate:

agent-gate-id=current-agent-id.
agent-gate-sync-flag=set.
agent-gate-readable-str-suff-len=−1.
agent-gate-syncable-str-suff-len=all agents.

Unsyncing an object returns its agent-gate to the first state.

Between sync and unsync, the object is private to the thread/agent; a thread may keep a synced object indefinitely.

Non-Isolated shared reads: to add readability for a group, set readable-str-suff-len to the subtree spanning that group.

Sharing a Set of Objects within an Agent Subtree:

We want a group of threads to be able to share a set of objects. When a thread wants exclusive use of a subset of the objects, it does as follows.
(1) Avoid deadlock by syncing them in accordance with a global order, such as by increasing memory address.
(2) Operate on them in exclusion of others.
(3) Release them again.

Using a System Library to Share a Set of Objects Across Arbitrary Agency:

If the current thread has sync on an object, and also has module and reference access to the object, it may request a system library to change the agent-gate of the object, effectively transferring the agency of the object. This idiom allows agents to pass objects back and forth between each other as part of synchronous call-across-agency or as part of cooperatively-scheduled co-routines mutually yielding across agency; see §4.7.5. Note that if one agent makes an object for another, the first should transfer the agent-gate-id to the second before returning the object; this can be done by two agents sharing an object in the same agent tree, or by calling into a system library having master powers to effect the transfer.

Pessimistic Transactions

We want a group of threads to be able to interact with a set of objects by requesting a trusted library to run a client function in a pessimistic transaction.

In pessimistic transactions, the client specifies in advance which objects will be accessed by the client function during the transaction by calling the transaction library function run_in_pessim_txn(client_func, object_list, args). The transaction library does as follows.
(1) Use master powers to sync the object_list.
(2) Run client_func with argument args.
(3) Unsync the client objects.
(4) Pass the return value on to the client.

Deadlock avoidance is managed by the library so nothing can deadlock: the library syncs the client objects in accordance with a global order, such as by increasing memory address.

Configuring the Client Objects:

There is no need for this group of threads to be within a subtree of the agent-ids; the library can use any data-structure it likes to check that a given agent is within the group. Configure each object in the set as follows:
  agent-gate-id=ally agent-id in the group; the agent-gate-id changes between members of the group as they take turns with the object.
  agent-gate-sync-flag=clear (initially); the transaction library uses the sync instruction to set it to sync (thereby also setting the agent-gate-id to its agent-id) to start a transaction and then uses the unsync operation to return it to read at the end of the transaction.
  agent-gate-readable-str-suff-len=−1.
  agent-gate-syncable-str-suff-len=−1.

Non-Isolated shared reads: in this embodiment, to add readability for a group, we need the group to correspond to a subtree of the agent-ids; set readable-str-suff-len to span this subtree.

Rollback and Durability:

In this embodiment, for Rollback and Durability (1) writes must be cached in shadow objects instead of being written directly to the client objects and (2) the shadows must be copied to their corresponding client objects upon commit, just as is done with optimistic transactions in §4.7.7, below. Further, clients should be denied direct write access to client objects and instead should register the shadows with a Pessimistic Transaction object for commit at the end of the client function. Such a system operates basically as the optimistic transactions system, except:
  We do not allow reads without sync-ing; that is, set agent-gate-readable-str-suff-len=−1.
  As reads by others are excluded during the client function, we do not need version numbers.

Optimistic-Friendly Pessimistic Transactions:

We can also make pessimistic transactions that play well with optimistic transactions. In this embodiment, such transactions must participate in transaction ids, be abortable, and increment object version numbers; see §4.7.7.

Optimistic Transactions

We want a group of threads to be able to interact with a set of objects by requesting a trusted library to run a client function in an optimistic transaction.

In optimistic transactions there is no need to specify in advance which objects will be accessed by the client function during the transaction, however in this embodiment every client, object must have a version number. The client function obtains an Optimistic Transaction object from the transaction library and then operates as follows:
  The client reads objects as it needs them, recording their version numbers in the optimistic transaction object; note that, in this embodiment, for transactional correctness, the client must read the version number first before reading any other data.
  Instead of writing directly to a client object, the client, caches its desired writes in shadow objects, recording each client/shadow pair in the distributed transaction object.

Again, for full details of the algorithm, including the exact nature of the caching of reads and writes mentioned above and a full formal proof that the algorithm provides Atomicity and Isolation, see [WGBAJF-2011].

Committing the Optimistic Transaction:

When the client function is complete, it calls into the transaction library by calling the commit( ) method on the optimistic transaction object. The transaction library should do as follows.
(1) Use master powers to sync the client objects corresponding to the shadow objects.
(2) Check reads: re-read the versions numbers of all of the objects that were read and check that they are the same as the recorded version numbers; if the version number check fails, the whole commit fails, so skip the next copy shadows step.
(3) Copy shadows: if the version numbers check succeeds, commit this change by incrementing the version number on each client object and then copying the state of the shadow objects to their corresponding client objects; note that, in this embodiment, for transactional correctness, the library must increment (and write) the version number first before writing any other data (in this embodiment, this requires use of the write-through store instruction, below).
(4) Unsync the client objects and delete the shadows and return a status code indicating whether the commit succeeded.

Deadlock avoidance is managed by the library so nothing can deadlock: the library syncs the client objects in accordance with a global order, such as by increasing memory address.

High contention: Note that optimistic transactions are subject to bad performance during high contention; see [WGBAJF-2011] for a strategy to deal with that and for a more detailed treatment of optimistic transactions in general.

Isolated shared reads: the version number check ensures that even though reads happen concurrently with other commits, any optimistic transaction performing a Non-Isolated read is aborted. Note that objects are not available for reading during commit as their agent-gate-id is temporarily transferred to that of the system transaction manager (this can be thought of as getting a read-latch (and a write-latch) on the object for the short period during the commit of the optimistic transaction).

Rollback: simply discard the shadows and the record of read version numbers.

Durability: write the shadows to a log before copying their state to the client object.

Handling Version Number Rollover:

In this embodiment, the property we need of the object version numbers is that between the time a given transaction reads an object and then goes to commit, if another transaction has written the object then the version number of the object has changed.

This is true as long as a multiple of $2^{64}$ transactions have not happened between the read and the commit; while unlikely, we want to prohibit this possibility entirely. In this embodiment, we do this by prohibiting any transaction from committing if there have been $\geq 2^{64}$ commits total in the system since it initialized.

(software) Give each transaction object a transaction id.
(software) Maintain a global next transaction id and give each new transaction the next id.
(software) Maintain a global transaction id limit and never issue a transaction id equal to the limit.

If the global transaction id hits the limit, we abort some (very) old transactions to free up transaction ids and increase the limit. In order to prevent a transaction abort pause when we hit the limit, we abort old transactions proactively, using a (rather lazy) Abort Old Transactions background thread, operating as follows.

(1) Scan through the transaction pool looking for any transaction object having a transaction id that is, say, $2^{63}$ transactions older than the current global id and abort it.
(2) Record the oldest live transaction id during the scan and update the global transaction id limit at the end of the pass.

Configuring the Client Objects:

Give the group of threads a subtree of the agent-ids. Configure each object in the set as follows:

agent-gate-id=any agent-id in the group (initially); the agent-gate-id changes between (1) one of the group members (it doesn't matter which one) during reading and (2) that of the transaction library during committing.

agent-gate-sync-flag=clear (initially); the transaction library uses the sync instruction to set it (thereby also setting the agent-gate-id to its agent-id) to start a commit phase; at the end of the commit phase (1) it uses the unsync operation to clear the flag and then (2) uses master powers to set the agent-gate-id back to that of one of the members of the group.

agent-gate-readable-str-suff-len=the subtree spanning the group.

agent-gate-syncable-str-suff-len=−1.

Alternative Implementation and Configuration:

Note that there is an alternative method of implementing optimistic transactions that avoids the need for the transactions library to use master powers to lock the objects during a commit. Avoiding using master powers and staying within what may be done with user-mode sync/unsync is potentially a performance win as we conjecture that the cache coherency protocol for such user-mode operations is likely to be simpler and therefore more performant; see §4.7.10.

This alternative configuration is much like the above, however it reserves one of the agent-ids within the group as the id of the committer agent-id. To commit, an agent simply calls across agency to the committer who performs the optimistic transactions commit protocol, syncing the objects to be committed when necessary.

agent-gate-id=the committer agent-id (not just any agent-id within the group).

agent-gate-sync-flag=as above, clear except during commit.

agent-gate-readable-str-suff-len=as above, the subtree spanning the group.

agent-gate-syncable-str-suff-len=0 (not −1).

4.7.8 Hardware and Network Assumptions

Concurrency is so subtle that we devote a section just to the enumeration of the exact assumptions we are making of the hardware in this embodiment.

Machines are Becoming Distributed:

Traditionally, distributed computing is thought of as the context of computing that arises when multiple machines—each having their own motherboard and each in their own, usually beige, metal box—are networked together, using, say, Ethernet. However modern machines all having the same motherboard and all within the same box—still beige—now have so many cores, requiring that their memory hierarchies support so many layers and requiring that their memory busses be so complex, that they may be thought of productively as being distributed machines. One property of the distributed that distinguishes it dramatically from the single-core context is that we can no longer take for granted a global notion of time.

Time is Local in a Distributed Machine:

One problem that arises in distributed designs is that access to memory can no longer be taken for granted as synchronous and effectively instantaneous; instead we think of memory access as sending a message across a network to a server on another machine (memory) which will serve our request and then reply. This network exhibits delay so in the absence of explicit guarantees we assume that messages may be reordered; that is, the relationship between (1) time "here" in the core and (2) time "there" in the memory should be addressed explicitly in a first-class manner.

Assumption: Accesses are Atomic at the Word Granularity

In this embodiment we assume that we can read or write an entire word as an Atomic, Isolated, and Word-Consistent (no skew across the word) operation, as long as that word is word-aligned. Such an operation is used (1) for all of the data access and (2) for the checking (but not setting) of an agent-gate before that access is allowed.

Assumption: Agent-Gate Transitions are Word-Granularity Atomic and Isolated

As we said above in §4.7.6, in this embodiment we assume the existence of an Atomic and Isolated operation on a single word, as long as that word is word-aligned, similar to a test-and-set/compare-and-swap (note that x86 provides that). Such an operation is used for all state transitions on an agent-gate.

Assumption: A Memory Barrier is Available at Least when Having Master Powers

In this embodiment we assume a memory barrier is available at least to code having master powers. See page-isolated level constraints on writing meta-data in §4.10.8.

Assumption: Memory Accesses Exhibit Sequential Time-Consistency

We recapitulate the discussion of [WGBAJF-2011], on Sequential Time-Consistency. In a distributed system time only makes sense in the context of some locality, such as thread of control or an object of data. Lamport [Lamport-1979] says a distributed platform is "Sequentially [Time-] Consistent" iff:

[T]he result of any execution is the same as if the operations of all the processors were executed in some sequential order, and the operations of each individual processor appear in this sequence in the order specified by its program.

Lamport [Lamport-1979] gives three conditions (stated by him as only two) for this property to hold.

Thread-Local Sequential Time-Consistency: "Requirement R1: Each processor issues memory requests in the order specified by its program."

Data-Local Sequential Time-Consistency: "Requirement R2: Memory requests from all processors issued to an individual memory module are serviced from a single FIFO queue . . . ."

Thread-Data Synchrony: "[Requirement R3:] . . . . Issuing a memory request consists of entering the request on this queue." Lamport states this property together with R2 without explicitly naming it separately; it is a property of the network that packets from and to the same destinations can't pass each other.

Lamport concludes "Requirements R1 and R2 [and R3] insure that if the individual processors are sequential, then the entire multiprocessor computer is sequentially consistent."

In this embodiment we assume that Lamport's three conditions, and therefore Sequential Time-Consistency, hold.

In sum: (1) All accesses to an object go through its agent gate, so the forced serialization of accesses provided by the mutual exclusion (mutex) property of the agent gate gate is providing a local notion of "time" (ordering of accesses) for that object. (2) This agent gate always fits into a single word and therefore a single cache-line and the x86 architecture is sequentially consistent at the cache-line granularity.

(Perhaps a weaker form of consistency can allow us to establish all of the same properties for which we use Sequential Time-Consistency below; we do not examine this question in this article.)

4.7.9 Correctness: No Race Conditions in Agent-Gate Operations

In this embodiment, setting up an agent-gate can only be done using master powers; when it is done, in this embodiment we assume a memory barrier is used to prevent any race conditions. See §4.10.8.

No Races for Reading

In this embodiment, once an agent-gate is set up, the agent-gate-readable-str-suff-len does not change. Further, in this embodiment, the process of syncing and unsyncing does not ever move the agent-gate-id out of the subtree induced by the agent-gate-readable-str-suff-len (see the Syncable-Implies-Readable invariant in §4.7.6). Therefore the ability to read is a constant and subject to no race conditions.

No Races for Writing

Using the Atomic and Isolated sync instruction (see §4.7.6), one thread syncs the agent-gate: specifically, setting the agent-gate-id to the current-agent-id and setting the agent-gate-sync-flag. Using the Thread-Refines-Agent invariant of §4.7.5 we conclude that once a thread has synced the gate, no other thread may unsync.

Consider the set of accesses to the object that, in this embodiment, require having sync on the agent-gate: (1) all writes and (2) reads when agent-gate-readabe-redble-str-suff-len≠−1. Due to Data-Local Sequential Time-Consistency all such accesses have a well-defined timeline. Color each such access with the current-agent-id of the thread making the access. We want to show that between each maximal monochrome region (of the same color) in the timeline there is an unsync by the thread of the previous color and then a sync by the thread of the next color.

In this embodiment, an access of one color cannot come before the sync of the same color or after the unsync of the same color because:

(1) due to Thread-Refines-Agent the same thread must have issued the unsync;

(2) due to Thread-Data Synchrony the access and sync operations must have been issued in the same order in the thread:

(3) due to Thread-Local Sequential Time-Consistency the check part of the access would obtain the result that the agent-gate is not synced and would fault.

4.7.10 Caching with Agency Awareness

In this embodiment, every non-stack memory access must be allowed by the corresponding agent-gate. Done naively using existing cache structures, such double-checking could have a seriously negative performance impact. However, integrating the semantics of agent-gates into the cache results in a system that is very straightforward. Further we conjecture that this integrated system may simplify cache coherency protocols and thereby benefit performance.

Fusion of Management of Agent-Gates and Cache Coherency:

The semantics of agent-gates themselves assists with the management of their cache coherency by providing a means for the software to communicate the desired state of the cache to the hardware. That is, the organization we propose is a bit like switching from automatic transmission to manual.

(1) In this embodiment, an agent gate that is synced cannot not be unsynced by any non-master thread other than the one that has sync on it. Therefore the cache coherency protocol on a cached object need not concern itself with the possibility of invalidating the cached object, as no other thread can write the object, unless that thread has master powers. (Note that at first we speak as if there is only one level of caching; we address multiple levels in §4.7.10 below.)

(2) In this embodiment, reading a data object is governed only by the agent-gate-readable-str-suff-len and is independent of the agent-gate-id (as was proved in §4.7.9) and the agent-gate-sync-flag. Therefore in this embodiment readability does not change as the gate is synced and unsynced by another thread. Again, this property can only be changed by a thread having master powers in this embodiment.

Note that this organization means that (1) when an agent B has read access on an object due to agent-gate-readable-str-suff-len, and (2) another agent A has sync on the object, then we simply allow agent B to read stale data. Examining the previous idioms, we see that this situation only arises in two idioms: (1) we have given up on providing Serializable Isolation for reads, and so stale data is simply expected, or (2) we are using optimistic transactions, where the commit protocol will later abort a transaction that has read stale data.

In sum, we allow simultaneously for (1) the lower memory traffic of a write-back rather than write-through cache, (2) a straightforward cache coherency protocol and (3) transactional semantics.

Sync-Cache

Again, it seems naively as if that on a heap or global access the CPU should perform a double memory access to both the datum and its agent-gate, possibly requiring messy optimizations such as allowing control to proceed speculatively and be rolled-back if the simultaneous agent-gate check fails. Fortunately, nothing of the sort is necessary; instead we use agency sync/unsync as a cache fetch/flush and memory coherence protocol.

(1) Distinguish a sync-cache from any other caches in the machine.
(2) In-Sync-Cache-Implies-Gate-Synced Invariant: If a datum is in the sync-cache, then the current agent has sync on the datum.

One consequence of this invariant is that no agent-gate checks are needed on an access to an datum once it is in the sync-cache: if the datum is in the sync-cache, the current agent has access.

Note that due to memory pressure, the agent may be required to flush the cache anyway, so the invariant is an implication, not an equivalence.

Transactional Sync-Cache Coherency:

In this embodiment, maintaining this invariant requires also performing the following cache fetch/flush operations.

The sync(object) operation also fetches the object into the sync-cache from main memory.

The unsync(object) operation also flushes the object from the sync-cache to main memory 251. See FIG. 18.

Add a write-through store instruction so that the client can force a word to be flushed; in this embodiment, doing this is necessary to implement optimistic transactions and, in this embodiment, the version number of the object must be updated before any other fields. Note that, in this embodiment, unsync(object) must flush the whole object 251; in this embodiment, to do so, it must know the boundaries of the object. Here we unfortunately cannot avoid a forward reference to §4.10 and §4.11 (see also §4.14). For large objects and for small uniform objects, all of the information needed to compute object boundaries is present in the PTE which should already be in the TLB if the page is being accessed. In this embodiment, for small ad-hoc objects, the information needed is in the object header which also contains the agent-gate and therefore must already be accessed on an unsync.

In this embodiment, the cache must be maintained in the presence of operations on the agent-gate. However, in this embodiment, there are only two situations, as follows.

user-mode unsync: as above, in this embodiment the agent who has sync is the only one who has the power to perform the operation and that also flushes the cache.

master mode operations, such as changing the agent-gate-readable-str-suff-len or agent-gate-syncable-str-suff-len or the high bits (above the agent-gate-syncable-str-suff-len) of the agent-gate-id: the cache must be flushed with an msync( ) as there is no unsync to perform the flush for us.

Read-Cache

An orthogonal consideration managed by the agent-gate-readable-str-suff-len is who can read the object.

Distinguish a read-cache from any other caches in the machine.

In-Read-Cache-Implies-Agent-Readable Invariant: If a datum is in the read-cache, then the current-agent-id is within the agent-gate-readable-str-suff-len of the agent-gate-id of the datum.

Eventual Read-Cache Coherency:

The unsync(object) operation also invalidates all of the read caches.

Note that the cache coherency protocol has the complexity of a monotonic clock-tick on an unsync/flush; that is, there is no feedback loop in this protocol.

Merging the Sync- and Read-Cache

The sync-cache and read-cache can actually be merged.

Add an agent-gate-sync-flag-array to each cache line that annotates each word in the cache with a flag indicating if that word synced or just read.

Merging the caches prevents odd semantics in situations where the word was in the read cache and was then suddenly synced.

As a further optimization we can use a standard technique and tag the cache entries with their agent-id so the cache need not be flushed on a context switch.

Agent-Gate Coherency:

The caching consequences of the above operations of sync, unsync, load, and store are all managed by the above cache coherency protocols. None of these operations require master powers and none of them change the agent-gate-syncable-str-suff-len, agent-gate-readable-str-suff-len, or the high bits of the agent-gate-id (those above the agent-gate-syncable-str-suff-len).

However, in the first embodiment, sometimes it is necessary for these fields of an agent-gate to be modified, such as when a system library uses master powers to set up an agent-gate in the first place, or when a garbage-collector is traversing memory and must ensure traversal of every link, even those hidden in caches. In this embodiment, in such situations, the system library must take sync from whatever agent has sync, and further keep sync by setting agent-gate-syncable-str-suff-len to −1. Further, in this embodiment, this system library must also require the core running that agent to flush its cache of that object; finding that core is straight-forward if the convention of §4.7.10 is adopted.

However, in this embodiment, these operations only arise in situations where actions are being taken that require master powers. Thus, in this embodiment, one may also constrain these take-sync-and-flush operations to be performable only with master powers.

Small Object and Cache Line Boundary Mismatch

Together the In-Sync-Cache-Implies-Gate-Synced Invariant (§4.7.10) and In-Read-Cache-Implies-Agent-Readable Invariant. (§4.7.10) say that just by having an object in the cache, we know something about its agent gate status.

However, small objects might not consist of whole cache lines (see §4.10 and §4.14), and thus when loading an object into the cache, part of another object may get inadvertently loaded. In this embodiment we therefore need the ability to invalidate the cache at the word granularity. Further, there are semantically two such caches, the sync cache and the read cache, however these may be combined with one bit annotating which cache a word is in.

Add a present-flag-array to each cache line that annotates each word in the cache with a flag indicating whether that word is present as part of a loaded object or should be treated as if it is not present in the cache.

Bounding Flush Depth Using Agent-to-Core Mapping

Note that the agent-gate-*-suff-len prefix-matching idiom (the matching functionality of agent-gate-syncable-str-suff-len and agent-gate-readable-str-suff-len) imposes tree locality on the set of agent-ids: one may consider the space of strings of N-bits is isomorphic to the space of paths from the root to a leaf in a rooted full binary tree of depth N and any length-M prefix of a string of bits where M≤N uniquely determines a node in the tree (as a length-M path from the root to that node). Similarly, the memory hierarchy imposes a tree locality on the set of processors: some processors might share a level $L_k$ cache, whereas others only a level $L_{k+1}$ cache, etc. In one embodiment, we may consider mapping agents to cores such that the high bits of the agent determine the core; that is, mapping the agent-id tree to the memory hierarchy.

Note that both the agent-gate-syncable-str-suff-len and the agent-gate-readable-str-suff-len bound the height of the agent-id subtree that a sync or unsync can effect, as, in this embodiment, agents outside these subtrees cannot even observe the changes. Using the above agent-to-core mapping, these agent-gate-*-suff-len properties therefore bound the depth of the memory hierarchy to which, in this embodiment, cache coherency messages must be propagated. For example, in this embodiment, on an unsync(object) we only need to flush the object 251 down to the cache level shared by the cores within the subtree determined by the agent-gate(object).agent-gate-syncable-str-suff-len.

Further, an agent-gate itself may be cached up to the level in the memory hierarchy where all other cores lie outside of the max of the agent-gate-readable-str-suff-len and agent-gate-syncable-str-suff-len.

The a Boundary Between Integrated and Separated Meta-Data:

Note that above, starting in §4.7.10, we refer simply to "the cache" while, of course, the memory hierarchy comprises multiple layers. Multiple agents may share the same cache, so, in this embodiment, any datum in the cache that persists across context switches must be tagged with some bits of the agent-id. Similarly, for a lower cache, multiple cores may share the same cache, which, in this embodiment, requires that a datum be tagged with an agent-id. In any case, in this embodiment, there must be a boundary between the higher-level caches having integrated meta-data and the lower-level caches having separated meta-data as is diagramed in §4.14. The best layer in the memory hierarchy for this boundary depends on a trade-off frequency of access and how many meta-data bits hardware engineers are able to annotate data with.

Cache-to-Cache Move:

If we have agents mapped to cores, calling across agency is a good way to perform a cache-to-cache move. That is, when you call across agency, you can transfer the sync-edness of the arguments from one agent to the other without unsync-ing. Note that we also change the low bits of the object agent-gate-id during the move. Note that when do a cache-to-cache move, such as when calling across agency, we delete the original. This is to maintain the invariant that there is only one outstanding sync cache entry for a main memory object at a time. Software having master privileges manages such a move.

4.8 Consequences

The test of a platform is the emergent behaviors of which it admits. Hard Object has rather dramatic consequences for the organization of software.

Note that in this document when we say of a prior art abstraction or mechanism that it "no longer make sense" we mean that the prior art abstraction or mechanism was invented to handle a problem that is now handled by the use of Hard Object and therefore said prior art abstraction or mechanism need no longer be used (or if still used may be reduced to a more simplified form) when a Hard Object system is available.

4.8.1 Basic Properties

Our design has some simple basic properties which may not be readily apparent; we enumerate some of them here.

All Legacy Code Works Out of the Box.

All legacy idioms work, including all calling conventions, self-modifying code, and jumbo text pages (see §4.13.7). See §4.12 for more.

Naive Privacy can be Turned Off, Maintaining Integrity and Improving Performance.

If the mod-pub-readable-flag of a datum is set, naive privacy is effectively turned off; by doing so, module integrity is maintained, but a cross-module call is no longer required for another module to read data.

Further, by appropriately setting the agent-gate-readable-str-suff-len field, read-only access can be provided for a subtree of agents while excluding modules outside the subtree.

Untrusted Code Need not be Statically Analyzed.

In Hard Object a module may be mmap-ed into memory without any further examination and all other modules are safe from it: simply clear the control-flag in the PTEs of the text pages and go. This stands in contrast to software-based systems, such as Software Fault Isolation [WLAG-1993] and static analysis/formal verification which must examine a program before they can trust it.

Stack Smashing May be Prevented.

By using protected calls a module prevents stack smashing attacks [Wiki-Stack-Smashing]. This technique also prevents return-oriented programming attacks [Wiki-Return-Oriented].

Cross-Cutting Functionality is Possible.

The following prior art functionality is all possible in Hard Object using a trusted (and possibly statically analyzed) library have the control-flag set:
 thread schedulers.
 garbage collectors,
 debuggers,
 profilers,
 JIT compilers,
 exception frameworks,
 serialization frameworks.

Cross-Module Inlining is Possible.

The control-flag and set_cur_mod_owner( ) instruction can be used to inline across modules. If inlining is done across un-trusting modules it should be done by a trusted third party such as an optimizing linker/loader. In this embodiment, doing this requires use of the control-flag.

4.8.2 Objects and Embedding

We say class A un-embedded-relates to class B if an instance $a_0$ of class A relates to an instance $b_0$ of class B by containing a pointer to $b_0$. In contrast, class A embedded-relates to class B if an instance $a_0$ of class A relates to an instance $b_0$ of class B by containing $b_0$ as an embedded instance.

Stack-Allocated Objects:

Stack-allocated objects form an embedded relationship with the stack frame "object." In this embodiment, we must always transform this to a un-embedded relationship by moving the object to the heap. Even though the objects are on the heap, the compiler should write code to destruct these objects at the exit of their containing static scope (in the original program). (This technique works just if these objects had been heap allocated and then pointed to using a stack-allocated instance of the auto_ptr class [Wiki-Smart-Pointers, Wiki-auto-ptr].)

Inheritance:

One possible way to implement inheritance is to make a subclass un-embedded-relates to a superclass and have the subclass provide stub-methods which both (1) indirect through the pointer to the superclass data and (2) delegate to the corresponding superclass method. This method does not require the modules to rust each other.

Another way to implement inheritance is to embed a subclass into its superclass, that is, implement them within the same module, then (1) make the superclass aware of the subclass as the object could be larger, and (2) make the superclass careful to not use offsets larger than its object size. This method requires the modules to trust each other, especially for the superclass to trust the subclass.

Other methods of implementing inheritance may be possible.

4.8.3 Capabilities

Using Hard Object we can get prior art capabilities at the aspect or module granularity emergently, as follows: Instead of checking at each system call if a given module/agent is allowed make the requested call, (1) bottle up all of those system call permissions into an permissions object which has fields denoting what calls it will and will not perform for a client and then (2) give a reference to this object (a capability) to the client module/agent. Upon being requested to perform an operation, that permissions object need only check (1) if the caller is its client module/agent and then perform operations and (2) if its state is configured to allow it to perform the requested operation for the client.

One problem with capabilities has been that if one module M passes a reference to a capability to another module $M_2$ so that $M_2$ can perform a service for module M, when $M_2$ is done performing the service for M, $M_2$ can "squirrel away" a reference to the capability before returning control to M; $M_2$ can then later abuse this capability to act with the powers M gave to it, but after M no longer wants $M_2$ to have such power. Hard Object solves this problem using the ref-retainable-flag: module M can clear the ref-retainable-flag on the capability (reference to the permissions object) and as such the Hard Object hardware will not store the reference on the heap, preventing module $M_2$ from squirreling away the capability for later use.

Using this system it may be possible to replace the notion of a filesystem: a filesystem amounts to a persistent shared database, but apps can just share objects directly with each other now in a shared address space.

4.8.4 Access Control Lists Generalize Guest Mod-Guest

Prior art Access Control Lists (ACLs) can be used, as follows. Storing and checking arbitrary ACLs may sound expensive but note that: (1) our ACLs specify an entire subtree of modules/processes using a single entry, (2) the ACL for an object is likely determined at construction time, especially since, due to the module/process tree abstraction, one entry can cover future additions, and (3) ACLs may be sorted at construction and searched in time logarithmic on ACL list-length at each access.

4.8.5 Supporting Static Analysis

The point of Hard Object is provide sufficient hardware primitives to enable pragmatic software correctness. The ultimate standard of correctness is provided by sound static analysis. Hard Object allows us to make considerable progress in this direction.

Constraining the Control Flow Graph

In this embodiment, if a program is to be analyzed then the analysis must have the control flow graph of the program, or at least an over-approximation of it. Without constraints, function pointers make computing the control flow graph undecidable. The dyn-target-pub instruction and dyn-target-tag page table entry field can be used by the module to constrain control flow into the module. However that same mechanism can also be used by a static analysis to constrain control flow within the module, as follows: (1) set the control-flag and (2) place dyn-target-jump no-ops at the code points that can be targets of internal dynamic jumps, (3) place dyn-target-priv no-ops at the code points that (a) can be targets of internal dynamic calls and (b) where there is not already a dyn-target-pub.

In this embodiment, when the control-flag is clear on a page, the dyn-target-tag is used only for the purpose of constraining incoming cross-module dynamic calls to land only at the tops of public functions. However when the control-flag is set the dyn-target-tag also serves the purpose of constraining internal dynamic calls to a static control flow graph specification. The first purpose is in the interest of the module and so in the case of a clear control-flag we can allow the module (or its compiler) to compute the dyn-target-tag. The second purpose is not in the interest of a module that wishes to escape static analysis and so in that case the dyn-target-tag should be computed by a trusted linker/loader.

"Sudo" to Master Only when Needed.

Unix system administrators know not to just "su root" and then do work from a shell having root powers: one mistake and the system is toast. Instead they just "sudo" (Super-User DO) a single command as super-user when needed. Hard Object provides a similar ability to constrain the need for master (kernel) powers to only a few instructions rather giving master (kernel) them to a huge chunk of code which is what is done today and results in what is called a monolithic kernel.

(1) Normal: Most of a module is normal code needing no special power. This is true even of modules that address concerns requiring special power; for example most kernel code performs mundane data-structure management which requires no special kernel-mode privileges.

(2) Master: If such code also needs the ability to read or write any data, then small ranges where this power is needed can temporarily set the current-mod-owner-id to master; this idiom is similar to a system administrator using "sudo" to temporarily exercise root privileges only when needed, rather than always running as the root user.

How the Constraints on Master Help Static Analysis

Setting the control-flag on a text page gives code on that page the power to set and get any Hard Object register or page table entry field. Having the master module-id gives code the power to read any page and write any data page. The asymmetry in granularity between setting a bit on an entire page versus temporarily assuming a special module-id for the duration of a few instructions is deliberate.

Accessing a register through a pointer dereference is never possible, this embodiment additionally constrains accessing a page table entry field through a generic pointer dereference to only possible for the master module. Therefore a static analysis can locate accesses to such objects without performing an undecidable pointer analysis. This limit on the power of non-master dangerous code should make it pragmatic to statically analyze such code at the page magnitude.

Constraints on access to page table entry fields and access to the text and data of other modules do not apply to the master module; therefore performing static analysis on master module code is far more difficult. However employing the idiom described above of using set_cur_mod_owner( ) to "sudo" to the master module for the duration of small regions of code should make it pragmatic to statically analyze such code at the individual instruction granularity.

Using the control-flag, the dyn-target-tag, and the dyn-target-*instructions as described above to constrain the control flow graph (CFG) makes it possible to require or insert unavoidable dynamic checks where code is not statically analyzable.

We do not claim that a power gradient design and a constrained control flow graph makes sound static analysis of real-world software easy; however we do suggest that they may finally make it possible.

4.8.6 Sandboxing/Silver Bubble

Untrusted code can be put into a sandbox (a prior art idea) by requiring all of its communication to go through gateway functions enforcing some security policy. Note that while sandboxing of code in an unsafe language can be done today at the process granularity, it is awkward and hard to get right; in contrast, it may be accomplished easily and more efficiently using Hard Object.

Consider the following scenario for enabling safe mobile code. Module A downloads untrusted module U from the Internet.
(1) Module A then requests that the dynamic loader link U to the gateway module, but no others.
(2) As U is unknown to other modules, they reject calls from U; see below.
(3) Using another simple static analysis we ensure that U contains no system calls, or alternatively we augment the kernel to use caller-id to reject system calls from U.
(4) We augment the kernel to perform a kind of fault-forwarding: the kernel registers that A loaded U and so any faults in U are forwarded to a handler in A.
(5) We further augment, the scheduler to limit the CPU resources devoted to U.

Note that point 2 above can be enforced by a simple static analysis at module load time requiring that the top of each public function contain boilerplate to check the caller-id at call time. This call-time check by a function can either (1) opt-in: accept calls only from its own package, or (2) opt-out: reject calls where the caller-id is within the set of those assigned to untrusted code. If packages are arranged in a tree, as we suggest by the prefix-as-subtree idiom in §4.4.3, then this call-time check can be implemented as a prefix match as in that idiom.

Module U has now been contained in all ways and running it is safe.

4.8.7 Lightweight Recovery-Oriented Computing

A common pattern for constructing complex Graphical User Interfaces (GUIs) is to separate them into a UI and a Model [Wiki-MVC]. The UI is often complex and therefore prone to bugs, whereas the Model is usually simpler yet holds the essential data. In most programs the separation between the UI and the Model is not enforced in hardware: a bug in the UI can corrupt the Model and cause the whole program to crash. Some applications therefore separate these layers using different processes (such as when the Model is in a separate database server); however this solution is heavyweight.

Using Hard Object, the UI and Model are easily separated while residing in the same process, making this technique much more widely applicable. Imagine the following scenario in the spirit of Recovery-Oriented Computing [PBBC-2002]:
(1) The UI dereferences a null pointer or erroneously attempts to write to a Model page.
(2) The UI process faults to a handler.
(3) The handler knows the Model is not corrupted as hardware protects it, so it just reboots the UI.

What would have been a program crash becomes simply a screen flash as the UI redraws.

4.8.8 Virtual Machines No Longer Make Sense

Low-level interpreted VMs don't make sense anymore: Java VM, CLI, etc. Typesafe interpreted runtimes are complex. Further, they somehow also end up being incomplete. Fixing this problem makes things worse: in order to implement certain functionality, in practice certain applications end up punching a hole in the runtime in order to link in native code (JNI); for example, not all programs that run on Android are 100% pure Java; once this is done somewhere, all safety guaranteed by the runtime is gone everywhere.

In Hard Object, each process can just be another entire operating system. Forget dual booting, just run Windows in one process and Linux in another.

4.8.9 the World Wide Web is Now a Web of Programs, not Documents

The web as an ad-hoc agglomeration of interpreted documents and scripts doesn't make sense anymore. A web browser becomes simply a shell consisting of a (1) networking library and (2) a UI library.

The UI, including pages that are primarily just documents (traditional web) can come as a pre-parsed AST. This saves parsing time. A standard layout still allows treating them as documents.

Software installation becomes obsolete as every app can just be downloaded on demand from a URL.

4.8.10 "Installed" Apps No Longer Make Sense

Continuing in the above theme, as web pages are now first-class programs that can run as any other program, other means of installing software no longer make sense. That is, there is no difference between a web app and an "installed" app. The machine is now a small kernel, some drivers, some system libraries, web shell, and a cache of web programs. There is no longer a need to trust an app with your entire system just to get its services. In the future, the idea that you trusted your entire system, bank account, etc. to every author of every app on your system will be viewed as crazy.

4.8.11 Monolithic Kernels No Longer Make Sense

A monolithic kernel as the basis for an operating-system no longer makes sense: the kernel de-constructs into just a few trusted system libraries which, in this embodiment, need master powers.

Core:
  Interrupt Handler (Context Switcher): In this embodiment, a process/thread scheduler needs a module that can swap the current register values with a process/thread control block on the heap.
  Exception Handler (Fault Handler): In this embodiment, when Hard Object protections fail, should receive details from the hardware of the nature and location of the fault and respond; should allow software to register some handlers in some cases, such as when untrusted code is downloaded and then starts behaving badly; should also allow for registration of alarms on untrusted agents to prevent runaway consumption of CPU.

Memory management:

Text Page Manager (Linker/Loader): In this embodiment, exec( ) and JIT compilers need to request a conversion from data pages to text pages, including computing the control flow graph and the dyn-target-tag for pages that have the control-flag set; should also be prepared to inline getters and setters and other short routines across agency if requested by an optimizer.

Data Page Manager: In this embodiment, pagers/swappers need a way to manage virtual memory, loaders need a way to get new global and stack memory, and module-local allocators need a way to get new heap memory.

Inter-agent communication:

Agent Control Manager (Coroutine Manager): In this embodiment, synchronous calls between agents require a manager to mediate the agency registers.

Agent Data Manager (Transaction Manager): In this embodiment, pessimistic and optimistic transactions require a manager to mediate the agent-gates on objects.

Cross-cutting traversal:

Stack walker: In this embodiment, except ion frameworks, debuggers, profilers, and garbage collectors need a library for walking the stack (see §4.9.10).

Heap walker: In this embodiment, serialization frameworks, pagers/swappers, debuggers, profilers, and garbage collectors need a library for walking the heap.

Drivers are User Mode Singleton Objects:

I/O ports can be assigned a mod-ownable-id, fixed at hardware design time. Consider this port to be owned by that module-id in the sense that no other module may access it (except using master powers). Alternatively, we can wrap an small ad-hoc bloc around the memory-mapped I/O; then we don't really need to special-case anything in hardware.

Any driver logic can be put into the methods of that module, making the port behave just as a singleton software object. Accessing an I/O port becomes the same as calling methods on any other software object.

Note that drivers can use the caller-mod-owner-id to identify which modules are contacting them and maintain an access control list (ACL) of which modules may do so, such as a registered filesystem.

Further, in this embodiment we constrain any Direct Memory Access (DMA) from the device attached to that port to have access only to memory objects owned by that mod-ownable-id. Thus, in this embodiment, DMA cannot corrupt system memory.

The Rest of the Traditional Kernel can Now Run in User Space:

The scheduler and interrupt handler can just use the context switcher to switch process/thread control blocks in and out.

The file system can simply talk directly to driver objects.

The pager/swapper can just use the memory manager to move pages in and out.

4.8.12 Virtual Machines/Hypervisors No Longer Make Sense

We may build a single-address space operating system; if hardware support for separate address spaces is retained, we may run a separate (Hard Object-aware) operating system in each, thereby eliminating the need for a virtual machine/hypervisor layer.

4.9 Stack

There are multiple alternative ways for managing the stack meta-data; here we make an aspect-oriented evaluation of the various possibilities.

4.9.1 Desired Properties

There are several properties we would like of whatever scheme we choose:

use legacy compiler: note that we can insert inline assembly instructions using source-to-source transformations.

use legacy stack tools: for legacy debuggers and profilers to work we must not change the distance between the frame pointer and the arguments; however we may still add more locals to a stack frame.

link with legacy code: doing this imposes the same requirements as using legacy (prior art) stack tools for call boundaries that cross into the legacy module at boundary crossing.

avoid shadow data-structures: we want avoid adding shadow regions of memory for storing meta-data (if we can).

avoid predicting protected calls: we do not want to have to predict if a call is going to be protected or not before pushing arguments.

Note that predicting protected calls is problematic for several reasons. (1) Doing this optimally requires performing an undecidable static analysis. (2) Avoiding such undecidable prediction requires erring on the side of preparing for a protected call which will sometimes be wasted work. (3) Some strategies require computing a pointer to the top argument; in such an embodiment, this pointer must be saved and restored in the presence of nested function call preparation: that is, a compiler can nest argument computation, first pushing some arguments, then pausing to make a nested inner call, before continuing on to make the original outer call.

4.9.2 Organization

The stack is allocated as usual in x86-64 and grows downward. There Hard Object registers which delimit the stack are as follows (recall most of these from §4.4.4).

stack-base-ptr points at the least word of the data above the stack.

caller-protect-ptr points at the least caller temporary of the frame of the last protected call.

flow-protect-ptr points at the saved return address of the last protected call.

stack-limit-ptr points at the maximum extent of the stack.

We also assume the existence of the prior art x86 stack mechanisms:

stack-ptr idiomatically in x86 points at the datum on the top of the stack.

Further, recall from §4.6.4 that references may be saved on the stack.

frame-ref-flag-array: each flag of this register annotates a word on the stack starting with the first word after the one pointed to by the caller-protect-ptr register; see §4.4.4.

Note that in the shadow stack design staged-caller-protect is a real register, whereas in the mainline and post-legacy designs it is only the name of a value computed by the call instruction at the time of call; see the specific designs below for details.

These registers cannot be modified by user-mode code; they are managed by the call and return instructions or by code having master powers.

Ownership and Agency of Stack Pages

Note that a mod-ownable-id set to the nobody-mod-id denotes an unallocated heap object and therefore in order to avoid ambiguity, stack pages should have a mod-ownable-id of something other than nobody-mod-id. We suggest that stack pages be large object pages (see §4.10.4) having mod-ownable-id set to the master-mod-id (see §4.5.3).

The agent-gate of a stack page should normally be constrained to only that of its thread, unless being walked by a trusted system stack walker library, such as during garbage collection.

Calling Conventions

Note that, in this embodiment, we must compile protected function calls to use the caller-save calling convention so the caller need not trust the callee to save and restore the caller's registers. The callee-save calling convention may be used for unprotected module-internal calls or calls made by legacy code; see §4.12.

4.9.3 Stack Constraints and Invariants

We maintain the following invariants, collectively called the Stack-Integrity Invariants. (Recall that on most hardware architectures, the stack grows down; without loss of generality we describe our design for a machine where this is the case; the design is easily modified for a system where the stack grows up in the obvious way.)

Stack data at and above caller-protect cannot be accessed during the protected call.

Stack data within a flow-protect range (see below) at and above flow-protect cannot be accessed during the protected call;

Stack operations, such as push, pop, call, and return, cannot access memory beyond the stack-limit.

Note that in the mainline and shadow designs (below) the flow-protect rage extends for only one word, protecting only the saved return address, whereas in the post-legacy design, it extends for four words, protecting also the saved frame-ref-flag-array, saved flow-protect, and saved caller-protect.

Constraint on Access to Stack Data

We allow a user-mode access to stack data when the target datum is (1) within the current frame and (2) is not within the flow protect range:

stack-base-ptr>target, AND
caller-protect-ptr>target, AND
target not in flow-protect range (from flow-protect to flow-protect top), AND
target≥stack-limit-ptr.

Constraint on Access to Stack Meta-Data

Sometimes instructions themselves (call, return, etc.) access the stack meta-data. We also constrain such meta-accesses as follows:

stack-base-ptr>target, AND
target≥stack-limit-ptr.

Note that one effect of these two constraints is that code having master powers (such as a garbage-collector) can move stack-base-ptr to freeze access to a region of the stack (perhaps temporarily).

Stack-Ptr Invariant

The following Stack-Ptr Invariant holds whenever the stack pointer is used for call, return, read, or write:

flow-protect≥stack-ptr≥stack-limit.

The invariant is satisfied by the initial conditions set by the loader.

Call, return, push, and pop fault unless the stack-ptr invariant holds before and after the operation. Reading or writing through the stack-ptr in any way (push, pop, or otherwise) faults unless the stack-ptr invariant holds at the time of the read or write.

Stack-Frame Invariants

The following Stack-Frame Invariants holds at all times:
SF1: caller flow-protect≥caller-protect;
SF2: caller-protect≥flow-protect range top;
SF3: flow-protect≥stack-limit.

The basis case is satisfied by the initial conditions set by the loader.

These invariants are trivially maintained by unprotected call and return as using stack temporaries and making non-protected function calls does not change the Hard Object stack meta-data registers.

The induction step is that these invariants are maintained by protected call and return. The proof of this depends on which stack meta-data design is used; therefore we prove each separately below in §4.9.7, §4.9.8, and §4.9.9.

4.9.4 Indicating Caller-Protect

When making a protected call there are two ways to indicate the location of the last local in the caller frame, which will become the new value of the caller-protect register.

cp=scp: using an absolute staged-caller-protect pointer;
cp=sp+off: using an offset relative to the stack-ptr at the time of call.

Option/embodiment cp=scp means a legacy compiler works: we can insert an instruction to save the stack-ptr just before we start pushing arguments, using, say, a new staged-caller-protect register later read by the call instruction; we thereby avoid the need to determine how many bytes of caller locals were intended to be used as arguments, which as a practical matter is infeasible without knowledge of the compiler internals. However to do this we must predict when we are about to make a protected call and we must save and restore this staged-caller-protect register when nesting function calls.

Option/embodiment cp=sp+off uses internal compiler knowledge to compute the needed offset, avoiding the need to externally observe compiler behavior and then store that observed value across nested function call preparation; that is we may simply determine the new value of caller-protect at the point of the call instruction. However in this embodiment a legacy compiler does not work as the compiler must compute the offset.

4.9.5 Saving Protection Registers

There are multiple places to save the frame-ref-flag-array, caller-protect, and flow-protect registers for the duration of a protected call:

save@cp: at and above the address pointed to by caller-protect;
save@fp: just above the return address, which is pointed to by flow-protect;
save@sh: on a separate shadow stack.

Option/embodiment save@cp means client code must predict when a call is going to be protected and before pushing arguments reserve space on the stack for the protection registers. Note that this embodiment does not work with a legacy compiler.

Note that in option/embodiment save@fp linking to legacy code and using legacy tools does not work because we change the distance between the initial stack-ptr and the arguments. Again note that in this embodiment a legacy compiler does not work.

Option/embodiment save@sh solves many problems but adds further complexity when combined with cp=scp if staged-caller-protect is also saved on the shadow-stack during nested function call preparation: we want to make sure the client software cannot get the shadow stack out of sync by staging a protected call and then returning without using it.

4.9.6 Good Points in the Design Space/Various Stack Embodiments

Here are three good points in the design space/embodiments.

Mainline Embodiment: Save Stack Meta-Data Above Caller-Protect

For the mainline design/embodiment we chose save@cp and cp=sp+off. This seems to be the easiest design to explain and also admits of legacy tools and linking with legacy code. The compiler should err on the side of guessing a protected call when it cannot predict for sure that the call is unprotected; this means that sometimes it reserves three words unnecessarily.

Legacy-Compiler Embodiment: Save Stack Meta-Data on Shadow-Stack.

For a design/embodiment which supports a legacy compiler we chose save@sh and cp=scp. (Such a design makes a software simulation of Hard Object easier to implement.) The shadow stack is an additional source of memory fragmentation. If a protected call is prepared but never made the resulting shadow stack corruption should not be allowed to persist across a protected return; in this embodiment, we do this by automating all access to the shadow stack using new instructions, including the act of setting staged-caller-protect, and then asserting that the shadow stack has returned to its initial state at the protected return. The details of this design are described in §4.9.8 below.

Post-Legacy Embodiment: Save Stack Meta-Data Above Flow-Protect.

When legacy code, tools, and compilers are no longer of interest, save@fp and cp=sp+off is the option/embodiment that works best. The details of this design/embodiment are described in §4.9.9 below.

4.9.7 Mainline Embodiment, Above Caller-Protect

In this section we describe the save@cp and cp=sp+off design for managing stack meta-data.

Specifying Protected Calls

We provide new instructions to specify when protection should be used on a call.

Recall that, in this embodiment, on a protected call, the number of bytes of client arguments must be passed as the size-of-function-arguments instruction-argument to the call instruction. Note that (in all three stack designs) size-of-function-arguments may have to be computed at runtime in the case of variable-argument functions.

Below we use the term stage-caller-protect to mean to subtract 8·3 from the stack pointer, thereby reserving three words on the stack above the arguments.

(default) call-no-protect: never uses protection; faults if cross-module unless calling from the legacy module; sets caller-mod-owner-id to legacy in the special case of calling from the legacy module to a non-legacy module.

call-protect: always uses protection; stage-caller-protect beforehand and pass size-of-function-arguments.

call-protect-if-cross-module: uses protection if and only if cross-module; stage-caller-protect beforehand and pass size-of-function-arguments.

Undecidability warning: using call-protect-if-cross-module optimally for dynamic calls can require non-trivial and potentially undecidable points-to analysis; in cases that cannot be statically decided the caller should conservatively allocate three words on the stack before the arguments.

Changes to Call Instruction (1) Manage protection: use the protected call subroutine of §4.9.7 if the call is protected:
  if the call instruction is call-protect, OR
  if the call instruction is call-protect-if-cross-module and the call is cross-module.
  If the call instruction is call-no-protect and the call is cross-module and not from the legacy module then fault.
(2) Push the return address.
(3) Manage module-id registers: when cross-module
  (a) set caller-mod-owner to current-mod-owner;
  (b) set current-mod-owner to the mod-owner of the callee text page.
(4) Transfer control: jump to the target address.

Changes to Return Instruction

The return is cross-module when the return address points to a module other than current-mod-owner.

(1) Manage protection:
  if stack-ptr=flow-protect,
  use the protected return subroutine of §4.9.7;
  otherwise fault if the return is
    a cross-module return AND
    to a module other than the legacy module.
(2) Set stack-ptr per the calling convention (see §4.12.1):
  When returning to a Hard Object module (from legacy or another Hard Object module) ignore the argument to the return instruction: force caller-cleanup.
  When returning to the legacy module, obey the argument to the return instruction: use callee-cleanup if specified.
(3) Manage module-id registers:
  (a) reset current-mod-owner from mod-owner of the page to which we are returning;
  (b) set caller-mod-owner to nobody-mod-id; if the caller wants it back it can have saved it.
(4) Transfer control: jump to the return address.

Protected Call Subroutine

For a cross-module protected call the caller should save and restore any registers that it expects to persist across the call and clear any registers that it wishes to keep private from the other module.

Below, staged-caller-protect means the pointer to the last datum of the caller locals, computed by adding size-of-function-arguments to the stack-ptr at time of call.

(1) Check staged-caller-protect: fault unless
  flow-protect≥staged-caller-protect+8·3, AND
  staged-caller-protect≥stack-ptr.
(2) Manage frame-ref-flag-array:
  (a) truncate the frame-ref-flag-array by zeroing all bits in positions ≥caller-protect—stack-ptr (destroy reference-ness of anything below the callee arguments, including what will be the saved return address);
  (b) save frame-ref-flag-array at
    staged-caller-protect+8·2;
  (c) left-shift frame-ref-flag-array by caller-protect—staged-caller-protect bits (preserve reference-ness of the callee arguments);
(3) Manage caller-protect:
  (a) save caller-protect at
    staged-caller-protect+8;
  (b) set caller-protect to staged-caller-protect.
(4) Manage flow-protect:
  (a) fault unless stack-ptr≥stack-limit+8;
  (b) save flow-protect at staged-caller-protect;

(c) set flow-protect to stack-ptr−8, where the return address is about to be pushed.

Protected Return Subroutine
(1) Manage flow-protect:
 (a) Restore old flow-protect from its saved location at caller-protect.
(2) Manage caller-protect:
 (a) Temporarily save old caller-protect—caller-protect as caller-protect-diff.
 (b) Restore old caller-protect from its saved location at caller-protect+8.
 (c) If caller-protect>stack-base-ptr, then fault.
(3) Manage frame-ref-flag-array:
 (a) Restore old frame-ref-flag-array from its saved location at caller-protect+8·2.

Note the that the callee may return values by leaving references on the stack.

Mainline Maintains Invariants

Protected Call

In this embodiment, the caller-protect and flow-protect registers only change on a protected function call. Therefore we consider the value of all of the registers just before the execution of the call instruction. See §4.9.7 for the protected call subroutine.

SF1: protected call asserts that flow-protect≥staged-caller-protect+8·3.
 SF2: flow-protect gets stack-ptr−8, and flow protect range is one word, 8, and a protected call faults unless staged-caller-protect≥stack-ptr.
 SF3: flow-protect gets stack-ptr−8 and a protected call faults unless stack-ptr≥stack-limit+8.

Protected Return

Both caller-protect and flow-protect are restored from the protected part of the stack. See §4.9.7 for the protected return subroutine.

4.9.8 Legacy-Compiler Embodiment, Shadow Stack

In this section we describe the save@sh and cp=scp design for managing stack meta-data by comparing it to the mainline design.

Extended Schema

We add a new register for communicating with the call instruction.
 staged-caller-protect-ptr register: value caller-protect should be set to by the call instruction.

We add a new field to the text part of the page table entry, using one of the reserved bits.
 use-shadow-stack-flag: means instructions calling from/returning to this text page use the shadow stack for saving frame-ref-flag-array, staged-caller-protect, caller-protect, and flow-protect.

We add new registers to delimit the new shadow stack.
 shadow-stack-base-ptr register: the last word of the data above the shadow stack.
 shadow-stack-ptr register: top of the shadow stack of saved Hard Object stack registers.
 shadow-stack-limit-ptr register: the maximum extent of the shadow stack.

(Just as with the main stack, we suggest that stack pages be large object pages (see §4.10.4) having mod-ownable-id set to the master-mod-id (see §4.5.3). Note that a mod-ownable-id of nobody-mod-id denotes an unallocated heap object and should therefore not be used for the stack or shadow-stack.)

New Constraints
 Pushing or popping the shadow-stack-ptr faults unless:
 shadow-stack-base-ptr>shadow-stack-ptr≥shadow-stack-limit.

Note that the shadow stack grows down, just as the standard stack does.

Note that with the shadow-stack-base-ptr, the shadow stack can be discontiguous just like the main stack; see §4.9.10.

We suggest that shadow stack pages be owned by the master module-id.

As the shadow-stack is managed entirely by Hard Object instructions we do not need another register to delimit the upper end of memory allocated to the shadow stack.

New Calls

The shadow stack embodiment is rather fragile so new, more precise, call instructions are required for this embodiment:
 call-no-protect: never protected; faults if cross-module unless calling from the legacy module sets caller-mod-owner-id to legacy in the special case of calling from the legacy module to a non-legacy module. Client should never stage-caller-protect beforehand.
 call-protect: always protected. Client should always stage-caller-protect beforehand.
 call-protect-discard-on-internal:
 (don't know if cross-module); protected if and only if cross-module; undoes a prepared protection on an internal call before making the call. Client should always stage-caller-protect beforehand.
 call-protect-if-cross-module:
 (know if cross-module); protected if and only if cross-module. Client should stage-caller-protect beforehand if and only if cross-module.
 (default) call:
 (support legacy code and legacy compilers); use call-no-protect if calling from the legacy module; call-protect-if-cross-module if a static call; call-protect-discard-on-internal if a dynamic call. Perform a stage-caller-protect beforehand unless (1) calling from legacy code or (2) making an internal static call; this is the maximally efficient semantics that is guaranteed to be computable using a decidable static analysis.

Undecidability warning: using call-protect-if-cross-module correctly for dynamic calls can require non-trivial and potentially undecidable points-to analysis.

Managing Staged-Caller-Protect

We add a new stage-caller-protect instruction for managing the staged-caller-protect register.

Before pushing arguments for a protected call, the client should simply issue the stage-caller-protect, instruction; this technique obviates any need for the client, to reserve words on the stack. This instruction works as follows.
 stage-caller-protect:
 (1) fault unless stack-ptr # NULL;
 (2) save staged-caller-protect on shadow stack;
 (3) set staged-caller-protect to stack-ptr.

Using a Legacy Compiler:

In this embodiment, for this design to work with a legacy C or C++ compiler a source-to-source transformation must be done on the code to locally alter the way functions are called:
 Insert the stage-caller-protect instruction before each call.
 Unpack nested calls where one function uses a call to another as an argument.

Protected Call Subroutine
(1) Check staged-caller-protect: fault unless
 staged-caller-protect≠ NULL, AND
 flow-protect≥staged-caller-protect, AND
 staged-caller-protect≥stack-ptr.

(2) Manage frame-ref-flag-array:
　(a) truncate, save, then left-shift frame-ref-flag-array as in the Mainline design, except save frame-ref-flag-array by pushing it onto the shadow stack; see §4.9.7.
(3) Manage caller-protect:
　(a) push caller-protect on the shadow stack;
　(b) set caller-protect to staged-caller-protect;
　(c) set staged-caller-protect to NULL.
(4) Manage flow-protect:
　(a) fault unless stack-ptr≥stack-limit+8;
　(b) push flow-protect on the shadow stack;
　(c) set the flow-protect register to the current stack-ptr−8, which points to where the return address is about to be pushed.

Protected Return Subroutine
(1) Fault unless staged-caller-protect=NULL.
(2) Restore old flow-protect from shadow stack.
(3) Restore old caller-protect from shadow stack. If caller-protect>stack-base-ptr, then fault.
(4) Restore old frame-ref-flag-array from shadow stack.
(5) Restore staged-caller-protect from shadow stack.

Stage/Call Protection Agreement
　When making a call
　　a stage-caller-protect should be issued before pushing arguments
　　if and only if the call those arguments are for is protected.
　Disagreement between these two steps is a problem:
　　if a protected call is made without having been prepared by a stage-caller-protect, it will use the wrong setting for caller-protect, faulting if that is NULL;
　　if an unprotected call is made having been prepared by a stage-caller-protect, that call will work but
　　　(1) for subsequent protected calls the mismatch between the staged-caller-protect-s will result in improper protection of the local stack,
　　　(2) after which the protected return will then fault with a non-NULL staged-caller-protect.

Shadow Maintains Invariants
　See §4.9.8 for details of the shadow stack design.

Protected Call
　In this embodiment, the caller-protect and flow-protect registers only change on a protected function call. Therefore we consider the value of all of the registers just before the execution of the call instruction.
　　SF1: a protected call faults unless flow-protect≥staged-caller-protect.
　　SF2: a protected call faults unless staged-caller-protect≥stack-ptr, new caller-protect gets staged-caller-protect, and new flow-protect gets stack-ptr−8.
　　SF3: flow-protect gets stack-ptr−8 and a protected call faults unless stack-ptr≥stack-limit+8.

Protected Return
　Stack registers are restored to their pre-call values from the shadow stack. As only Hard Object instructions can access the shadow stack, the only action the client can take that could corrupt the shadow stack would be if there were a stage-call protection disagreement; see §4.9.8.
　At the start of a protected call the staged-caller-protect register gets NULL. The only way to set staged-caller-protect is to use the stage-caller-protect instruction, which checks that its argument≠NULL. Using the stage-caller-protect instruction saves the old staged-caller-protect on the shadow stack. The old staged-caller-protect will be restored by the protected return for the subsequent protected call.
　In this embodiment the only way to return staged-caller-protect to NULL is to make a protected call for each staging with each staged-caller-protect. Since a protected return checks that staged-caller-protect=NULL at return it is not possible for the shadow stack to have more data on it than it did at the start of the call.
　Further, the software cannot make a protected call without having made a staged-caller-protect because a protected call asserts that stage-caller-protect≠NULL. Therefore at return it is not possible for the shadow stack to have less data on it than it did at the start of the call.

4.9.9 Post-Legacy Embodiment, Above Flow-Protect
　In this section we describe the save@fp and cp=sp+off design for managing stack meta-data by comparing it to the mainline design.
(1) In this design, flow-protect protects four words instead of just one.
(2) There is no need to prepare for a protected call by decrementing the stack-ptr by three words: the stack-ptr is decremented three words on a protected call by the call instruction before pushing the return address.

Call and Return
　The same three call functions of §4.9.7 suffice as they did for the mainline design. The mainline basic call and return routines, described respectively in §4.9.7 and §4.9.7, work as-is; however, in this embodiment, the protected call and return subroutines, described respectively in §4.9.7 and §4.9.7, must be altered as below.

Protected Call Subroutine
　Below, staged-caller-protect means the pointer to the last datum of the caller locals, which is computed by adding size-of-function-arguments to the stack-ptr at time of call.
(1) Check meta-data
　(a) Fault unless
　　flow-protect≥staged-caller-protect, AND
　　staged-caller-protect≥stack-ptr.
　(b) Fault unless stack-ptr≥stack-limit+8·4.
(2) Manage frame-ref-flag-array:
　(a) truncate, save, then left-shift frame-ref-flag-array as in the Mainline design, except save frame-ref-flag-array by pushing it onto the stack; see §4.9.7.
(3) Manage caller-protect:
　(a) push caller-protect;
　(b) set caller-protect to staged-caller-protect.
(4) Manage flow-protect:
　(a) push flow-protect;
　(b) set flow-protect to stack-ptr−8·4, where the return address is about to be pushed.

Protected Return Subroutine
(1) Restore frame-ref-flag-array from its location on the stack at flow-protect+8·3.
(2) Restore caller-protect from its location on the stack at flow-protect+8·2. If caller-protect>stack-base-ptr, then fault.
(3) Restore flow-protect from its location on the stack at flow-protect+8.

Post-Legacy Maintains Invariants
　See §4.9.9 for details of the post-legacy stack design.

Protected Call
　In this embodiment, the caller-protect and flow-protect registers only change on a protected function call. Therefore we consider the value of all of the registers just before the execution of the call instruction.
　　SF1: a protected call checks that flow-protect≥staged-caller-protect.
　　SF2: flow-protect gets stack-ptr−8·4, and flow protect range is four words, 8·4, and a protected call faults unless staged-caller-protect>stack-ptr.
　　SF3: flow-protect gets stack-ptr−8·4 and a protected call faults unless stack-ptr≥stack-limit+8·4.

Protected Return

Both caller-protect and flow-protect are restored from the protected part of the stack.

4.9.10 Stack-Base-Ptr Idioms

Using the stack-base-ptr and stack-limit-ptr, we can create a discontiguous (meta-)stack and make very fine-grained garbage collection with only tiny garbage collection pauses.

Meta-Stack of Discontiguous Stack Regions

Note that the stack-base-ptr mechanism allows for a discontiguous stack, as follows. On a stack overflow we fault into a trusted handler which
(1) finds new space for more stack and mark it a stack page,
(2) saves the stack-base-ptr, stack-ptr, and stack-limit-ptr ("stack-*-ptr-s" below) there, and
(3) then sets the new stack-base-ptr and stack-limit-ptr to delimit this new area, minus the three saved words.

These saved stack-*-ptr-s are protected from heap accesses by being on a stack page and are protected from stack accesses by being outside of the stack-base-ptr and stack-limit-ptr range of every thread.

The stack is restored after return when the caller attempts to access a stack temporary and faults, the handler finding the old stack-*-ptr words at the current stack-base-ptr.

This use of the stack-*-ptr-s effectively makes a meta-stack of stack regions.

Concurrent Garbage-Collection

Note that the stack-base-ptr mechanism allows for a garbage-collection thread to walk the stack temporaries of a target thread while exhibiting only very short pauses.
(1) Pause the target thread.
(2) Walk the top (most fresh) frames to the limits of the stack-base-ptr.
(3) Move the stack-base-ptr to constrain stack accesses to only the top (freshest) frames of the target thread.
(4) Restart the thread, leaving the stack-base-ptr in place; scan the stack towards lower (less fresh) frames and move the stack-base-ptr to reveal back to the client code frames that have been scanned.

If the target thread runs without popping the top few frames, it will operate unaffected by the fact that the garbage-collection thread is still walking the rest of its stack. If the target thread happens to pop the top few frames, it will fault and will be paused again until the garbage-collection thread has scanned a few more frames (note that in this embodiment the fault handler must take care to distinguish this case from the discontiguous stack case above, using, say, a garbage-collection-in-progress flag). What might have otherwise been a garbage-collection pause is turned into a garbage-collection hiccup.

4.10 Heap

In §4.4 and §4.5 we described a version of Hard Object where we managed the heap at the page granularity. In order to make Reference, §4.6, and Agency, §4.7, work, in this embodiment we need a mechanism for partitioning the heap at the word-granularity and enforcing that partition in hardware.

We partition heap memory into boxes: contiguous regions delimited at the word granularity; further, we support a notion of arrays and tables of boxes.

In this embodiment, we use hardware checks to allow access to a box only from an aligned pointer and an offset that does not exceed the box size.

We provide space to annotate boxes with further meta-data, and as the hardware is aware of this meta-data, its semantics can be enforced in hardware.

Later in §4.11 we extend such boxes to objects by annotating them with the meta-data which in this embodiment are needed to provide Modularity, Reference, and Agency, and other properties.

As these boxes will eventually be objects, we refer to them herein as objects as well unless we wish to emphasize the distinction.

4.10.1 Bounding Access to a Box

In this embodiment, a field in a singleton object may only be accessed using a object→offset addressing mode; the hardware checks
  that the object is allocated,
  that the object base pointer is object-aligned, and
  that the offset is object-bounded.

Note that we constrain all access to these objects by these bounds, whether or not they are through pointers or references and whether or not the object has the refable-target-flag set.

Extension to Arrays and Tables:

In this embodiment, the field in an object within an array of objects may only be accessed using a array[index]→offset or table<row>→offset addressing mode; in addition to the checks above, the hardware also checks
  that the index is within the array bounds.
See §4.10.7 for more on this.

4.10.2 Page Kinds

There are several basic strategies for managing objects depending on basic properties of the usage.

Size: Large Vs Small Objects.

Strategies for managing objects depend substantially on the size granularity of the object.
  Large: Any power of two multiple of 4K-bytes.
  Small: Any multiple of a word up to a 4K-bytes.
  (Note that in this embodiment we not only allow but also depend-upon the ability to make pages larger than 4K, as to conserve bits, we express bloc sizes as a multiple of the page size; see §4.10.3 below.)

Uniformity: Ad-Hoc Vs Uniform Objects.

Small objects are subject to two allocation strategies which are employed at the page granularity.
  Ad-hoc "mini-pages" are organized in a binary buddy system allocator (see §4.10.6). (Such pages are useful for the traditional usage pattern of staticly-allocated global objects.)
  Uniform class instances are organized in a slab-allocator (Such pages are useful for the traditional usage pattern of dynamically-allocated heap objects.)

Page-Kind-Enum:

The different kind of pages which in this embodiment are needed to provide for the distinction between text/data, large/small, ad-hoc/uniform are so great that we simply need a different kind of page for each.

In order to indicate the kind of the page, in this embodiment we need to ask for a two-bit field on the existing non-Hard-Object page table entry data-structure (in addition to the 64-bit Hard Object PTE word below).
  Add a 2-bit page-kind-enum to each page table entry of the existing architecture.
    0: data/large.
    1: data/small/ad-hoc.
    2: data/small/uniform.
    3: text.

(Zero is page-kind data/large because that is the least dangerous kind for a page to accidentally be.)

In this embodiment, the page-kind of a page can be written only by master.

4.10.3 Blocs

All three kinds of data pages are grouped together into a bloc: we think of and use a bloc as a large page:

The Hard Object meta-data for the first page in a bloc applies to the entire bloc.

(Note that, implemented naively, this increases TLB pressure as accessing any page in a bloc requires also loading the TLB entry for the first page in the bloc. We suggest that there may be optimizations to mitigate this, such as, on a TLB miss for a mid-bloc page, instead of loading the Hard Object meta-data for the page (which will be ignored anyway, except for the bloc-exp-size (§4.10.3) which, in this embodiment, must be the same across all pages in the bloc) filling the TLB with the Hard Object meta-data of the head page of the bloc.)

Delimiting Blocs

In this embodiment, we require that blocs be aligned on their size, so that if we annotate every PTE in a bloc with the bloc size, then given a pointer into a bloc we can easily find the boundaries of the bloc and, in particular, the first page the Hard Object PTE header of which contains the bloc meta-data.

Add a 4-bit bloc-exp-size field to the Hard Object PTE header for each kind of data page. Convert this to a bloc size as follows: (1) add 1 to the bit representation; (2) exponentiate base 2; (3) multiply by the size of the data page.

Note that in x86-64, pages are $2^{12}$ bytes and then grow by a factor of $2^9$ thereafter; that is, on an x86-64 system a page can be 4K-bytes, 2M-bytes, or IC-bytes. Therefore the bloc-exp-size can designate any power of 2 (some redundantly) from 4K-bytes to ($2^{15} \cdot 1$ G-bytes=) 32 T-bytes. Should one desire a larger bloc, one would probably be using a system having pages even larger than 1 G-byte; we could multiply the bloc-exp-size by such larger pages and therefore obtain even larger bloc sizes.

In this embodiment, the bloc-exp-size of a page can be written (1) only by master and (2) only when the page is of page-kind data large object.

Transactional Maintenance of Multi-Page Blocs

In this embodiment, as a bloc is in fact multiple pages we must be careful when performing operations that we would like to be semantically atomic and isolated, such as allocation, de-allocation, splitting, merging, and changing the page-kind or meta-data; we detail how to do that below.

Bloc Page-Kind and Meta-Data Management:

In this embodiment, changing bloc page-kinds can only be done by master.

Note further that, as discussed below, unless a bloc is completely locked using agent-gates, altering any meta-data that delimits the bloc or boxes within the bloc is a race condition. However, with small object pages, even the locations of the agent-gates that, in this embodiment, need to be locked depend on such meta-data. Therefore the hardware simply will not allow any of the meta-data delimiting the bloc or the boxes within a bloc to be changed at all, even by master, unless the page is a data large object page.

In this embodiment:

Changing the bloc-exp-size can only by done by master and only when the page-kind is data large object.

Once a page has a small object page-kind, none of the meta-data which determines where the boxes are within the bloc may be changed, even by master.

For small ad-hoc blocs, this means that the following fields cannot be changed, even by master: obj-hdr-flag (on the obj-flag-array), obj-exp-pos-size (on each object), software-bloc-hdr-size, bloc-exp-size.

For small uniform blocs, this means the following fields cannot be changed, even by master: obj-pos-size, array-exp-br2-size, obj-align-enum, array-align-enum, array-hdr-loc-enum, software-bloc-hdr-size, bloc-exp-size.

In this embodiment, user-mode modules cannot alter the page-kind nor the Hard Object meta-data that delimits blocs in the PTE header or on the page, and so such modules obtain and dispose of blocs through calls to the system memory manager.

Bloc Granularity Memory Management:

In this embodiment, a module memory manager does not use references to help it track container blocs or pages thereof since container blocs (ad-hoc or uniform) do not have page-granularity ref-target-flag-s. A module memory manager may do without the assistance of the reference mechanism when keeping a linked list of partially filled blocs of each object size (for ad-hoc objects) or class (for uniform objects); this is boilerplate software and can be written once, gotten correct, and reused.

A recommended system for the memory management of blocs is the prior art binary buddy system with a doubly-linked free list for constant-time merging/splitting of buddies when blocs are freed/allocated. This is a global list, so we suggest one doubly-linked list for each bloc size (putting the bloc prev and next pointers into the Software Bloc Header is a straightforward way to make such a linked list; see §4.10.5). The roots of these lists can be kept in a specially-designated collection of ad-hoc objects on an ad-hoc bloc owned by the system memory allocator module.

Note that while the prior art buddy system is known for producing internal fragmentation, when the bloc is made of whole pages most of the fragmentation (except for the unused part of the partially-used page) is a waste of virtual rather than physical memory; at worst such page-granularity memory fragmentation wastes some PTE entries which will never end up cached in the TLB anyway. That is, we only use the buddy system in a way that mitigates its worst weakness.

Large Object Bloc Splitting and Merging:

The system memory manager keeps all unallocated blocs as large object data pages; see §4.10.4 below.

When we split a large object bloc into two (or many) new blocs, a top bloc and a bottom bloc, we do not want an Isolation failure where other threads can see the bloc in a partially split state. We solve this by syncing the bloc before splitting it, which will exclude other threads. However, while we are splitting the bloc, we are reconfiguring the headers of the pages of the second bloc to point to a different first page, the page at the head of the new bloc; note that new first page has a different agent gate. (The top bloc has as its first page the same first page as the bloc being split.) Therefore, before splitting a bloc, we initialize the agent-gate in what will be each new header as if it were synced to the agent performing the splitting.

The split is effected by changing the bloc-exp-size on the pages. Now, as this is being done, another thread attempting to access any word in the bloc may be directed to the header for the old bloc being split or the header for the new bloc, depending on the progress in reconfiguring the pages at the time of access. This race condition does not matter as all of these agent-gates say the same thing: that the bloc is synced by the agent performing the split and, in this embodiment, thus cannot be accessed. Once the split is complete, these blocs may be individually unsynced and used as independent blocs.

To merge large-object blocs, first sync all of them and then reverse the above process.

Changing a Large Object Bloc to Container Bloc:

When a bloc is unused, it is allocated as a large object and owned by the nobody-mod-id. Converting such a bloc to, say, a small-object container bloc (for ad-hoc or uniform objects), involves changing the data and meta-data for each page. During this change part of the bloc will be initialized as a container and part will still be a large object; if an access occurs during this time, something well-defined must happen.

One simple strategy for accomplishing this conversion while remaining well-defined is to do two passes from the bottom (high addresses) to the top (low addresses) as follows.

(1) The first pass
  (a) initializes the page to have all objects owned by nobody-mod-id and be synced by the initializing agent and then
  (b) initializes the PTE to be the new container (note that in this embodiment the bloc-exp-size does not change).
(2) The second pass unsyncs all of the objects.

Sometimes these two passes may be combined, as follows. (1) Ad-hoc pages are easily configured to not contain objects which straddle a page boundary. (2) Some configuration of uniform pages also have the property that the whole object and header are always on one page. In these case the initialization of the pages may be optimized by combining the two passes.

Changing a Container Bloc to a Large Object Bloc:
(1) Delete and sync every object on the page;
(2) sync the software bloc header (see §4.10.5) so no one can allocate more objects on it;
(3) do a garbage-collection if this page is shared by other agents.
(4) Then return the bloc to the system memory allocator, which reverses the process of the above paragraph, converting the page back to a large object page owned by nobody-mod-id.

Finding the Bloc Header and Extent from a Pointer

When data in memory is accessed through a pointer (or reference), the Hard Object system wants to find the bloc meta-data, including the extent of the bloc. There are multiple ways/embodiments of doing this, as follows.

One method/embodiment is for every PTE header in a bloc to contain the bloc-exp-size and for all blocs to be allocated so that they are bloc-exp-size number of pages aligned: that is, for any bloc let N=1+ bloc-exp-size+log (page_size), then the N least significant bits of the address of the first word of the first page of the bloc are all zero. (Note that the prior art buddy system memory management method/algorithm is suited to maintaining this invariant as blocs are allocated and de-allocated.) Given a pointer, if we look at the PTE for the page pointed to by the pointer, look up the bloc-exp-size in that PTE entry, and then mask off the low N bits, we have a pointer to the top of the bloc; knowing the bloc size, we may add and also find the bottom of the bloc, thereby locating the bottom of bloc meta-data.

Another method/embodiment would be to expand each PTE to contain a top-of-bloc pointer which is maintained to point to the top page of the bloc. That top page can contain the bloc size as a field; by adding the bottom of bloc may be found, thereby locating the bottom of bloc meta-data.

4.10.4 Large Objects

We now have motivated sufficient features to fully describe large object pages. Such pages are basically an extension of the naive "data pages" of §4.4 extended to be of any bloc size (rather than that of just a page).

We create a large object by creating a bloc and setting the page-kind to data/large. Note that large objects are just one-to-one with blocs and so the allocation strategy for large objects is to just allocate a bloc and then set its page-kind to data/large.

Further annotation on large objects: We use the Hard Object PTE header of the first page of the large object bloc for further meta-data annotations on the object in §4.11.

4.10.5 Small Object Bottom-of-Bloc Meta-Data

Small object blocs (both ad-hoc and uniform) store per-word meta-data at the bottom in a region called bottom-of-bloc meta-data.

Object Flag Array

In this embodiment, small object blocs need a way to annotate flags onto words in the page. The semantics differs for ad-hoc pages and uniform pages in one critical way:

(1) on ad-hoc pages we simply map a page word to its own flag allowing for word-granularity annotation across the bloc, while
(2) on uniform pages the flag array annotation for the $i^{th}$ word applies uniformly to the $i^{th}$ field of each object.

There are multiple flags to annotate on to each word. By coincidence in both the ad-hoc and uniform cases this number of flags is 3 (as detailed in §4.11). We want to perform only one read of flag array meta-data per data word access; therefore we interleave the flags in triples and make sure the triples do not span multiple words.

Add a obj-flag-array to the bottom-of-bloc meta-data; this array has one flag-triple for each data word in an object, grouped in sets of 21 ($=\lfloor 64/3 \rfloor$) so that triples do not span multiple words.

The nature of these flags also depends on whether the bloc is a container for small ad-hoc object or small uniform objects (see §4.10.6 for one used as the obj-hdr-flag for delimiting small ad-hoc objects).

Further annotation on objects: We also use these flags for further meta-data annotations on the words of object in §4.11.

Software Bloc Header

While small object blocs slice the bloc into many small objects, it can be very convenient to allow the module software to attach meta-data to the bloc itself. For example, such meta-data (1) can be used by the allocator to maintain unused chains of object slots and to chain blocs together, and (2) (on pages of uniform objects) can factor out commonality across objects, such as a pointer to the vtable or even an embedded vtable.

The astute reader will notice that a software bloc header has all of the properties of an object; it amounts to a fourth kind of heap object which, in this embodiment, occurs only exactly at the bottom every bloc.

Software Bloc Header Location and Size:

Software bloc headers are located at the bottom of the bloc. In this embodiment, a bloc that uses them needs to know their size, but can otherwise compute their position.

Add a 7-bit software-bloc-hdr-size field to the Hard Object PTE header for small object pages (ad-hoc or uniform).

Writing the software-bloc-hdr-size under any circumstances is a race condition and therefore it can not be written even by master. In this embodiment, to write it, the page must first be turned into a large object page (which, in this embodiment, can be done only by master).

Software Bloc Header Properties:
  Reserve a software-bloc-hdr-data region of data of length software-bloc-hdr-size words within the bottom-of-bloc meta-data. The layout of this section is up to the host-module software.
  Add a software-bloc-hdr-flag-array to the bottom-of-bloc meta-data; this array has one flag-pair for each data word in the software-bloc-hdr-data, grouped in sets of 32 ($=\lfloor 64/2 \rfloor$) so that pairs do not span a word. The size is 0 to 4 words depending on the if the software-bloc-hdr-size is 0, 1-32, 33-64, 65-96, or 97-127 words. We detail these flags in §4.11.
  Further annotation on software bloc header objects: We use more space the bottom-of-bloc for further meta-data annotations on the object in §4.11.
  (The software-bloc-hdr-flag-array is the object flag array of the software bloc header; however in this embodiment it only has two flags, rather than three.)

4.10.6 Small Ad-Hoc Objects

We want to provide sub-page-size objects that otherwise have the same semantics as large objects. We call these ad-hoc small objects; they are particularly useful for the traditional usage pattern of globals.

In this embodiment, note that a small ad-hoc object bloc must be maintained by a trusted system module. The small ad-hoc objects themselves may be owned and accessed by any module, but in this embodiment such objects may only be allocated and de-allocated by the bloc mod-owner.

Small Ad-Hoc Object Header

Each small ad-hoc object has an associated one-word object header located just below the object it annotates. In this embodiment, the size of each object must be a power of 2 minus 1 be size-aligned on the power of 2 to accommodate the header.
    Add a 3-bit obj-exp-pos-size, which indicates the object size including header, from $2^1$ to $2^8$ (in this embodiment, an object must be at least one word for the header and at least another for the data).
    Further annotation on small ad-hoc objects: We use the small ad-hoc object header for further meta-data annotations on the object in §4.11.
    Writing the obj-exp-pos-size under any circumstances is a race condition and therefore it can not be written even by master. To write it, in this embodiment, the page must first be turned into a large object page (which, in this embodiment, can be done only by master).

Obj-Hdr-Flag

In this embodiment, we need to be able to tell if a pointer points at a small object header.
    Add a obj-hdr-flag as one of the flags of the small ad-hoc obj-flag-array.
    To point at a small ad-hoc object, point at its header and use a negative offset; in this way, the pointer is object-aligned exactly when the word it points to has this flag set.
    Writing the obj-hdr-flag under any circumstances is a race condition and therefore it can not be written even by master. To write it, in this embodiment, the page must first be turned into a large object page (which, in this embodiment, can be done only by master).
    Note that globally this information is redundant with the obj-exp-pos-size field on the object headers (which is used to bound the offset into the object); however there is no fast way to use this redundant information to check if an an incoming pointer is object-aligned.

Small Ad-Hoc Object Allocation Strategy

Small ad-hoc objects should be allocated using the binary buddy system.

The buddy system should use a doubly-linked free list for constant-time merging/splitting of buddies when blocs are freed/allocated. Note that, in this embodiment, small ad-hoc objects of the smallest size must split the one word payload into two 32-bit "pointers" for use in the doubly-linked list, where, to economize on bits, we use as our "pointers" object indices relative to the top of the bloc, rather than full pointers. This constraint means that, in this embodiment, blocs of ad-hoc objects must keep all ad-hoc objects of the smallest size (2 words total) in the first $2^{32-8}=2^{24}=16$ million 4K-byte pages (that is, there are at most $2^8$ such objects per 4K-byte page).

While the buddy system results in internal fragmentation, in this embodiment, ad-hoc pages are mostly needed for globals where (1) allocation and deallocation are infrequent and (2) the requirements are often known at once (at the start of a program or the loading of a module) making it possible to solve for a globally optimal layout, rather than attempting to maintain one in the face of incremental allocation and deallocation.

4.10.7 Small Uniform Objects

A common idiom in software engineering is a slab allocation strategy: collecting all objects of a particular class together on a contiguous bloc of pages. We want to provide a slab allocator because properties uniform across the objects may be factored out. We call these uniform small objects; they are particularly useful for the traditional usage pattern of the heap.

For a given small uniform object bloc
  all objects are of the same size,
  if arrays are used, then all arrays are the same size, and
  the object flag array annotates the same array flags onto each object.

This uniformity also allows the vtable pointer to be factored out into the software bloc header, or even the entire vtable may be embedded there (think of the waste of an entire page of objects all of the same class and therefore all having a word devoted to storing the same vtable pointer.)

The allocation strategy for small uniform objects is a simple slab allocator and a bloc-local free list (the root of the list is kept easily in the software-bloc-hdr).

The semantics of large objects and small ad-hoc objects were basically those of a page, only (1) having more variability in size and (2) having meta-data annotations for the aspects of Hard Object. In contract, uniform objects are deliberately intended for the implementation of objects having classes (in the Object Oriented sense of these words). A class provides host methods which operate on an object in response to request from a guest client.

Small Uniform Object Header

Each small uniform object has an associated one-word object header. The location of this header relative to the object is a matter of configuration; see §4.10.7.
    Further annotation on small ad-hoc objects: We use the small uniform object header for further meta-data annotations on the object in §4.11.

Object Size

We want to allow any object size (not just a power of 2) up to a 4K-byte page.
    Add a 9-bit obj-pos-size to the small uniform bloc header to indicate the object size: counts from 1 to 512.
    Writing the obj.-pos-size under any circumstances is a race condition and therefore it can not be written even by master. To write it, in this embodiment, the page must first be turned into a large object page (which, in this embodiment, can be done only by master).

Arrays of Objects

We want to allow logarithmic array sizes at the granularity of square root of 2. Note that attempting to fit nicely into pages by restricting ourselves to powers of 2 is pointless as the array size in words is the array size here multiplied by the object size, which may be arbitrary.

Add a 6-bit array-exp-br2-size to the small uniform bloc header to indicate the array size: a whole number determined by exponentiating the square root of 2 to the value of the field, as follows.

A 5-bit array-exp-br2-size-exponent field, which indicates the array size as a power of two from 1 to $2^{31}$.

A 1-bit array-exp-br2-size-three-halves-flag, which if set indicates that after exponentiating the result should be multiplied by 3/2.

Let the configuration $2^0 \cdot (3/2) = \infty$.

Writing the array-exp-br2-size under any circumstances is a race condition and therefore it can not be written even by master. To write it, in this embodiment, the page must first be turned into a large object page (which, in this embodiment, can be done only by master).

Note that the array size is truncated at the end of bloc, and so may be meaningfully set to infinity.

Note further that there would be no real advantage to constraining arrays to be powers of 2 as the resulting size in words of the array is the array-exp-br2-size times the obj-pos-size and therefore not likely to be a power of 2.

Note further that we do not provide multi-dimensional arrays, because one dimension is enough to implement them internally and protect from overflow into other data. That is, even with Hard Object protections, client software might still mis-index a multi-dimensional array, say, by reversing the indices and addressing a 3×5 array as if it were a 5×3 array; such a mistake would cause problems for that client but it was also entirely the fault of that client. Again, Hard Object protects you from others, but not from not yourself.

Plurality: Array Vs Table

Uniform objects are subject to two kinds of plurality.

Array: An array has one meta-data header for the whole array and therefore the array is an atomic point for the purposes of each aspect of Hard Object (a singleton object is easily represented as an array of size 1).

Table: A table has a header for each object and therefore admits of independent treatment of each aspect of Hard Object, such as would be wanted by a relational database providing row-granularity locking.

Both arrays and tables may be constructed on a bloc of small uniform objects simply by changing the addressing mode with which they are accessed.

Arrays: Arrays of objects may be constructed by setting the desired object size and array size, as one might expect. The array[index]→offset addressing mode (1) checks that the array base is the start of an array, (2) picks an object within the array using index, checking its bounds against the array size, and (3) picks a word within the object using offset, checking its bounds against the object size. As the entire array shares one header, the entire array is an atomic point for the purposes of each aspect of Hard Object.

Tables: Some applications may wish to treat individual array elements as atomic for the purposes of Hard Object; for example, a relational database would like to provide row-granularity locking on its tables. Tables of objects may be constructed by setting the array size to 1 (identifying arrays and objects) and then using the entire bloc as one table. The table<row>→offset addressing mode (1) asserts that the array size is 1, (2) checks that the table base is the start of an array/object, (3) picks an array/object within the bloc using index, checking its bounds against the bloc size, and (4) picks a word within the object using offset, checking its bounds against the object size. As each object within the array has its own header, each object gets independent treatment of each aspect of Hard Object.

Note that in both cases the index/row is always truncated by the end of the bloc. In the array case, we may denote an array of size larger than can be expressed in the array size field by setting the size to infinity ($2^0 \cdot (3/2) = \infty$) allocating only one array for the whole bloc, and then letting the end of the array be delimited by the end of the bloc. In this embodiment, for the table case, using the bloc size is the only way to delimit the size of a table and there is exactly one table per bloc.

Object and Array Alignment

Data alignment is critical to performance. We provide means to constrain the alignment of objects and arrays to natural boundaries. The layout rule is simple: if an object or array would violate the alignment constraint, it is moved up in memory until it would not.

Add a 2-bit obj-align-enum object alignment.
    0: no constraints.
    1: may not straddle a page.
    2: may not straddle a cache-line.
    3: reserved.
Add a 2-bit array-align-enum array alignment.
    0: no constraints.
    1: may not straddle a page.
    2: may not straddle a cache-line.
    3: reserved.

Writing the obj-align-enum and array-align-enum under any circumstances is a race condition and therefore it can not be written even by master: To write it, in this embodiment, the page must first be turned into a large object page (which, in this embodiment, can be done only by master).

Placement of Object Header

A small uniform object has a one-word object header. There is no obvious answer to where object headers should be placed, so this is configurable.

Add a 2-bit array-hdr-loc-enum array header locator.
    0: Before-top: before the tops of their respective arrays.
    1: At-bottom: inserted at the bottoms of their respective arrays as the last word.
    2: After-bottom: after the bottoms of their respective arrays.
    3: Bottom-of-bloc: collected in the bottom-of-bloc meta-data in the collected-array-hdrs.

Writing the array-hdr-loc-enum under any circumstances is a race condition and therefore it can not be written even by master. To write it, in this embodiment, the page must first be turned into a large object page (which, in this embodiment, can be done only by master).

At-bottom may be useful when the object or array has alignment constraints coarser grain than a word so the header may not go at the top of the object and further the object or the array has been padded and the very last word is not being used.

After-bottom may be useful when the object or array has alignment constraints coarser grain than a word so the header may not go at the top of the object and there is no unused padding to make use of.

At-bottom-of-bloc: may be useful when all of these possibilities fail and the header simply must be placed somewhere else. In this configuration, the array headers are collected in the bottom-of-bloc meta-data (if array-hdr-loc-enum is bottom-of-bloc); if so, then the object headers go here.

Add a collected-array-hdrs in the bottom-of-bloc metadata.

4.10.8 Concurrency and Writing Meta-Data Flags

Throughout our design, a flag and the datum that it annotates form one semantic whole. Unfortunately without requiring more fundamental changes in the hardware, it is not easy to co-locate the flag and datum together. Therefore, in the presence of concurrency, race conditions may arise unless provisions are made otherwise.

We manage to prevent race conditions by establishing different levels of constraints on the concurrency isolation of such flags, as follows.

- Dynamic-isolated: The value of the flag is computed automatically by the hardware every time the datum is written (see §4.6.4).
- Sync-isolated: The flag may be changed under sync-isolated access (see §4.7.6).
- Page-isolated: In this embodiment, we must sync the entire bloc and thus we must first convert the bloc to a large object bloc (see §4.10.3).

Dynamic-Isolated:

The Value of the Flag is Computed Automatically by the Hardware Every time the datum is written. This level invites race conditions and therefore can only be safely used in a single-threaded context. Therefore, in this embodiment, we use this level only in the following situations (see §4.6.4):
- ref-flags annotating registers or
- stack temporaries.

Note that if a thread is interrupted and its stack temporaries read by another thread, such as a garbage-collector, in this embodiment, the kernel must take care to allow a write to finish so that the interrupt does not come between an update of a stack word and the update to the corresponding flag in the frame-ref-flag-array.

Note that in this embodiment the fact that, ref-flags are only dynamic-isolated when annotating registers and stack temporaries means that in C or C++ we may replace a union between a reference and, say, an int to be stored on the heap by replacing that union with, say, a struct.

Sync-Isolated:

The flag may be changed under sync-isolated access: (1) the current agent has sync on the object and (2) agent-gate-readabe-readable-str-suff-len is 0 or −1 (see §4.7.6). We use this level in the following situations (see §4.6.4):
- ref-flag and
- public-readable flags on
- large objects (where in this embodiment one must get sync on the object),
- small ad-hoc objects (where in this embodiment one must get sync on the object) and
- software bloc headers (where in this embodiment one must get sync on the bloc header).

Page-Isolated:

In this embodiment, there are some meta-data flags for which there is no agent-gate to lock and therefore standard sync-isolation cannot be used. In this embodiment, in order to write one of those flags, we must sync the entire bloc and thus we must first convert the bloc to a large object bloc; see §4.10.3. Here are some examples of this situation (see §4.6.4):
- small ad-hoc obj-hdr-flag (as the very the location of the agent-gate is determined by the flag being written which would be a circular dependency) and
- the small uniform ref-flag, guest-readable, and guest-writeable flags (the flags apply to multiple objects which have multiple agent-gates).

Note that these properties need not change frequently; for example, allocating and deallocating small ad-hoc objects can be done without resizing said objects; similarly allocating and deallocating uniform small objects can be done without changing the class of the page. (As a further optimization, it is sometimes possible to convert only one page of a container bloc to a large object page, sync that page, perform the write, and then change the page back again.)

Enforcement in Hardware

These constraints are straightforwardly enforced in hardware, as follows.

The dynamic-isolated ref-flag on register and stack data is maintained by the hardware when the data is written; See §4.6.4.

In this embodiment, the sync-isolated flags simply cannot be written unless the current-agent has sync on the relevant agent-gate.

In this embodiment, the page-isolated flags simply cannot be written; the whole page must be changed to a data page where the same bits may be written as plain data and then the page changed back.

Object Allocation and De-Allocation without Resorting to Page-Isolated Access

A consequence of the above rules is that, in this embodiment, the partitioning of the page into small object slots, whether ad-hoc or dynamic, must be done using page-isolated access (see §4.10.8 above). However, once so partitioned, the objects themselves may be allocated and de-allocated without resort to page-isolated access (locking the page), but by resort merely to sync-isolated (locking the object). As page-isolated access is quite expensive and allocation/de-allocation are quite frequent, this property is critical for performance.

4.11 Object

We want to further augment the Heap boxes of §4.10 to constrain access to Objects using the following three basic Hard Object aspects.

- Modularity: Modularity associates data and the code that may operate on it using module-ids. Only the host module may create, destroy, or operate on an object; see §4.4 and §4.5.
- Reference: Reference tracks continuity of dataflow as an unforgeable reference using reference flags. An object may require that it may be accessed or deleted only by a live reference; see §4.6.
- Agency: Agency tracks continuity of control flow using agent-ids. Using an agent-gate, an object may constrain reading to a subtree of agents and may be temporarily synced for exclusive access by an agent; see §4.7.

Further, the fine-granularity of the partitioning of the heap into word-granularity boxes of §4.10 admits of some further opportunities for refinements of Modularity due to the ability of the hardware to know more about the boundaries it is enforcing.

- Public-readability: A whole large object or field of a small ad-hoc object may be annotated as public readable (mod-pub-readable) and, if so, module constraints do not prevent reading.
- Guest-accessibility: An field of a small uniform object may be annotated (1) as guest-readable/writeable and (2) using a mod-guest, with a subtree of guest modules; if so annotated, the guest modules may read/write the field directly.

We now show how to annotate these aspects on to the word-granularity boxes of §4.10, making them into Hard Objects.

4.11.1 Modularity Schema

Modularity associates data and the code that may operate on it using module-ids. Only the host module may create, destroy, or operate on an object; see §4.4 and §4.5.

Mod-Owner
  Annotates anything that may access and own mod-ownable-s (see §4.11.1 below):
    text pages, and
    the value of module owner registers: caller and current.
  The mod-owner annotation indicates the right to (1) access and (2) transfer ownership of the mod-ownable to which it refers.

A Mod-Owner is:
  31 bits: mod-owner-id; see §4.4.1.
  05 bits: mod-owner-suff-len; see §4.4.5.

When a module access check is made, a mod-owner-id and a mod-ownable-id are compared, excepting the rightmost mod-owner-suff-len bits. The rightmost bits of the mod-ownable-id, unused in that comparison, may instead be re-purposed by the owner module code for internal use to denote sub-module data page distinctions. That is, together the mod-owner-id and mod-owner-suff-len determine an internal node in the mod-id tree. Note that to prevent a Trojan Horse attack [Wiki-Trojan-Horse], the linker/loader enforces the No-Mod-Ancestor-Of-Another invariant (§4.4.5): no such mod-owner internal node is an ancestor of another (see §4.4.5).

In this embodiment, the mod-owner can be written only by master.

Mod-Ownable
  Annotates anything that may be owned by a mod-owner:
    large objects, and
    small ad-hoc objects, and
    small uniform objects, but as the objects have uniform modularity, the annotation goes on the bloc, and
    software bloc headers, but these have the same mod-ownable as their bloc, so we use the annotation on the bloc.

In the case of a large object, there is no distinction between the object and the bloc: the mod-ownable indicates which mod-owner may access it and transfer that ownership.

In the case of a small ad-hoc object, the small object has the exact same semantics as a large object, only it is smaller.

In the case of a small uniform object, the distinction between host and guest arises: the host is the service or class, and the guest is a client which uses a class instance, namely an object.

The host may access the whole page (methods run as the host) and so is indicated by the bloc mod-ownable. Guest access is a fundamentally different concept and tracking of guest access is most naturally done using reference (see §4.11.2); however the range of a reference depends on an unknown computation, so we provide a constraint on the modularity of the guest using a mod-guest (see §4.11.1).

In this Embodiment, the Bloc Mod-Ownable does not Allow Heap Model Meta-Data to be Altered, Only Object Model Meta-Data In the case of a small object bloc, either ad-hoc or uniform, the mod-ownable determines which mod-owner may alter
  the page object model meta-data, which determines access to the objects of the page, and
  the contents of the bottom-of-bloc software bloc header.
  However, in this embodiment, no matter the value of the bloc mod-owner, no one (including master) may alter the heap model meta-data of a small object bloc (ad-hoc or uniform), as this meta-data determines the shape of the partitioning of the page into boxes. In this embodiment, to change the heap model meta-data, master must first turn the bloc into a data large object page. See §4.10.3 for more.

A Mod-Ownable is:
  31 bits: mod-ownable-id; see §4.4.5.
  01 bits: mod-ownable-integrity-flag; see §4.4.5.

The mod-ownable-id designates (1) the module to which this object belongs, and (2) (as discussed above) any further sub-module class distinctions.

In this embodiment, the mod-ownable can be written only by the owner or master and upon doing so the mod-ownable-integrity-flag is cleared and may only be set again by the (new) module owner. This allows a module to flag pages for which it has ensured the integrity of the page's meta-data, thereby preventing a Trojan Horse attack [Wiki-Trojan-Horse].

Mod-Pub-Readable-Flag
  Annotates anything constrained by modularity access.
    whole large objects (mod-pub-readable-flag), and
    the individual words of small ad-hoc (obj-flag-array-mod-pub-readable-flag), (not small uniform objects; see §4.11.1 below), and
    the individual words of software bloc headers (software-bloc-hdr-flag-array-mod-pub-readable-flag).

A large object or field of a small ad-hoc object may be annotated as public readable (mod-pub-readable) and if so, module constraints do not prevent reading the field.

In this embodiment, the mod-pub-readable-flag of an object can be written only by the object owner (for uniform objects, the host, not the guest) or master.

Guest-Readable/Writeable-Flags
  Annotates small uniform objects.

A field of a small uniform object may be annotated as guest-readable (obj-flag-array-mod-guest-readable-flag) and/or guest-writeable (obj-flag-array-mod-guest-writeable-flag) and if so, modules allowed as guests by the module gate may read/write the field, respectively.

In this embodiment, the guest-readable/writeable-flags of an object can be written only by the object host (not the guest) or master.

Mod-Guest
  Annotates small uniform objects.

A Mod-Guest is:
  31 bits: mod-guest-id; see §4.4.6.
  05 bits: mod-guest-suff-len; see §4.4.6.

Just as with the mod-owner, the mod-guest determines an internal node in the mod-id tree, however the semantics differ. By default, access to the object by the guest is constrained to this subtree. Note that this constraint may be overridden by the host module software (such as during a method call) by amplifying the reference; see §4.6.4.

This kind of access does not admit of a Trojan Horse attack [Wiki-Trojan-Horse] as (1) transferring data is not as dangerous as transferring meta-data and (2) access is not transferable by default (the host module software can enforce some sort of notification if it implements access transfer). Therefore, unlike mod-owner-s, the roots of these subtrees need not be constrained in any way by the linker/loader and further no integrity-flag is required.

In this embodiment, the mod-guest of an object can be written only by the object host (not the guest) or master.

4.11.2 Reference Schema

Reference tracks continuity of dataflow as an unforgeable reference. An object may require that it may be accessed or deleted only by a live reference; see §4.6.

Ref-Flag
  Annotates anything that can hold a reference to an object in dynamically managed memory:
    registers; using the ref-flag, and
    stack temporaries (the first 64 in the current frame); using the frame-ref-flag-array, and
    fields of large objects, using the ref-flag on the entire object/bloc which indicates that the whole object/bloc is references, or none are, and
    fields of small objects (ad-hoc and uniform), using the obj-flag-array-ref-flag field of the obj-flag-array, and
    fields of software bloc headers, using software-bloc-hdr-flag-array-ref-flag field of the software-bloc-hdr-flag-array.
  Note that in this embodiment it is only enforced on access to objects having the refable-target-flag set (see §4.11.2).
  The ref-flags are not writeable by user-mode code and are maintained by hardware instructions which interact with references or by code using master powers: see §4.6.4.
Refable
  Annotates anything that may participate in dynamic memory management:
    objects: large, small ad-hoc, and small uniform.
  A Refable is:
    01 bits: refable-target-flag; see §4.6.2.
    01 bits: refable-reachable-flag; see §4.6.2.
    01 bits: refable-versioned-flag; see §4.6.2.
    When the refable is unallocated, a mod-ownable-id (see §4.4.5) or mod-guest-id (see §4.4.6) is set to the nobody-mod-id (and in the mod-guest case, setting any accessing suff-len to 0); therefore there is no need for an additional "unallocated" flag here.
  The refable-target-flag designates that only a reference may be used to access this object. The refable-reachable-flag is reserved for use by a garbage collector. Note that, in this embodiment, while we require a mod-ownable-id or mod-guest-id for use in denoting that the object is unallocated, we require that this field be provided elsewhere on the object.
  In this embodiment, the refable-target-flag and refable-reachable-flag of an object can be written only by the object owner (for uniform objects, the host, not the guest) or master.

4.11.3 Agency Schema

Agency tracks continuity of control flow as an unforgeable agent-id. Using an agent-gate, an object may constrain reading to a subtree of agents and may be temporarily synced for exclusive access by an agent; see §4.7.

Agent-Id
  Annotates a thread of control which may access objects through an agent-gate (see §4.11.3 below):
    15 bits: caller-agent-id; see §4.7.5: identifies the previous value of the current-agent-id preceding the previous call across agency.
    15 bits: current-agent-id; see §4.7.5: identifies the current agent.
Agent-Gate
  Annotates anything that may allow multi-agent access:
    objects: large, small ad-hoc, small uniform, and software bloc headers.
  An Agent-Gate is:
    14 bits: agent-gate-id; see §4.7.6.
    04 bits: agent-gate-readable-str-suff-len; see §4.7.6: a number from −1 to 14.
    04 bits: agent-gate-syncable-str-suff-len; see §4.7.6: a number from −1 to 14.
    01 bits: agent-gate-sync-flag; see §4.7.6.

Object Access:
  The object may be accessed (read or written) whenever (1) agent-gate-sync-flag is set and (2) current-agent-id equals agent-gate-id exactly.
  The object may be read whenever current-agent-id matches agent-gate-id, excepting the rightmost agent-gate-readable-str-suff-len bits; note that even if current-agent-id equals agent-gate-id exactly, an agent-gate-readable-str-suff-len of −1 means they do not match no matter what.
Synchronization:
  Instruction sync(object) (1) sets the agent-gate-sync-flag and (2) changes the agent-gate-id of the object to the current-agent-id; allowed whenever (1) the object may be written according to the modularity and reference aspects (see those sections), (2) agent-gate-sync-flag is clear, and (3) current-agent-id matches agent-gate-id, excepting the rightmost agent-gate-syncable-str-suff-len bits, where if agent-gate-readable-str-suff-len is −1, they are prevented from matching even if current-agent-id equals agent-gate-id exactly.
  Instruction unsync(object) (1) puts the object into read mode (and leaves the agent-gate-id unchanged); allowed whenever (1) agent-gate-sync-flag is set and (2) current-agent-id equals agent-gate-id.
  Note that even though the agent-gate-id changes when the gate is sync-ed, no combination of sync(object) and unsync (object) instructions can ever change the bits of the agent-gate-id left of the agent-gate-syncable-str-suff-len.
  Master can put an agent gate into any state; in fact this the only way to initialize an agent-gate in this embodiment. Therefore when the agent-gate-readable-str-suff-len or agent-gate-syncable-str-suff-len are −1 the agent-gate may still be managed by a system library.
  See §4.7 for more details.

4.12 Legacy Code (Throughout this document, "legacy" means "prior art", unless specified otherwise, such as: by "legacy module id" we mean that it is a module-id with which legacy/prior art software would be annotated when run in a Hard Object system (so that the Hard Object system may easily distinguish it from software explicitly written to run on a Hard Object system), but we do not mean to suggest that the legacy-mod-id or its other accompanying or related mechanisms in the Hard Object design are themselves prior art.)
  The point of the legacy module is to provide a path to adoption by allowing linking with code which the client cannot recompile. In this embodiment, the hardware does not allow legacy code to run Hard-Object specific instructions. It is not a feature one would employ in a system that runs truly untrusted code in the same memory space, unless all of that untrusted code was in the legacy module. Other modules are protected from legacy code; however, in this embodiment, legacy code is not fully protected from them.
  When run using the legacy module-id, legacy code works out of the box; legacy code may even be self-modifying. In this embodiment, the control-flag is interpreted as being off when the current-mod-owner-id is the legacy-mod-id as, in this embodiment, dyn-target-*instructions cannot be relied upon in the presence of self-modifying code. Legacy code may even use 1 G-byte text pages, even though in this embodiment non-legacy Hard Object modules may not, since the dyn-target tag does not have enough bits.
  We constrain the agency aspect of legacy code exactly as with Hard Object code. Legacy code need not know about agency constraints to run unmodified: in this embodiment, legacy code only uses large objects and the agent gates of large objects are set up by the system libraries. Note that legacy code is protected from any code running in other agents.

Legacy code can use any calling convention: (1) caller-cleanup or callee-cleanup, and (2) caller-save or callee-save. Legacy code may be linked to Hard Object code in the mainline stack idiom and the shadow stack idiom, but not in the post-legacy stack idiom (see §4.9).

4.12.1 Matching Legacy Calling Conventions

In order to link Hard Object modules to legacy code, in this embodiment, certain special behavior is required to match the calling conventions.

Saving Registers:

In this embodiment, Hard Object modules must use caller-id to check if they are being called by the legacy module and, if so, save/restore in the prologue/epilogue the registers that are traditionally callee-save in x86.

Cleanup:

Hard Object modules have to be compiled to return (as callees) using whichever kind of cleanup (caller/callee) matches that of the legacy code;
- When Hard Object modules are the caller they know that the callee will be forced by the hardware to behave as if returning with caller-cleanup, independent of what the callee actually attempts.
- When Hard Object modules are the callee, they should be compiled to provide as callees whichever kind of cleanup is expected by the legacy code: for Hard Object callers it won't matter and for legacy callers it will always work.

4.12.2 in this Embodiment, Legacy Code does not Protect Itself

In this embodiment, legacy code operates differently from code written for the Hard Object system; here are some ways.
- It does not protect against external dynamic jumps to points other than public function entry points.
- It does not protect its stack:
  - it relies on callees to save/restore those registers that are traditionally caller-save in x86;
  - callees can read and write its stack;
  - callers can read its left-over stack temporaries (which, unlike Hard Object code, it does not know to clean up).
- It does not protect its heap:
  - in this embodiment, legacy code must expose its heap (and globals) to access by other modules to support some legacy functionality, for example the BSD sockets interface, such as getaddrinfo( );
  - it does not verify pointers obtained from other modules as pointing to the tops of live objects.

4.13 Miscellaneous Points

Here we cover some points that do not seem to naturally fit into other sections.

4.13.1 Other Instructions, Instruction Sets, and Architectures

Note that we provide the Hard Object versions of all of the relevant basic operations of a standard-architecture computer, such as control transfer operations and memory access (read/write) operations. Therefore Hard Object can be modified to work in a straightforward manner by anyone skilled in the art on any similar architectures.

4.13.2 Self-Modifying Code

We allow self-modifying code in the legacy module. Note that in this embodiment we could actually allow self-modifying code for any text page that does not have the control flag set and Hard Object would still provide the same guarantees. However we consider writing to your own text pages to be an operation that is usually very dangerous and only rarely useful (especially since we allow for JITs by use of another mechanism) and therefore in this embodiment we prohibit it except in the legacy module.

4.13.3 Un-Aligned and Variable-Width Data Accesses

In the x86 architecture, accesses can be of various widths: byte, double-byte, quad-byte, etc. and further these accesses need not be aligned so that the base pointer of the access is a multiple of the access width.

For simplicity we presented the design as if all accesses were both (1) word-width and (2) word-aligned; that is, a check that an access at $x_1$ of width $w_1$ does not cross an upper boundary $x_2$ was stated as $x_1 < x_2$, but in reality requires a check that $x_1 + w_1 \leq x_2$.

We do not want such boundary computations to contain the $w_1$ because that determines a specific scale of the quantum of access, it complicates the check with additional arithmetic, and it makes checking unaligned accesses confusing. Carefully picking the semantics of boundaries eliminates these problems; the non-obvious cases occur when delimiting boundaries on the stack as the stack traditionally grows down. (Basically, we get rid of "+8" bytes in lots of tests where a less careful choice would have implied one.)

For example, the semantics of the stack-limit-ptr register are that it points to the last word that is readable; that is, in this embodiment, for a pointer x to point into the stack, we require that x≥stack-limit-ptr. If instead we had a hypothetical "stack-limit-over-ptr" having the semantics of pointing to the first word that is not accessible, then the check on an access to x would be that x−w≥stack-limit-over-ptr, where u is the size of a word.

Picking a semantics that eliminates w removes scale from the check and also works well in the presence of un-aligned accesses. We omit the complexity of stating the exact rule in each situation as it can be derived straightforwardly in each case.

Access to Data Crossing Page Boundaries:

Note that it is possible to make an un-aligned access which targets data on two different pages. In this embodiment, such an access is allowed only if it passes the access checks for both pages.

4.13.4 Instructions Crossing Page Boundaries

If an instruction spans two pages, the CPU faults unless both pages have the same value for page-kind, mod-owner, and control-flag (note that the dyn-target-tag is handled differently below.)

Avoiding the above problems is straightforward and should happen automatically for any straightforward code layout. However, an instruction spanning two pages that have different values for the dyn-target tag could easily occur in a straightforward code layout; we therefore handle this situation with more subtlety, as follows.

When a call/jump lands on a dyn-target-pub/priv/jump instruction which spans page boundaries, in this embodiment, there must be some rule as to which page provides the dyn-target-tag to compare to the argument of the dyn-target-*instruction: we hereby choose to simply use the page of the first byte of the dyn-target-*instruction.

This rule causes a dependency between the computations of the dyn-target-tag-s for each of the two pages. Such dependencies can be avoided by padding the instruction stream with no-ops to move dyn-target-*instructions off of page boundaries.

4.13.5 Direct Memory Access by Peripherals

To allow for direct memory access by peripherals in a Hard Object system, simply assign each I/O port/device a module-id (baked into the hardware) and constrain DMA memory access as we do usual module access using the I/O device module-id as if it were the current-mod-owner-id.

Some memory-mapped I/O devices exposing only a few words for access to the device could be protected by collecting these words onto a small ad-hoc object page and annotating the word(s) individually with Hard Object meta-data.

For hardware interfaces that may want to access entire pages of memory, such as perhaps a Graphical Processing Unit (GPU), we can protect the entire page(s) using a large object page. Again, the CPU would be assigned its own Hard Object module id (and perhaps agency id, as appropriate) which would be used in the Hard Object annotations on the page.

4.13.6 Required Width of the Dyn-Target Tag

In this embodiment, the dyn-target tag field needs a number of bits that is at least log base 2 of the page size at the instruction granularity; on machines having 4K byte pages and for architectures having byte-aligned instructions that's 12 bits. Note that since 12>8 there are at most $2^{12}-1$ byte-aligned 12-bit sub-strings of a string of $2^{12}$ bytes, so there will always be at least one unused byte-aligned 12-bit sub-string of a given page.

4.13.7 Jumbo and Super-Jumbo Text Pages

We reserve 21 bits for the dyn-target-tag; this suffices for jumbo 2 MB text pages but not for super-jumbo 1 GB pages. (Note that jumbo pages are 4 MB on 32-bit architectures but 2 MB on 64-bit).

Recall that the only motivation to use larger text pages is to reduce TLB pressure. Use of jumbo text pages helps considerably with this problem; however it is hard to imagine a need for super-jumbo text pages.

Note that we can allow super-jumbo text pages in legacy mode as legacy code does not use dyn-target-tag-s.

Note that an alternative embodiment could extend the dyn-target-tag field to more bits in which case super-jumbo text pages could be made to work in the straightforward manner.

Note that jumbo and super-jumbo DATA (not text) pages work fine in Hard Object.

4.14 Schema

We summarize the schema of the Hard Object design. Schema members are prefixed by their size in bits.

4.14.1 Special Module-Ids

We reserve some mod-id-s to have special semantics.
master-mod-id(1) (§4.5.3): do anything.
nobody-mod-id(0) (§4.4.1): do nothing.
multi-mod-id(−1) (§4.5.5): run multiple modules on a text page
legacy-mod-id(−2) (§4.5.4 and §4.12): run legacy code out of the box.

When the current-mod-owner-id is the master-mod-id, any data is accessible (readable and writeable) and any text is readable (to write text temporarily turn it into data). Further, we suggest that stack pages be owned by the master-mod-id.

When the current-mod-owner-id is the nobody-mod-id, the CPU faults. Further, unallocated heap pages should be owned by the nobody-mod-id (distinguishing them from stack pages which should be owned by the master-mod-id.)

When the current-mod-owner-id is the legacy-mod-id, protection features requiring modification to legacy code are turned off. Hard Object modules are still protected from legacy code, however legacy code is not protected.

4.14.2 Registers
Existing Registers
01 bits: ref-flag (§4.6.4): indicates whether the register it annotates holds a reference.
The ref-flag of a register is dynamic-isolated (see §4.10.8) and changes automatically as part of the computation (see §4.6.4). Otherwise, this meta-data may only be modified by master in this embodiment.
New Registers
Identify Current Modularity:
 36 bits: caller-mod-owner (§4.4.3 and §4.11.1): identifies the previous value of the current-mod-owner preceding the previous cross-module call.
  31 bits: caller-mod-owner-id (§4.4.3).
  05 bits: caller-mod-owner-suff-len (§4.4.5).
 36 bits: current-mod-owner (§4.4.2 and §4.11.1): identifies the mod-owner of the text page pointed to by the program counter.
  31 bits: current-mod-owner-id (§4.4.2).
  05 bits: current-mod-owner-suff-len (§4.4.5).
 01 bits: current-control-flag (§4.5.2): identifies the current value of the control-flag; current-mod-owner register is writeable by code only when this flag is set in this embodiment.

The caller-mod-owner may be read or written by the current thread. It is set by the call instruction on a protected call, but may be saved and restored by user-mode code.

The current-mod-owner may be read by the current thread; in this embodiment, it may be written only if either the current-control-flag is set (see §4.5.2). The current-mod-owner is maintained by the call (see §4.9.7) and return (see §4.9.7) instructions and, in this embodiment, cannot be modified by user-mode code unless said user-mode code is on a controlled page and uses the set_cur_mod_owner( ) instruction.

The current-control-flag may be read by the current thread; in this embodiment, it may be written only by hardware as part of the process of loading an instruction (in particular, may not be written by software, even if current-mod-owner-id is master-mod-id).

As the loader/linker can observe an over-approximation to the control flow graph on any page having the control-flag set, this embodiment has it adopt the safe yet flexible policy of allowing use of the set_cur_mod_owner( ) instruction only either (1) in trusted system modules or (2) when introduced and proved correct by the loader/linker itself when inlining across modules.

Identify Current Frame References:
 64 bits: frame-ref-flag-array (§4.6.4): indicates which of the words on the current frame are references, where the frame starts below the word pointed to by caller-protect-ptr.

The flags of the frame-ref-flag-array are dynamic-isolated (see §4.10.8). They are maintained by the hardware and otherwise can only be written by master in this embodiment. On a protected call the call instruction truncates the bits not annotating the caller frame, saves the remaining bits on the stack, and then left-shifts it as necessary to align it with the callee frame (including its arguments) (see §4.9.7). On a protected return the return instruction restores the frame-ref-flag-array from the stack (see §4.9.7).

Identify Current Agency:
 15 bits: caller-agent-id (§4.7.5): identifies the previous value of the current-agent-id preceding the previous call across agency.
 15 bits: current-agent-id 090 (§4.7.5): identifies the current agent.

These registers can only be written by master in this embodiment.

Delimit Current Stack:

The Mainline stack design/embodiment requires four registers to delimit the stack; we have omitted the mechanisms for stack designs other than Mainline. See §4.4.4 and §4.9.

64 bits: stack-base-ptr: points at the least word of the data above the stack.

64 bits: caller-protect-ptr: points at the least caller temporary of the frame of the last protected call.

64 bits: flow-protect-ptr: points at the saved return address of the last protected call.

64 bits: stack-limit-ptr: points at the maximum extent of the stack.

The caller-protect-ptr and flow-protect-ptr registers are managed by the call and return instructions; otherwise this embodiment only allows these registers to be written by master.

4.14.3 Cache Lines 1-bit per word: agent-gate-sync-flag-array (§4.7.10): indicates whether the corresponding word is loaded as sync-ed or just as readable.

1-bit per word: present-flag-array (§4.7.10): indicates whether that word is present as part of a loaded object or should be treated as if it is not present in the cache.

These bits in the cache-line are maintained by the hardware.

4.14.4 Pointers

Pointer/Reference Versioning (§4.6.2:) On current 64-bit machines, the virtual address space is not actually 64 bits; for example, currently AMD uses only 48 bits, addressing 256 Terabytes of virtual memory. We call the number of bits actually used for addressing the number of bits of virtual space, S. We call the remaining 64−S bits the number of bits of virtual time, T, and use these bits as a version number on the object pointed to by the space bits.

the least-significant bits of a pointer are S space address bits, encoding the address of the object, and the most-significant bits of a pointer are 64−S=T time address bits 082, encoding the version of the object.

Pointers Used as References

References are word-aligned pointers and so (in a 64-bit system) the low 3 bits are unused; we use them for meta-data.

We present them in order from the least significant bit towards the more significant.

01 bits: ref-retainable-flag 084 (§4.6.3): when set enables this reference to be stored elsewhere besides in a register or on the stack.

01 bits: ref-writing-flag 085 (§4.6.3): when set enables the object data to be written when accessed through this reference.

01 bits: ref-auto-flag (§4.6.3): available to user code for any purpose, but recommended to be used for auto_ptr [Wiki-Smart-Pointers, Wiki-auto-ptr] semantics.

The ref-retainable-flag allows for use of references as non-retainable capabilities: by clearing it before giving it to a library function we prevent the library from retaining the capability after it returns from providing the service.

In this embodiment, these flags (1) may be amplified only by code in the owner module of the object referred to by the reference when that code also may write the pointer and (2) may be attenuated by any code that can write the pointer; see §4.6.4.

Special Reference Values:

Further, we distinguish two special reference values:

null-ref(0) (§4.6.4): a reference that points at nothing.

no-such-object-ref(1) (§4.6.2): a reference that used to point at something which has been deleted.

Any code that may write the pointer may write a reference to null-ref(0).

Hardware or master or the host, module when it also has write access to the pointer can write a reference to the value no-such-object-ref to indicate that the reference points to something deleted.

4.14.5 Memory Objects

Hard object partitions memory into two kinds: (1) text and (2) data.

Data is further partitioned into two sizes: (1) large objects and (2) small objects, where a large object is a size that is power of two times that of a page (of any page size) and a small object is a sub-region of a 2K-byte page.

Small objects may be organized into collections that are either (1) ad-hoc, or (2) uniform; the former is useful for collections of globals and the latter is useful for the heap.

Small uniform objects may be arranged as (1) singletons or (2) arrays.

See the referenced sections for the details of what conditions allow for alteration of the meta-data of memory objects; recapitulation of those rules here results in too much clutter.

Page-Kind Meta-Data:

In order to indicate the kind of the page, in this embodiment we need to ask for a two-bit field on the existing non-Hard-Object page table entry data-structure (in addition to the 64-bit Hard Object PTE word below).

02 bits: page-kind-enum (§4.4 and §4.10.2):
  0: data large.
  1: data small ad-hoc.
  2: data small uniform.
  3: text.

Text Page 36 bits: mod-owner (§4.4.1 and §4.11.1):
  31 bits: mod-owner-id 071.
  05 bits: mod-owner-suff-len.
 01 bits: control-flag (§4.5.1).
 06 bits: reserved.
 21 bits: dyn-target-tag (§4.4.3).

Large Object Page

In this embodiment for collections of pages having identical access controls we need blocs of pages all sharing the same meta-data; see §4.10.4.

32 bits: mod-ownable (§4.4.5 and §4.11.1).
  31 bits: mod-ownable-id 070.
  01 bits: mod-ownable-integrity-flag.
 23 bits: agent-gate (§4.11.3).
  14 bits: agent-gate-id 093.
  04 bits: agent-gate-readable-str-suff-len 094.
  04 bits: agent-gate-syncable-str-suff-len 095.
  01 bits: agent-gate-sync-flag 096.
 02 bits: refable (§4.11.2).
  01 bits: refable-target-flag 081.
  01 bits: refable-reachable-flag.
  01 bits: refable-versioned-flag.
 01 bits: mod-pub-readable-flag (§4.4.5, §4.11.1): if set, allow any module to read the bloc data. This flag is sync-isolated (see §4.10.8).
 01 bits: ref-flag (§4.6.4): if set, every word in the object is a reference. This flag is sync-isolated (see §4.10.8).
 04 bits: bloc-exp-size (§4.10.3): 1 to $2^{15}$ pages.

In this embodiment, we require that blocs of pages are aligned on multiples of their sizes; that is, the pointer to the top has as many trailing zeros as data-page-array-exp-size (before exponentiating).

Small Ad-Hoc Object Page

In this embodiment for ad-hoc collections of globals we need blocs of data pages partitioned into ad-hoc "mini data pages"; see §4.10.6.

- 32 bits: mod-ownable (§4.11.1). Note that ad-hoc pages are unsafe unless owned by a trusted system module.
  - 31 bits: mod-ownable-id.
  - 01 bits: mod-ownable-integrity-flag.
- 21 bits: reserved.
- 07 bits: software-bloc-hdr-size (§4.10.5).
- 04 bits: bloc-exp-size (§4.10.3): 1 to $2^{15}$ pages.

Small Ad-Hoc Object Bottom-of-Bloc Meta-Data:

A small ad-hoc object bloc has meta-data at the bottom of the bloc. We list its parts from the bottom up.

- obj-flag-array (§4.10.5); one flag-triple for each data word in the bloc, grouped in sets of 21 ($=\lfloor 64/3 \rfloor$) so triples do not span a word; the resulting size is ($\lceil 512/21 \rceil=$ 25)·bloc-exp-size-page-size. The whole flag-array is read-only; in this embodiment, only software having master powers can change it and only by temporarily changing the bloc to a large-object page.
  - obj-flag-array-ref-flag (§4.11.2): indicates whether the corresponding bloc word is a reference. This flag is sync-isolated (see §4.10.8).
  - obj-flag-array-mod-pub-readable-flag (§4.4.5, §4.11.1): indicates whether the corresponding bloc word is public-readable by any module. This flag is sync-isolated (see §4.10.8).
  - obj-hdr-flag: (§4.10.6) indicates whether the corresponding bloc word is an object header. This flag is page-isolated (see §4.10.8).
- software-bloc-hdr (§4.10.5): for use by the host module to store meta-data associated to the bloc.
  - software-bloc-hdr-agent-gate (§4.11.3); 1 word: governs access to the software bloc header.
    - 14 bits: agent-gate-id.
    - 04 bits: agent-gate-readable-str-suff-len.
    - 04 bits: agent-gate-syncable-str-suff-len.
    - 01 bits: agent-gate-sync-flag.
  - software-bloc-hdr-flag-array (§4.10.5): one flag-pair for each data word in an object, grouped in sets of 32 ($=\lfloor 64/2 \rfloor$) so that pairs do not span a word. The size is 0 to 4 words depending on the if the software-bloc-hdr-size is 0, 1-32, 33-64, 65-96, or 97 127 words.
    - software-bloc-hdr-flag-array-ref-flag (§4.11.2): indicates whether the corresponding bloc word is a reference. This flag is sync-isolated (see §4.10.8).
    - software-bloc-hdr-flag-array-mod-pub-readable-flag (§4.4.5, §4.11.1): indicates whether the corresponding bloc word is public-readable by any module. This flag is sync-isolated (see §4.10.8).
  - software-bloc-hdr-data, software-bloc-hdr-size words. The layout of this section is up to the host-module software.

Small Ad-Hoc Object Header: (§4.10.6).

- 32 bits: mod-ownable (§4.11.1).
  - 31 bits: mod-ownable-id.
  - 01 bits: mod-ownable-integrity-flag.
- 23 bits: agent-gate (§4.11.3).
  - 14 bits: agent-gate-id.
  - 04 bits: agent-gate-readable-str-suff-len.
  - 04 bits: agent-gate-syncable-str-suff-len.
  - 01 bits: agent-gate-sync-flag.
- 02 bits: refable (§4.11.2).
  - 01 bits: refable-target-flag 081.
  - 01 bits: refable-reachable-flag.
  - 01 bits: refable-versioned-flag.
- 03 bits: reserved.
- 03 bits: obj-exp-pos-size: object size including header, from $2^1$ to $2^8$ (in this embodiment, an object must be at least one word for the header and at least another for the data).

Small Uniform Object Page

In this embodiment for uniform slabs of identical objects all of which are instances of a given class we need blocs of data pages tiled into equal sized regions all sharing the same meta-data; see §4.10.7.

- 32 bits: mod-ownable (§4.11.1).
  - 31 bits: mod-ownable-id.
  - 01 bits: mod-ownable-integrity-flag.
- 09 bits: obj-pos-size: counts from 1 to 512.
- 06 bits: array-exp-br2-size: Note that the array size is truncated at the end of bloc, and so may be meaningfully set to infinity.
  - 05 bits: array-exp-br2-size-exponent: array size as a power of two from 1 to $2^{31}$.
  - 01 bits: array-exp-br2-size-three-halves-flag.
- 02 bits: obj-align-enum: object alignment.
  - 0: no constraints.
  - 1: may not straddle a page.
  - 2: may not straddle a cache-line.
  - 3: reserved.
- 02 bits: array-align-enum: array alignment.
  - 0: no constraints.
  - 1: may not straddle a page.
  - 2: may not straddle a cache-line.
  - 3: reserved.
- 02 bits: array-hdr-loc-enum: array hdr loc.
  - 0: before the tops of their respective arrays.
  - 1: at the bottoms of their respective arrays.
  - 2: after the bottoms of their respective arrays.
  - 3: collected in the bottom-of-bloc meta-data.
- 07 bits: software-bloc-hdr-size (§4.10.5).
- 04 bits: bloc-exp-size: 1 to $2^{15}$ pages.

Arrays Versus Tables: See §4.10.7.

Arrays: The array[index]→offset addressing mode (1) checks that the array base is the start of an array, (2) picks an object within the array using index, checking its bounds against the array size, and (3) picks a word within the object using offset, checking its bounds against the object size. As the entire array shares one header, the entire array is an atomic point for the purposes of each aspect of Hard Object.

Tables: Tables of objects may be constructed by setting the array size to 1 (identifying arrays and objects) and then using the entire bloc as one table. The table<row>→offset addressing mode (1) asserts that the array size is 1, (2) checks that the table base is the start of an array/object, (3) picks an array/object within the bloc using checking its bounds against the bloc size, and (4) picks a word within the object using offset, checking its bounds against the object size. As each object within the array has its own header, each object gets independent treatment of each aspect of Hard Object.

Small Uniform Object Bottom-of-Bloc Meta-Data:

A small uniform object bloc has meta-data at the bottom of the bloc. We list its parts from the bottom up.

- obj-flag-array (§4.10.5): one flag-triple for each data word in an object, grouped in sets of 21 ($=\lfloor 64/3 \rfloor$) so triples do not span a word; the resulting size is [obj-pos-size/ 21]. In this embodiment, the whole flag-array is read-only; only software having master powers can change it and only by temporarily changing the bloc to a large-object page.
- obj-flag-array-ref-flag (§4.11.2): indicates whether the corresponding object field is a reference. This flag is page-isolated (see §4.10.8).
- obj-flag-array-mod-guest-readable-flag (§4.11.1): indicates whether the corresponding object field is guest-readable. This flag is page-isolated (see §4.10.8).
- obj-flag-array-mod-guest-writeable-flag (§4.11.1): indicates whether the corresponding object field is guest-writable. This flag is page-isolated (see §4.10.8).

software-bloc-hdr (§4.10.5): for use by the host module to store meta-data associated to the bloc.
- software-bloc-hdr-agent-gate (§4.11.3); 1 word: governs access to the software bloc header.
  - 14 bits: agent-gate-id.
  - 04 bits: agent-gate-readable-str-suff-len.
  - 04 bits: agent-gate-syncable-str-suff-len.
  - 01 bits: agent-gate-sync-flag.
- software-bloc-hdr-flag-array (§4.10.5); one flag-pair for each data word in an object, grouped in sets of 32 (=⌊64/2⌋) so that pairs do not span a word. The size is 0 to 4 words depending on the if the software-bloc-hdr-size is 0, 1-32, 33-64, 65-96, or 97 127 words.
  - software-bloc-hdr-flag-array-ref-flag (§4.11.2): indicates whether the corresponding bloc word is a reference. This flag is sync-isolated (see §4.10.8).
  - software-bloc-hdr-flag-array-mod-pub-readable-flag (§4.4.5, §4.11.1): indicates whether the corresponding bloc word is public-readable by any module. This flag is sync-isolated (see §4.10.8).
- software-bloc-hdr-data, software-bloc-hdr-size words. The layout of this section is up to the host-module software.

collected-array-hdrs: if array-hdr-loc-enum is 3 then the object headers go here.

Small Uniform Object/Array Header: (§4.10.7).
- 36 bits: mod-guest (§4.11.1).
  - 31 bits: mod-guest-id.
  - 05 bits: mod-guest-suff-len.
- 23 bits: agent-gate (§4.11.3).
  - 14 bits: agent-gate-id.
  - 04 bits: agent-gate-readable-str-suff-len.
  - 04 bits: agent-gate-syncable-str-suff-len.
  - 01 bits: agent-gate-sync-flag.
- 02 bits: refable (§4.11.2).
  - 01 bits: refable-target-flag 081.
  - 01 bits: refable-reachable-flag.
  - 01 bits: refable-versioned-flag.
- 02 bits: reserved.

Object-Version-Triple
In software, we consider the object-version-triple (in one embodiment, the first word of the object) as comprising the following fields:
- T bits obj-version-number 080, initially 0;
- (software) ⌊S/2⌋ bits obj-version-ceiling, initially 1;
- (software) ⌊S/2⌋ bits obj-version-next-ceiling, initially 1;

4.14.6 Invariants
In this embodiment, we maintain the following invariants.
Distinct-Dyn-Target-Tag
   Invariant (§4.4.3): (software) We prevent dyn-target-pub forgery by requiring the dyn-target-tag to be distinct from any other bit string of the same length on the same text page.
No-Mod-Ancestor-of-Another
   Invariant (§4.4.5): (software) The linker/loader prevents the return of the Trojan Horse attack [Wiki-Trojan-Horse] of §4.4.5 by ensuring that no internal node of the module tree is an ancestor of another (including the special modules).
Thread-Refines-Agent
   Invariant (§4.7.5): (software) The agent manager ensures that no two threads ever share a current-agent-id.
Syncable-Implies-Readable
   Invariant (§4.7.6): (software) The agent manager constrains agent-gate-readable-str-suff-len to be either −1 or ≥agent-gate-syncable-str-suff-len.
In-Sync-Cache-Implies-Gate-Synced
   Invariant (§4.7.10): If a datum is in the sync-cache, then the current agent has sync on the datum.
In-Read-Cache-Implies-Agent-Readable
   Invariant (§4.7.10): If a datum is in the read-cache, then the current-agent-id is within the agent-gate-readable-str-suff-len of the agent-gate-id of the datum.
Stack-Integrity
   Invariants (§4.9.3):
   Stack data at and above caller-protect cannot be accessed during the protected call.
   Stack data within a flow-protect range at and above flow-protect cannot be accessed during the protected call;
   Stack operations, such as push, pop, call, and return, cannot access memory beyond the stack-limit.
Stack-Ptr Invariant (§4.9.3):
   flow-protect≥stack-ptr≥stack-limit.
Stack-Frame Invariants (§4.9.3):
   SF1: caller flow-protect≥caller-protect;
   SF2: caller-protect≥flow-protect range top;
   SF3: flow-protect≥stack-limit.
Version-Ceiling-Delimits-Unused-Versions
   Invariant (§4.6.2): there are no references in memory having a version>obj-version-number and < obj-version-ceiling 4.15 Glossary of Some Terms
access: The movement of data between a CPU register and a RAM cell at an address a read or a write.
access through a pointer: an access where the data accessed is at an address which is the data at another address, that second address called a pointer. Also called an indirect access.
access condition: The conditions under which an access to data at a data address is allowed.
accessible stack range: The range of data addresses on the stack that can be accessed; delimited by the caller-protect register (inclusive) and the stack-limit register (exclusive).
accessing instruction: An instruction performing an access to data at a data address.
accessing instruction address: The address of an accessing instruction.
address: The name of a memory cell; the bits that are placed on the memory bus in order for the CPU to access a cell in memory.
annotate: To attach an annotation to something; to associate an annotation with something.
annotation: An association.
argument: A datum passed to an operation which parameterizes the behavior of the operation. Note that arguments occur in multiple contexts, including but not limited to: (1) instructions take arguments, (2) functions take arguments. This is potentially confusing in the situation of a "call" instruction which (1) as an instruction may take an instruction argument, but (2) as an initiator of a function call, where the function may take its own function arguments.

assert (a criterion): to check if a criterion evaluates to true and if not perform some exceptional action, such as issuing a fault.

association: A abstraction indicating a persistent relationship between two things, x and y, where having one thing, x, one may find the other, y. Thing y is said to be "associated with" x "by the association". The terms "relation" and "relationship" are meant to at least encompass, without being limited to, the meaning of the term "relation" as used in the field of Relational Algebra.

bitwise: A function F from two input bits to an output bit applied "bitwise" to two strings of bits means the output is a string of bits and the i-th bit of the output is F applied to (1) the i-th bit of the first input and (2) the i-th bit of the second input.

bitwise exclusive-or (also "bitwise xor" or "bitwise symmetric difference"; also "exclusive-or" or "xor" or "symmetric difference" when it is implied to apply to an entire string of bits and is therefore implied to be bitwise): A function taking two strings as input and producing as output the exclusive-or function applied bitwise: the i-th bit of output is the exclusive-or of the i-th bit of the first input and the i-th bit of the second input.

branch instruction: An instruction which may or may not, transfer control depending upon some condition, such as the value of a register. Contrast with "jump instruction", "call instruction" and "return instruction".

call instruction: An instruction which initiates a function call; often takes several actions such as pushing the return address onto the stack and then transferring control to the address of the code of the callee function. Control is usually returned to the instruction in the caller after the call instruction at the completion of the function call by use of the return instruction by the callee. See "return instruction". Contrast with "branch instruction", "jump instruction".

cache: a memory that is smaller (and typically faster) than main memory; used to hold a copy of a datum for faster access.

check: To evaluate or test a predicate and then take an action based on the result; an 'if' statement.

clear: said of a bit or flag, to assign its value to zero or lower the flag, or the state of being zero or lowered.

coarse grain: In the context of granularity, larger quanta.

computer: A self-contained device for computing, usually presenting a well-defined interface.

computing an association (or annotation): An abstract association may be realized using many kinds of mechanisms; computing an association is to use some mechanism to get from one side of an association, a given, to the other side, the associated object of the given, that is, the object related to the given by the association. To realize a declarative association using an imperative mechanism.

condition: A mathematical predicate. Equivalently, a declarative sentence that is either true or false; such a sentence is usually about certain given objects and is then called a "condition on" those objects.

control: An abstract way of referring to the progress of the program counter through the space of (instruction) addresses.

control transfer: By default after the execution of an instruction the program counter increments to the address of the next instruction; a control transfer is any action taken to set the program counter to any value other than this default.

criterion: See "condition".

danger mode meta-datum: an annotation on an instruction address indicating that the instruction at that address runs with more powers than user mode; in one embodiment, the danger mode meta-datum gives kernel mode powers to the instruction at the annotated address. One example is the Hard Object danger bit.

dangerous: We use this term to indicate an instruction (or configuration thereof) which invokes powers beyond those of normal user mode instructions. We introduce this term, as distinct from "kernel" (or "supervisor"), in order to distinguish instructions which may require more privileges (powers) than user mode allows, but may not necessarily require full kernel mode privileges (powers); however in some embodiments, "dangerous" may simply be synonymous with "requiring kernel mode".

data: Bits in a computer not intended to be interpreted directly as instructions by the CPU.

data access: An access to data at a data address.

data address: Many prior art computer systems partition RAM addresses into "data", those for storing data, and "text", those for storing program instructions; a data address is one address of the first part, that is, the addresses for storing data.

data cache: a cache of data memory (as distinct from instruction memory).

data module-id: A module-id annotated onto a datum or a plurality of data.

data page: Prior art computer systems organize RAM addresses into pages; a page containing data addresses is a data page. Note that prior art computer systems tend to mark entire pages as completely data or completely text (instruction) pages.

datum: singular of data; see entry for data.

destination instruction: See "target instruction".

device owner module-id: An identifier annotated onto a particular device.

domain: an abbreviation for "protection domain"; see the entry for protection domain.

element: (Mathematics) A member of a set.

exclusive-or (also "xor"): The exclusive-or of two bits is their sum modulo 2.

execution: The act of executing or running a program.

fault: A condition which the CPU of a microprocessor can enter in an exceptional circumstance requiring special handling and suspension of the currently executing program. Usually upon the occurrence of a fault the CPU aborts its execution of the current program and begins executing an fault-handling routine.

finding: See "computing an association".

fine grain: In the context of granularity, smaller quanta.

flush (from cache): writing data out to a slower/larger level of the memory hierarchy, such as such as from on-chip to main memory or from memory to disk.

granularity: The level of detail or size of unit or quantum of expression for a computation. See "fine grain" and "coarse grain".

heap data address: data address where data is kept beyond the lifetime of any particular function call, that is not the stack; also not registers or memory-mapped I/O.

indicator instruction: An instruction which indicates that its (instruction) address has some property. One example of an indicator instruction is a target-indicator instruction.

input-output device: Also "input/output device" or "I/O device". An abstract identifier used by software to identify a particular piece of hardware attached to a computer, such as a disk drive, keyboard, mouse, etc. when input or output to such a piece of hardware is desired. Alternatively, the actual physical device so attached to a computer: a disk drive, etc.

input-output operation: Also "input/output operation" or "I/O operation". An operation by which software can request input or output from an input-output device.

instruction: Bits in a computer meant to be interpreted by the CPU as directions for it to perform one of a predetermined list of manipulations of data, such amount of data usually fixed and such manipulations usually implemented completely in microprocessor hardware.

instruction address: Many prior art computer systems partition RAM addresses into "data", those for storing data, and "text", those for storing program instructions; an instruction address is one address of the second part, that is, the addresses for storing instructions.

instruction argument: An argument to an instruction (as opposed to an argument to a function).

instruction module-id: A module-id annotated onto an instruction or a plurality of instructions.

integrity-bit: A bit of meta-data associated with a data address. This bit is cleared to false whenever the owner of this data address is changed, and can only be set to true again by the new owner. This bit allows a module to recognize a Trojan Horse attack [Wiki-Trojan-Horse] by another module.

jump instruction: An instruction which unconditionally transfer control, independent of any condition. Contrast with "branch instruction". "call instruction", and "return instruction".

kernel: Software which runs in kernel mode.

kernel mode: The mode of a CPU where all instructions are allowed; usually as distinguished from user-mode.

map: As a noun, the embodiment of any abstract association. As a verb, the abstract act of associating. This term is meant to indicate any method for associating elements with one another. Use of this term—and others like it that evoke the context of an association or relationship between elements—is not meant to limit to any particular embodiment.

master powers: An abstract property that instructions are said to "have" when the program is arranged such that when these instructions are running the current-module-id register has as its value the special master module-id; deliberately reminiscent of prior art kernel mode.

master module-id: A special module-id value (for example, we could use the number 1) such that when the current-module-id register is set to this value, the instructions executed have powers very similar to instructions running in prior art kernel mode in prior art systems; see "master powers".

multi module-id: A special module-id value (for example, we could use the number −2) such that when annotated onto instruction addresses (such as in a owner-module-id field in the PTE of a text page) changes the operation of control transfer into the page (and could have other consequences, depending on the details of the embodiment); if the current-module-id register is ever set to the multi module-id, the CPU faults.

nobody module-id: A special module id value (for example, we could use the number 0); if the current-module-id register is ever set to the nobody module-id, the CPU faults. Note that this value can be useful as the owner (or ownable) module-id annotating data pages that should not be accessed as heap pages by user code, such as stack pages.

matching: Some objects "match" if they satisfy some relation or predicate (where "relation" and "predicate" are as defined elsewhere in this Glossary). Equality is a common example of such a relation; note that matching relations include, but are not limited to, the equality relation.

meta-data: data about data (where "about data" here is meant in the more general sense which means about or annotating any kind of information at all, including instructions). For example, meta-data of data often indicates how said data may be used, including but not limited to encoding access permissions to said data. The plural of meta-datum.

meta-datum: singular of meta-data. See "meta-data".

microprocessor: The core of a modern computer system.

mode: A subset of the abstract state space of a machine. We say a machine is in a particular mode when the state of the machine is in the subset of the state space associated with the mode.

mode of operation: See "mode".

module: A subset of instruction addresses all collectively owning and maintaining data as one.

module-id: an identifier for a module.

numeric value: the value of a sequence of bits when interpreted as, say, a fixed point number.

object: a region of data memory; such a region that is interpreted as a semantic unit.

operation: An action comprising the execution of one or more instructions.

page: A prior art unit of partition of a space of memory addresses. See also "page table entry".

page-straddling instruction: An instruction the encoding of which in bits begins on one page and ends on another. See "page".

page table entry: A prior art mechanism for annotating memory pages with meta-data. Also can mean the meta-data so annotated.

page table entry owner module-id: The module-id owning of all of the data addresses on a data page. It is associated with those data addresses in an efficient manner by being annotated on the page as a field of the page table entry.

partition: (Mathematics) A collection of subsets of a set which (a) are pairwise disjoint and (b) the union of which is the entire set.

permission value: A value encoding what kind of accesses are allowed at a given address.

permissions table (single instance of permissions tables): A table associating an address with a permission value. The permission value is used at the time of an access to the address to determine if the access should be allowed.

point to: We say some data A points to other data B if A contains the address of B. The intent is usually to provide a mechanism to realize an association of B to A.

pointer: a datum that holds the address/location of another datum; similar to having a name for an object.

predicate: a function or program that returns true or false; a predicate is said to define or compute a relation on its input sets (or equivalently their product set) where this relation is the subset of tuples from their product set where that tuple (or equivalently its member elements when presented in tuple order) cause the predicate to return true.

predicating (said of an action): possibly altering the action in quest ion depending on some criteria.

product set: A "product set" of two sets A and B is the set of all possible 2-element tuples (pairs) (a, b) where a is an element of A and b is an element of B. A product set of n sets is defined similarly using n-element tuples where for any i the i-th element of any tuple comes from the i-th set.

program: A collection of instructions executed by a computer/microprocessor.

program counter: A special CPU register holding the address (or pointing to) the current instruction being executed.

protection domain: abstractly, a set of resources that may be accessed in a particular context; one says that any metaphor of an agent is 'in the protection domain' when it has such access to said resources.

public-readable-bit: A bit of meta-data associated with a data address. Can only be set by the owner of the data address. If this bit is true then any instruction can read, but not necessarily write, the data at the data address—unless the untrusted region embodiment is used and the instruction address of the instruction is in the untrusted region, overriding the public-readable-bit.

read: An access to data at a data address that transfers data from the RAM cell indexed by the data address to a CPU register.

register: Special memory within the CPU; not general-purpose Random Access Memory (RAM). Registers often have special semantics, such as CPU status registers and the program counter. See also "program counter".

relation: Terms "relation" and "relationship" are meant to at least encompass, without being limited to, (1) the meaning of the term "relation" as used in the field of Relational Algebra, (2) the meaning of the term "relation" as used in Mathematics to mean any subset of a product of sets, and (3) the meaning of the term "relation" as used in Computation where some objects are said to satisfy a relation when they make a predicate return true when those objects are provided as the input(s) to the predicate.

return instruction: An instruction which causes normal function call termination; often takes several actions such as popping values off of the stack then transferring control to the address that was stored by the return address which was pushed onto the stack by the call instruction which initiated the call. See "call instruction". Contrast with "branch instruction", "jump instruction".

set: (Mathematics) Usually considered a undefined primitive concept in mathematics; perhaps describable as a containment metaphor where any given thing must be either in the set or not, never neither nor both; the things contained are called elements.

set (a bit or flag): to assign its value to 1 or raise the flag, or the state of being 1 or raised.

set (a variable to a value): to assign a variable to a value.

set-current-module-id(UInt new-module-id) instruction: An instruction which under some circumstances sets the current-module-id register to the value of its new-module-id argument.

set-integrity operation: An operation that sets the integrity bit associated with a data address.

set-integrity condition: A condition that if met in a situation allows the set-integrity operation to proceed in that situation.

set-owner-module-id operation: An operation that sets the owner associated with a data address.

set-owner condition: A condition that if met in a situation allows the set-owner-module-id operation to proceed to alter the owner in that situation.

set-public-readable operation: An operation that sets the public-readable bit associated with a data address.

set-public-readable condition: A condition that if met in a situation allows the set-readable-bit operation to proceed in that situation.

significant bits, least: when a machine word is interpreted as a fixed-point number, those bits that contribute least to the magnitude of the number; often depicted as the rightmost bits stack-limit register: A CPU register that points to the maximum allowable extent of the stack; only addresses less than or equal to caller-protect and greater than stack-limit are "in frame". In a usual prior art memory organization it should not change while a particular thread context is executing; however it should be changed by the thread scheduler as a CPU switches from executing one thread to executing another.

store: to write.

subset: (Mathematics) In the context of an other set, a set where all of its elements are also elements of the other set.

subset of data addresses: A subset of all of the data addresses of the microprocessor.

subset of instruction addresses: A subset of all of the instruction addresses of the microprocessor.

table: The embodiment of any abstract association. This term is meant to indicate any method for associating elements with one another. Use of this term is meant to suggest an embodiment and is not meant to limit to any particular embodiment.

tag meta-datum: Any data annotating other data in order to make the data it annotates distinct. One example of a tag meta-datum is a target-tag meta-datum.

target data address: The data address in the context of an instruction making an access to target data at a data address.

target-indicator instruction: An address at which an indicator instruction is located the presence of which indicates suitability as a target instruction address for some control transfers. See "indicator instruction" and "target instruction address".

target instruction: an instruction at a target instruction address; see "target instruction address".

target instruction address: In the context of control transfer, the instruction address to which a control transfer instruction changes the program counter (or to which control is transferred).

target-tag: A field of a Page Table Entry the value of which must match the argument of target-indicator instructions on the corresponding page for those target indicator instructions to not fault. See "target indicator instruction".

tuple: An ordered collection of elements. A subset of a product set is a set of tuples where each element of one tuple comes respectively from each set participating in the product set.

user mode: The typical mode for the execution of programs on a microprocessor where dangerous instructions are not allowed; in prior art systems, as distinguished from kernel-mode.

value: The bits contained in a register or memory cell. That is, at times when it is clear from context we may say "the program counter", confusing the hardware register with the software (in this case an instruction address) value contained in the register; however when we wish to be explicit, we may refer to (1) the register on one hand, meaning the hardware device, and (2) the value of the register on the other hand, meaning the bits contained in the hardware device.

version number: a number associated with something which is incremented every time the thing is written; one may check that a thing has not changed if the version number has not changed, as long as one may conclude that the version number has not rolled over.

write: An access to data at a data address that transfers data to the RAM cell indexed by the data address from a CPU register.

4.16 List of Non-Patent Reference Keys

[BO-2003]: Randal E. Bryant and David R. O'Hallaron "Computer Systems: A Programmer's Perspective" Prentice Hall 2003.

[EKO-1995]: Dawson R. Engler, M. Frans Kaashoek, James O'Toole "Exokernel: An Operating System Architecture for Application-Level Resource Management", Symposium on Operating Systems Principles, 1995, pages 251-266.
[G-2005]: S. Gorman, "Overview of the Protected Mode Operation of the Intel Architecture" (date unknown to me).
[Google-NaCl-2009]: Yee et al., "Native Client: A Sandbox for Portable, Untrusted x86 Native Code". IEEE Symposium on Security and Privacy, May 2009.
[HP-1998]: "HP OpenVMS Systems Documentation: OpenVMS Alpha Guide to 64-Bit Addressing and VLM Features", January 1998.
[I-2005] "Intel 80386 Programmer's Reference Manual", 1986.
[Intel-Itanium-2010]: Intel, "Intel Itanium Architecture Software Developer's Manual, Volume 2: System Architecture", Revision 2.3, May 2010, pp. 2:59-2:60, pp. 2:564-2:565 and Intel, "Intel Itanium Architecture Software Developer's Manual, Volume 3: Intel Itanium Instruction Set Reference", Revision 2.3, May 2010, p. 3:29, p. 3:53.
[KCWWK-2009] Kevin Klues, Derrick Coetzee, Daniel Wilkerson, Mark Winterrowd, and John Kubiatowicz. "Evaluating Hard Object: a lightweight module isolation system", 11 Dec. 2009.
[Lamport-1979] L. Lamport. "How to make a multiprocessor computer that correctly executes multiprocess programs". Computers, IEEE Transactions on, 100(9):690 691, 1979.
[MUNGI]: "The Mungi Manifesto", http://www.ertos.nicta.com.au/research/mungi/manifesto.pml (date unknown to me).
[OSSNMS-1992]: T. Okamoto, H. Segawa, S. H. Shin, H. Nozue, Ken-Ichi Maeda, M. Saito, "A Micro-Kernel Architecture for Next. Generation Processors", Proceedings of the Workshop on Micro-kernels and Other Kernel Architectures, 1992, pages. 83-94.
[PBBC-2002] David Patterson, Aaron Brown, Pete Broadwell, George Candea, Mike Chen, James Cutler, Patricia Enriquez, Armando Fox, Emre Kiciman, Matthew Merzbacher, David Oppenheimer, Naveen Sastry, William Tetzlaff, and Noah Treuhaft. "Recovery oriented computing (ROC): Motivation, definition, techniques, and case studies". In UC Berkeley Computer Science Technical Report UCB/CSD-02-1175, Berkeley, Calif., March 2002. U. C. Berkeley.
[Stroustrup-1997] Bjarne Stroustrup. "The C++ programming language—3rd edition", page 26. Addison-Wesley Reading, Mass., 1997.
[W-2004]: Emmett Witchel, "Mondrian Memory Protection", Ph.D. Thesis MIT, 2004.
[WA-2003]: Emmett Witchel, Krste Asanovic, "Hardware Works, Software Doesn't: Enforcing Modularity with Mondriaan Memory Protection" 9th Workshop on Hot Topics in Operating Systems (HotOS-IX), Lihue, Hi., May 2003.
[WCA-2002]: Emmett Witchel, Josh Cates, Krste Asanovic, "Mondrian Memory Protection", ASPLOS-X: Proceedings of the 10th international conference on Architectural support for programming languages and operating systems, San Jose, Calif. 2002, pages 304-316.
[WGBAJF-2011] Daniel Shawcross Wilkerson, Simon Fredrick Vicente Goldsmith, Ryan Barrett, Erick Armbrust, Robert Johnson, and Alfred Fuller. "Distributed transactions for google app engine: Optimistic distributed transactions built upon local multi-version concurrency control". CoRR, abs/1106.3325, 2011. http://arxiv.org/abs/1106.3325.
[WLAG-1993] Robert Wahbe, Steven Lucco, Thomas E. Anderson, and Susan L. Graham. "Efficient software-based fault isolation". ACM SIGOPS Operating Systems Review, 27(5):203-216, December 1993.
[WMHK-2009] Daniel Wilkerson, David Alexander Molnar, Matthew Harren, and John D. Kubiatowicz. "Hard-Object: Enforcing object interfaces using code-range data protection". Technical Report UCB/EECS-2009-97, EECS Department, University of California, Berkeley, 8 Jul. 2009.
[WS-1992]: John Wilkes, Bart Sears, "A comparison of Protection Lookaside Buffers and the PA-RISC protection architecture", HP Laboratories Technical Report HPL-92-55, March 1992, pp. 1-11.
[ZLFLQZMT-2004]: P. Zhou, W. Liu, L. Fei, S. Lu, F. Qin, Y. Zhou, S. Midkiff, J. Torrellas, "AccMon: Automatically Detecting Memory-related Bugs via Program Counter-based Invariants", IEEE MICRO, 2004.
[ZQLZT-2004]: P. Zhou, F. Qin. W. Liu, Y. Zhou, J. Torrellas, "iWatcher: Efficient Architectural Support for Software Debugging", International Symposium on Computer Architecture ISCA, 2004.
[ZQLZT-2004b]: P. Zhou, F. Qin, W. Liu, Y. Zhou, J. Torrellas, "iWatcher: Simple and General Architectural Support for Software Debugging", IEEE Top Picks in Computer Architecture, 2004.

4.16.1 Wikipedia

[Wiki-auto-pt r] auto_ptr. Wikipedia. http://en.wikipedia.org/wiki/Auto_ptr.
[Wiki-Cap-Addr] Capability-based addressing. Wikipedia. http://en.wikipedia.org/wiki/Capability-based_addressing.
[Wiki-Cap-Sec] Capability-based security. Wikipedia. http://en.wikipedia.org/wiki/Capability-based_security.
[Wiki-Chomsky-Hierarchy] Chomsky hierarchy. Wikipedia. http://en.wikipedia.org/wiki/Chomsky_hierarchy.
[Wiki-Confused-Deputy] Confused deputy problem. Wikipedia. http://en.wikipedia.org/wiki/Confused_deputy_problem.
[Wiki-MVC] Model-view-controller. Wikipedia. https://en.wikipedia.org/wiki/Model-view-controller.
[Wiki-Return-Oriented] Return-oriented programming. Wikipedia. http://en.wikipedia.org/wiki/Return-oriented_programming.
[Wiki-Side-Channel] Side channel attack. Wikipedia. http://en.wikipedia.org/wiki/Side_channel_attack.
[Wiki-Slab-Alloc] Slab allocation. Wikipedia. http://en.wikipedia.org/wiki/Slab_allocation.
[Wiki-Smart-Pointers] Smart pointers. Wikipedia. http://en.wikipedia.org/wiki/Smart_pointer.
[Wiki-Stack-Smashing] Stack smashing. Wikipedia. http://en.wikipedia.org/wiki/Stack_smashing.
[Wiki-Trojan-Horse] Trojan horse (computing). Wikipedia. http://en.wikipedia.org/wiki/Trojan_horse_(computing).
[Wiki-x86-64] x86-64. Wikipedia. https://en.wikipedia.org/wiki/X86-64.

We claim:
1. A method of regulating an execution of a program by a microprocessor, said program having a plurality of data addresses, said microprocessor having a data access operation, said data access operation comprising a base pointer data address and an offset, said method comprising:
annotating at least one of said plurality of data addresses with an object header flag, and
when said data access operation is made to data at a data address, checking that said base pointer data address of said data access operation is annotated with an object header flag, otherwise trapping to a handler.

2. The method of claim 1, said method further comprising:
annotating at least one of said plurality of data addresses with a meta-data header, and
when a data access operation is made, further performing the steps of:
finding the meta-data header annotated onto said base pointer data address of said data access operation, and
performing a check on said at least one meta-data header and if said check fails, trapping to a handler.

3. The method of claim 2, in which said at least one meta-data header comprises an object-size field, said method further comprising:
said check further comprising comparing said object-size field of said at least one meta-data header annotated onto the base pointer data address of said at least one data address to said offset of said data access operation, and if said object-size field is more than said offset of said data access operation, trapping to a handler.

4. A method of regulating an execution of a program by a microprocessor, said program having a plurality of pointers, said microprocessor having a plurality of data addresses, said program having a memory allocator, said method comprising:
annotating at least one of said data addresses with an object version number,
annotating at least one of said pointers with a time address,
when a memory allocator in a program being executed by the microprocessor returns a pointer to data, setting the time address annotated onto said pointer to match the object version number annotated onto said data address,
when a program being executed by the microprocessor executes an instruction for accessing a data address through a pointer, performing the steps of:
the microprocessor comparing the object version number annotated onto said data address to the time address of said pointer, and
if the object version number annotated onto said data address does not match the time address of said pointer, then the microprocessor trapping to a handler, and
when the memory allocator deallocates a data address, incrementing the version number annotated onto the data address.

5. The method of claim 4, the memory allocator further maintaining a set of free objects, said method further comprising:
annotating at least one of said data addresses with an object version ceiling,
when the memory allocator deallocates a data address,
comparing the object version annotated onto the data address to the object version ceiling annotated onto the data address, and
if the object version annotated onto the data address does not equal the object version ceiling annotated onto the data address, putting the data address into the set of free objects.

6. The method of claim 5, said method further comprising:
computing an object version next ceiling for a data address from examining the pointers which point to said data address,
setting the object version ceiling annotated onto said data address to the object version next ceiling.

\* \* \* \* \*